US012598178B2

(12) United States Patent
Yang et al.

(10) Patent No.: US 12,598,178 B2
(45) **Date of Patent: *Apr. 7, 2026**

(54) BIOMETRIC DATA SUB-SAMPLING DURING DECENTRALIZED BIOMETRIC AUTHENTICATION

(71) Applicant: REDROCK BIOMETRICS INC, San Francisco, CA (US)

(72) Inventors: Hua Yang, Millbrae, CA (US); Leonid Kontsevich, San Francisco, CA (US); Kevin Horowitz, Sherman Oaks, CA (US); Igor Lovyagin, Deerfield, IL (US)

(73) Assignee: REDROCK BIOMETRICS, INC., San Francisco, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/063,522

(22) Filed: Oct. 5, 2020

(65) Prior Publication Data

US 2021/0037009 A1 Feb. 4, 2021

Related U.S. Application Data

(63) Continuation-in-part of application No. 17/013,772, filed on Sep. 7, 2020, which is a continuation-in-part
(Continued)

(30) Foreign Application Priority Data

Jan. 27, 2018 (CN) .......................... 201810080360.5

(51) Int. Cl.
G06Q 40/00 (2023.01)
G06V 30/24 (2022.01)
(Continued)

(52) U.S. Cl.
CPC ........ H04L 63/0861 (2013.01); G06V 30/242 (2022.01); G06V 30/248 (2022.01); G06V 40/50 (2022.01)

(58) Field of Classification Search
CPC .. H04L 63/0861; G06V 40/50; G06V 30/248; G06V 30/242
See application file for complete search history.

(56) References Cited

U.S. PATENT DOCUMENTS 6,735,695 B1 * 5/2004 Gopalakrishnan ...... G06F 21/32
726/19
9,935,947 B1 * 4/2018 Machani ............. H04L 63/0861
(Continued)

FOREIGN PATENT DOCUMENTS

WO WO-2004019164 A2 * 3/2004 ............. G06F 21/32
WO WO2017066002 4/2017
(Continued)

OTHER PUBLICATIONS

Diala Jonaa, "Fingerprint Segmentation," Degree Project, Computer Engineering, Dalarna University, 2009 (Year: 2009).*
(Continued)

*Primary Examiner* — Abhishek Vyas
*Assistant Examiner* — William B. Bunker
(74) *Attorney, Agent, or Firm* — Intelink Law Group, PC; Brad Bertoglio

(57) ABSTRACT

A biometric authentication platform uses fault-tolerant distributed computing to determine if a supplied biometric sample and a template sample, which may be stored in a registry, are from the same person. Samples may be subdivided and assigned to Sub-Sample Processing Clusters for processing in parallel to determine sub-results. A consensus authentication result may then be determined by the processing cluster based upon the sub-results.

20 Claims, 32 Drawing Sheets

FIG. 1

Related U.S. Application Data of application No. 16/964,981, filed as application No. PCT/US2019/015465 on Jan. 28, 2019, now Pat. No. 11,823,194.

(51) Int. Cl.
  *G06V 30/242*    (2022.01)
  *G06V 40/50*    (2022.01)
  *H04L 9/40*     (2022.01)

(56)                References Cited

U.S. PATENT DOCUMENTS

| | | | |
|---|---|---|---|
| 10,637,662 | B2 | 4/2020 | Baughman et al. |
| 11,444,941 | B2 * | 9/2022 | Lynn .................. H04L 63/0861 |
| 11,568,038 | B1 | 1/2023 | Kulkarni et al. |
| 2008/0008173 | A1 * | 1/2008 | Kanevsky .............. H04L 45/00 370/389 |
| 2008/0019537 | A1 * | 1/2008 | Nongpiur ........... G10L 21/0364 704/E21.009 |
| 2008/0019573 | A1 * | 1/2008 | Baltatu .............. H04L 63/0823 382/115 |
| 2009/0172036 | A1 | 7/2009 | Marx |
| 2009/0300737 | A1 * | 12/2009 | Crandell ............. H04L 63/0861 707/999.01 |
| 2011/0126024 | A1 | 5/2011 | Beatson et al. |
| 2012/0167183 | A1 | 6/2012 | Langley |
| 2012/0272051 | A1 | 10/2012 | Chittigala et al. |
| 2016/0048731 | A1 * | 2/2016 | Hanna .................. G06V 40/19 348/78 |
| 2018/0048461 | A1 | 2/2018 | Jutla |
| 2018/0054436 | A1 * | 2/2018 | Wagner .............. H04L 63/0853 |
| 2018/0068130 | A1 | 3/2018 | Chan et al. |
| 2018/0091505 | A1 | 3/2018 | Farrell et al. |
| 2018/0137382 | A1 * | 5/2018 | Nowak .................. H04L 63/00 |
| 2018/0242944 | A1 | 8/2018 | Uber, III et al. |
| 2018/0288022 | A1 | 10/2018 | Madisetti |
| 2018/0323964 | A1 | 11/2018 | Watanabe et al. |
| 2019/0058593 | A1 | 2/2019 | Polcha et al. |
| 2019/0058708 | A1 * | 2/2019 | Wagner .............. H04L 63/0807 |
| 2019/0130086 | A1 | 5/2019 | Tovey |
| 2019/0356491 | A1 * | 11/2019 | Herder, III ........... H04L 9/3247 |
| 2020/0021446 | A1 | 1/2020 | Roennow et al. |
| 2020/0028677 | A1 * | 1/2020 | Herder, III ............... H04L 9/30 |
| 2020/0038677 | A1 | 2/2020 | Shang et al. |
| 2020/0153639 | A1 * | 5/2020 | Yang ..................... H04L 9/3263 |
| 2020/0382306 | A1 | 12/2020 | Wang |
| 2021/0166528 | A1 | 6/2021 | Caldarone et al. |
| 2021/0342432 | A1 * | 11/2021 | Goldwerger .......... H04L 9/3218 |
| 2022/0191032 | A1 * | 6/2022 | Arora ..................... H04L 9/008 |

FOREIGN PATENT DOCUMENTS

| | | | | |
|---|---|---|---|---|
| WO | WO-2017083732 | A1 * | 5/2017 | .......... H04L 9/3231 |
| WO | WO2018089098 | | 5/2018 | |
| WO | WO-2018096052 | A1 * | 5/2018 | .......... G06V 30/242 |
| WO | WO2018222211 | | 12/2018 | |
| WO | WO-2019002292 | A1 * | 1/2019 | ......... G06K 9/00087 |
| WO | WO2019032113 | | 2/2019 | |
| WO | WO-2019125041 | A1 * | 6/2019 | ............ G06F 21/31 |
| WO | WO2019126471 | | 6/2019 | |
| WO | WO-2021016311 | A1 * | 1/2021 | .............. H04L 9/50 |

OTHER PUBLICATIONS

Coakley et al., "Keystroke Biometric Studies with Short Numeric Input on Smartphones," U.S. Army Research Lab, Aberdeen, MD 2016 (Year: 2016).*

Othman et al., "The Horcrux Protocol: A Method for Decentralized Biometric-based Self-sovereign Identity," arXiv: 1711.07127v1 2017 (Year: 2017).*

Sergey Tulyakov, Faisal Farooq, Praveer Manskhani, Venu Govindaraju; ScienceDirect; Symmetric hash functions for secure fingerprint biometric systems; Pattern Recognition Letters 28 (2007) 2427-2436; Center for Unified Biometrics and Sensors, State University of New York at Buffalo, Amherst, NY 14228, USA.

Garris et al.; NIST Biometrics Evaluations and Developments; NISTIR 7204; Image Group Information Technology Laboratory; National Institute of Standards and Technology; Feb. 2005.

Walker et al., "Pia TI BART: a Platform for Transactive IoT Blockchain Applications with Repeatable Testing," M4IoT Dec. 2017, pp. 1-7.

* cited by examiner

| ULID 200 | TEMPLATE 210 | STATUS 220 | NONCE 230 | REGISTERED DEVICE 240 |
|---|---|---|---|---|
|  |  |  |  |  |

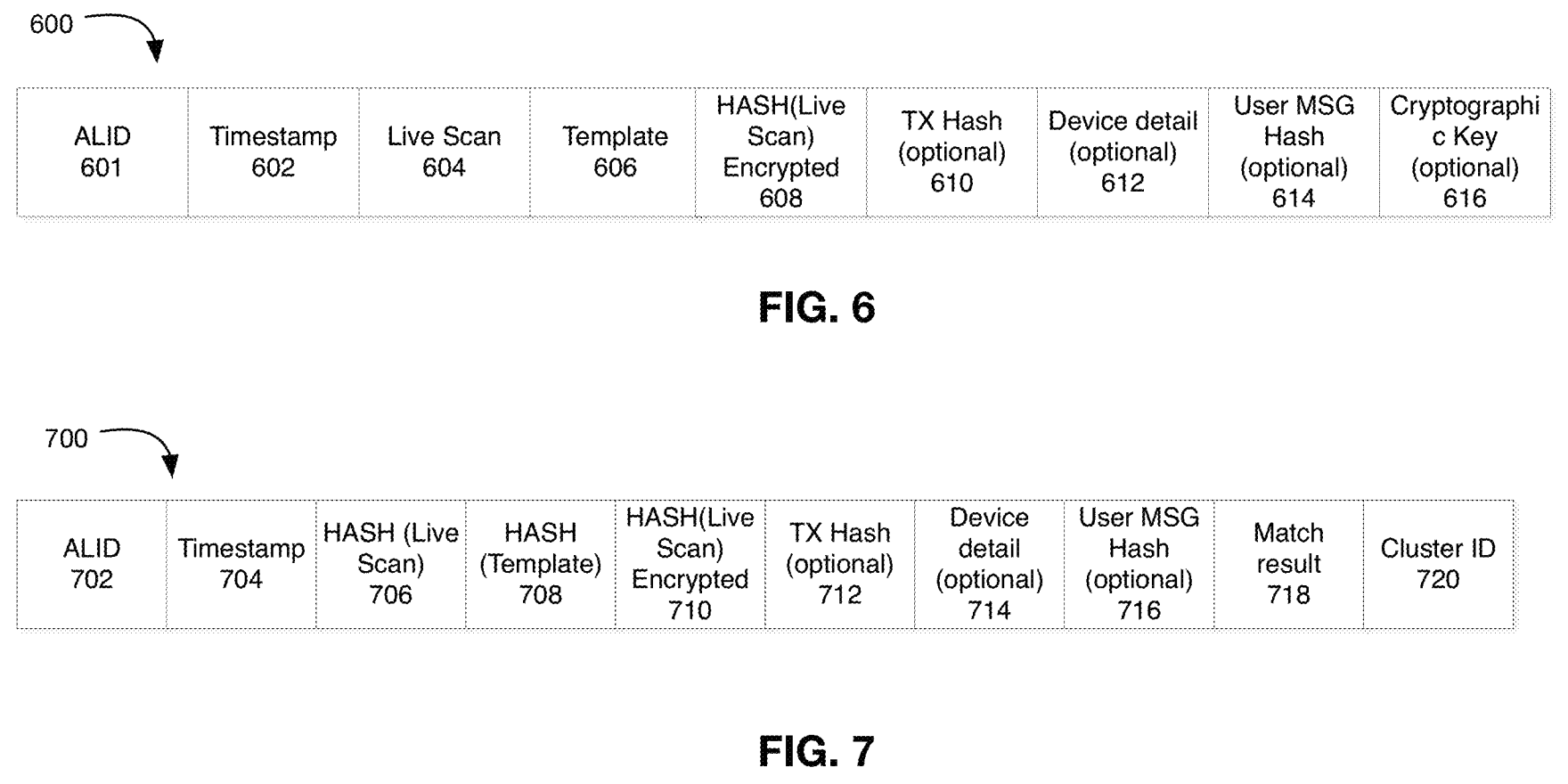

600

| ALID 601 | Timestamp 602 | Live Scan 604 | Template 606 | HASH(Live Scan) Encrypted 608 | TX Hash (optional) 610 | Device detail (optional) 612 | User MSG Hash (optional) 614 | Cryptographi c Key (optional) 616 |
|---|---|---|---|---|---|---|---|---|

| ALID 702 | Timestamp 704 | HASH (Live Scan) 706 | HASH (Template) 708 | HASH(Live Scan) Encrypted 710 | TX Hash (optional) 712 | Device detail (optional) 714 | User MSG Hash (optional) 716 | Match result 718 | Cluster ID 720 |
|---|---|---|---|---|---|---|---|---|---|

FIG. 7

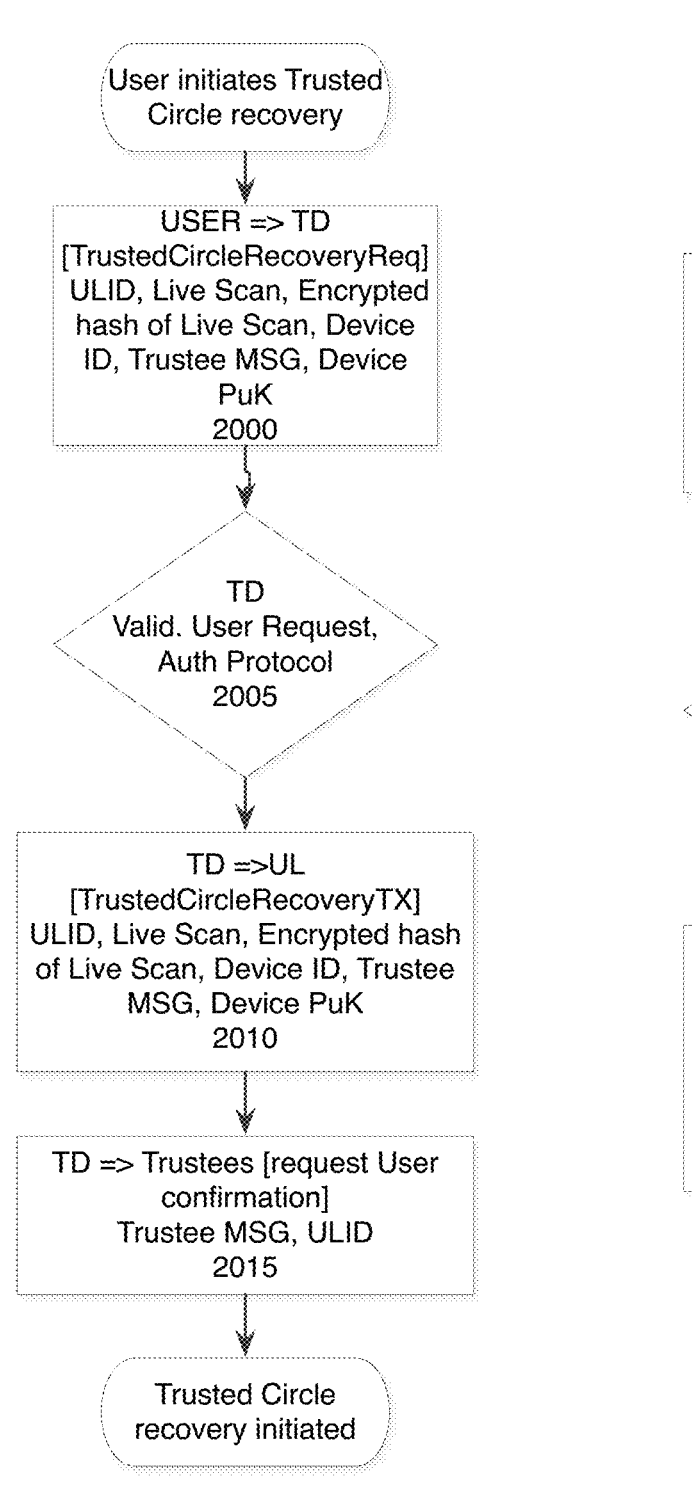

User initiates Trusted Circle recovery

USER => TD
[TrustedCircleRecoveryReq]
ULID, Live Scan, Encrypted
hash of Live Scan, Device
ID, Trustee MSG, Device
PuK
2000

TD
Valid. User Request,
Auth Protocol
2005

TD =>UL
[TrustedCircleRecoveryTX]
ULID, Live Scan, Encrypted hash
of Live Scan, Device ID, Trustee
MSG, Device PuK
2010

TD => Trustees [request User
confirmation]
Trustee MSG, ULID
2015

Trusted Circle
recovery initiated

FIG. 20

Trustee receives
request to confirm
USER in recovery

Trustee => TD
[ConfirmUserRecoveryReq]
Trustee ULID, Live Scan,
Encrypted hash of Live
Scan, Device ID, ULID of list
creator, Device PuK
2100

TD
Valid. Trustee Request,
Auth Protocol
2105

TD =>UL
[ConfirmUserRecoveryTX]
Trustee ULID, Live Scan,
Encrypted hash of Live
Scan, Device ID, ULID of list
creator, Device PuK
2110

Trustee confirmed
that he knows USER
in recovery

FIG. 21

Provider => Primary TD:
Request authentication service
3200

Primary TD <=> UL / AL:
Validate user, validate request, perform authentication
3205

Primary TD => Provider: return template hash and
matching outcome
3210

Provider: Compute ALID
3215

Provider <=> Secondary TD: retrieve AL record
3220

Provider <=> Secondary TD: verify ULID
3225

Provider <=> Secondary TD: verify Live Scan
3230

BIOMETRIC DATA SUB-SAMPLING DURING DECENTRALIZED BIOMETRIC AUTHENTICATION

RELATED APPLICATIONS

The present application is a continuation-in-part of U.S. patent application Ser. No. 17/013,772 filed Sep. 7, 2020; which is a continuation-in-part of U.S. patent application Ser. No. 16/964,981 filed Jul. 25, 2020; which is a 371 National Phase of International Patent Application PCT/US19/15465 filed Jan. 28, 2019; which claims priority of Chinese patent application no. 201810080360 filed Jan. 27, 2018.

TECHNICAL FIELD

The present disclosure relates in general to biometric authentication, and in particular to a decentralized platform for biometric authentication.

BACKGROUND

Biometric authentication is increasingly utilized as a mechanism for confirming an individual's identity in connection with varying types of transactions. For example, in recent years, smartphones have begun utilizing fingerprint sensors and/or facial recognition as biometric means of authenticating a user for, e.g., access to a device, access to confidential information stored within a device, or authorization of a transaction such as a purchase transaction.

However, conventional frameworks for biometric authentication may have numerous limitations. For example, typically, at least one entity involved in an authentication transaction must be a trusted party. Such platforms may be more vulnerable to code hacking, and suffer from a lack of auditability thus impairing trustworthiness. Matching biometric samples with templates is typically performed on a centralized server which lacks transparency and is prone to machine failure and adversary attacks. Biometric templates used for authentication and matching results are typically not recorded in immutable form, and therefore are of limited value in proving authenticity if a dispute arises. While biometric templates may be sensitive personal information belonging to their owners, in many biometric systems, users do not have authority to control access to their own biometric templates, including removal of access for stolen templates and template replacement.

For these and other reasons, the challenge of providing a scalable platform for biometric authentication with little or no centralization or trust requirement has been largely unmet.

SUMMARY

In accordance with some aspects described herein, a biometric authentication platform may use fault-tolerant distributed computing to determine if a supplied biometric sample and a sample stored in a registry are from the same person. A collection of reference samples is maintained in a distributed user ledger that may provide immutable history of modifications. Results of matching are stored in a separate distributed authentication ledger that may also provide an immutable history log. Coordinated use of both ledgers allows biometric authentication of registered users in real time. An immutable history log serves as a proof of authenticity and non-repudiation for external transactions that triggered biometric authentication by the platform.

In some embodiments, biometric authentication confirms the identity of an individual to validate a transaction with another entity. This other entity can be a person or a business such as a bank or hospital. The to-be-verified individual may be referred to herein as a User, and the other entity may be referred to as a Provider.

To register with the platform, a User may capture a biometric sample and upload it to the user ledger, such as via a transaction director. At authentication time, the User captures another biometric sample and sends it (e.g. via the transaction director) for matching with the previously recorded sample. The sample captured during registration may be referred to as a Template, and the sample captured during authentication may be referred to as a Live Scan.

A biometric authentication platform may be built on top of two independent distributed ledgers. One ledger is used to store Templates along with related user-specific data. This ledger is referred to herein as UL for "user ledger". The second ledger can be used to store authentication transaction records. Each time the platform receives a request to biometrically authenticate a registered user, biometric matching of Live Scan to Template may be carried out and the outcome may be saved as a transaction record in this ledger. This matching process is referred to herein as Authentication and the ledger may be called AL for "authentication ledger".

In some embodiments, with the exception of new User registrations, all requests handled by the platform may involve both ledgers. Processing flow sequencing is orchestrated by the transaction director or TD for short. Apart from coordination and sequencing of steps executed on UL and AL, TD software module also serves as a gateway connecting both ledgers to the outside world.

The AL and UL are logical representations. They can be implemented using the same physical networks or two physical networks that are completely separate from one another, by sharing nodes, or one network may be contained within the other.

Each ledger is preferably maintained by a network of interconnected nodes. Each of the AL nodes maintains a local copy of the entire AL. Each of the UL nodes also maintains a copy of the entire UL. Some of the transactions on the UL require access to the logs stored in the AL. This access is provided by either collocation of a pair of UL and AL nodes (e.g. attached to a transaction director) or by a network bridge between them.

Test tasks with known matching results may be inserted into a series of biometric matching requests, each including a biometric template and associated biometric live scan, sent from a transaction director to one or more processors executing a distributed authentication ledger smart contract. Test tasks may be interspersed into the series over time. A test task biometric template and associated live scan may be generated by the transaction director, or based on a biometric template and associated biometric live scan having a previously-verified matching result. The transaction director may then receive biometric matching results back from the processors in response to the series of requests. A determination may be made as to whether the matching results are valid by confirming if the matching results reported by the processors for test requests correspond to the test task matching result already known to the transaction director. If reported matching result differs from a known matching result, a reporting processor may be identified as having been compromised.

In some embodiments, biometric authentication may be performed in an environment having a distributed authentication ledger but without use of a distributed user ledger. A transaction director may receive a biometric authentication request that includes a template and live scan, from an external template-scan source, such as via an API. The transaction directory may then transmit an authentication task, also containing the template and live scan, to a processing cluster. Each processor within the cluster may computer a local matching result stored as a record in a local log, based on comparison of the template and live scan. The processing cluster may apply consensus rules to determining a consensus matching result, for storage in the distributed authentication ledger and reporting back to the transaction director. In some embodiments, the authentication request may include one or more optional attribute fields specified by the template-scan source, for storage by the processing cluster within the distributed authentication ledger. A cryptographic key may be included in the authentication task, for use in encrypting any instances of the biometric live scan or biometric template in local storage.

In some embodiments, the biometric template and live scan may be split into a plurality of corresponding subsamples. The processing cluster may include multiple subsample processing clusters (SSPC). Each processor within a SSPC may compute a matching result for a corresponding template/live scan sub-sample. Each SSPC may determine a consensus sub-result based on the sub-sample matching result for each processor within the SSPC. The processing cluster may then determine a consensus local matching result based at least in part upon the consensus sub-results. The consensus local matching result may be determined, e.g., by a weighted average of consensus sub-results, or a maximum or minimum of consensus sub-result values.

In some embodiments, the integrity of transaction director operation and results may be monitored via secondary channel audit. A computer requesting biometric authentication of a user may transmit a biometric authentication request to a primary transaction director, and receive a biometric matching result. The biometric matching result is also logged as a record in a distributed authentication ledger. The requesting computer may then query one or more secondary transaction directors for retrieval of the authentication record from the distributed authentication ledger, and the biometric matching result reported by the primary transaction director may be verified based at least in part upon the contents of the retrieved authentication record. For example, the requesting computer may verify that the authentication record comprises a unique ULID that matches a ULID contained within the biometric authentication request. The requesting computer may also query a secondary transaction director for retrieval of a biometric template hash associated with a ULID from the distributed user ledger, and confirm that the biometric template hash from the distributed user ledger matches a biometric template hash contained within the authentication record. The requesting computer may also verify that the live scan transmitted within the biometric authentication request matches a live scan utilized for generation of the authentication record.

These and other aspects of the systems and methods described herein will become apparent in light of the further description provided herein.

BRIEF DESCRIPTION OF THE DRAWINGS

FIG. 6 is a user authentication request.

FIG. 7 is an authentication ledger record.

FIG. 20 is a process for initiating a trusted circle recovery of a user record.

FIG. 21 is a process for a trustee receiving a request to confirm a user.

DETAILED DESCRIPTION OF THE DRAWINGS

Figure 1:
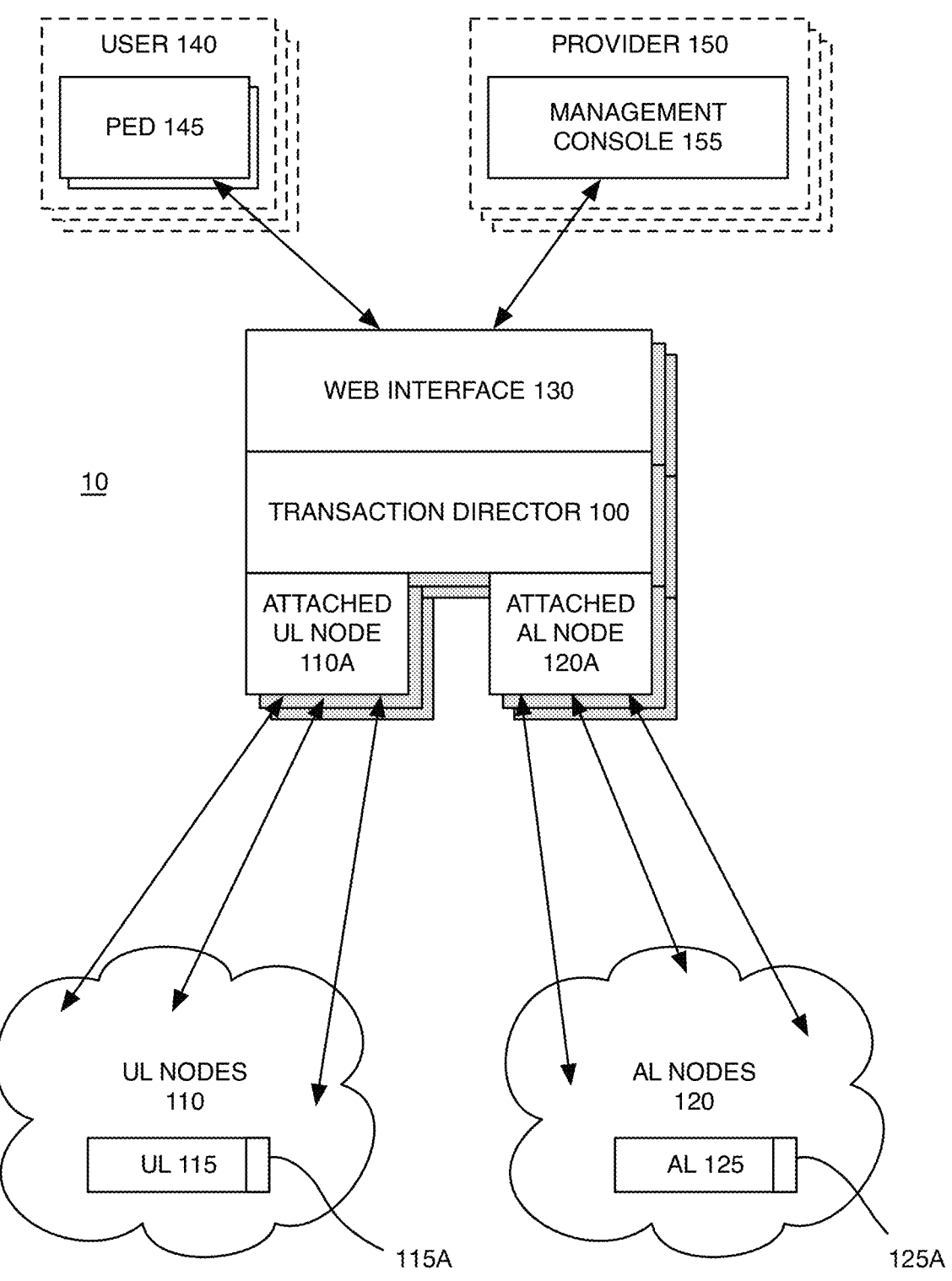
FIG. 1 is schematic block diagram of a platform for biometric authentication.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

Systems and methods are described which may include one or more characteristics that are highly beneficial for usability and market adoption of a biometric authentication platform. Such a platform will preferably have high availability, with the ability to maintain a high throughput regardless of total transaction volume. For example, maximum throughput may be limited wholly or primarily by total processing power available within a computing network. Network size may be dynamically adjusted to maintain consistent responsiveness. Such a platform is also preferably fault tolerant and designed to withstand multiple concurrent node failures. In some embodiments, a level of fault tolerance may be controlled in a network configuration.

Embodiments are also preferably wholly or highly decentralized and without a single point of failure. Such a platform may be deployed in a trustless environment without a governing body or any other authority participant. Platforms may be architected to assure data integrity and ease of auditing, by maintaining an immutable log of transactions. For biometric authentication, this enables the use of transaction records as a proof of authenticity. For a user registry, this facilitates data provenance inquiries and record history tracking. Platforms described herein may also protect confidentiality of biometric data, leveraging encryption and programmatically enforcing controlled data access. Such platforms may also be highly configurable and support installations ranging from a globally accessible public network, to a high-security isolated environment on a smaller scale.

FIG. 1 is a schematic block diagram illustrating a platform 10 for biometric authentication, in accordance with a first embodiment. The authentication platform 10 includes various network-connected computers, including transaction director (TD) 100, UL node network 110 implementing distributed User Ledger ("UL") 115, and AL node network 120 implementing distributed Authentication Ledger ("AL") 125. As described further hereinbelow, UL 115 may further run one or more smart contracts 115A; AL 125 may run one or more biometric matching algorithms 125A to reach decentralized consensus. TD 100 includes, or is attached to (e.g. functionally, logically, or via physical or equipment collocation) at least one node from each of node networks 110 and 120 (i.e. attached UL node 110A and attached AL node 120A). TD 100 further includes or interacts with web node interface 130. Web interface 130 provides a programmatic mechanism for network-based interactions between TD 100 and: a personal electronic device (PED) 145 utilized by User 140; and management console 155 associated with Provider 150.

In many embodiments, a user may use one or more trusted personal electronic devices 145 in order to interact with the transaction director or provider. Modern personal electronic devices may be particularly convenient, having fingerprint scanning or advanced imaging capabilities that may be utilized for capturing biometric samples. However, while the user device is illustrated in the embodiment of FIG. 1 as a personal electronic device, a User's registered device need not be so limited. It is contemplated and understood that a user 140 may utilize any computing device capable of network communications and interaction with the user, in place of PED 145. For example, a bank may require a customer (acting as a User) to authenticate himself or herself on site at the bank's premises using a computing device owned by the bank, such as an ATM machine. In such a use case, the device private key can be stored in a private database maintained by the bank and transferred to the ATM or computing device through its internal network during authentication. Similarly, it is understood that Provider management console 155 may be implemented using any of a variety of network-enabled computing devices.

In general, requests handled by biometric authentication platform 10 may be divided into two broad categories. Transactions resulting in the changed state of the UL 115 fall into a first category. New user registration, appending some relevant data fields to an already existing user record, disabling a record, etc. are all examples of such transactions. Transactions of this kind are typically not time critical by nature and can take seconds to execute without having a detrimental effect on the user experience. Transactions of a second category are Authentications logged in AL 125. These transactions typically require low latency and may be essential to the perceived responsiveness and overall usability of the platform.

Updates of UL 115 modify User records and should be authorized. This authorization should be carried out prior to execution of any ledger-changing transactions, other than new user registrations. A process of authorization can involve Template retrieval followed by Authentication. Upon successful Authentication, a UL 115—modifying transaction may be authorized and allowed to proceed.

The Transaction Director

One or more transaction directors may be included in embodiments of a system for biometric authentication. A transaction director ("TD") can play two roles: (1) the TD acts as a gateway, allowing Users 140 and Providers 150 to access data content and request services from UL 115 and AL 125; and (2) the TD coordinates step-by-step execution of requests received from Users 140 and Providers 150.

Thus, TD 100 implements a thin gateway for interactions amongst UL 115, AL 125, User 140 and Provider 150. As a gateway, TD 100 exposes APIs that can be called by client software such as a Web server, business-layer custom components, or the like.

As a transaction coordinator, TD 100 receives requests originated by Providers 150 or Users 140, and handles them following prescribed execution paths, including validation steps, UL queries, UL smart contract invocations, and Authentication Protocol invocations on AL 125.

While TD 100 may be considered centralized in terms of managing messages amongst other resources, TD 100 does not itself affect the authenticity of records stored in the UL 115 and AL 125, because UL 115 and AL 125 are only updated when consensus is made over a decentralized network (e.g. amongst UL nodes 110 and AL nodes 120, respectively). Further, in some embodiments, multiple instances of TD 100 may be implemented, each with attached UL and AL nodes, and preferably having an associated web interface 130. If, for example, a particular TD 100 is untrusted or a transaction party wishes to verify a TD's operation, a User 140 and Provider 150 can read back transaction records from a different TD (or multiple different TDs) immediately after a transaction occurs, in order to verify the transaction. Additionally or alternatively, a transaction participant may audit transaction records (and/or audit TD operation) at any time after a transaction is completed, by reading back transaction data from one or more TDs other than the one via which the transaction was orchestrated.

Attached UL node 110A maintains a copy of the UL 115 locally for TD 100. Similarly, attached AL node 120A maintains a copy of AL 125 locally for TD 100. Despite the fact that TD 100 has access to both ledgers via attached nodes 110A and 120A, TD 100 is incapable of directly modifying contents of either one of them.

TD 100 preferably need not implement business logic, but is rather stateless. TD 100 need not keep track of the state of the external protocols it is executing. Intermediate protocol-state-specific data used in some scenarios may be stored inside the affected UL record. This way, a large number of Users 140 and Providers 150 can interact via multiple instances of TD 100 concurrently, even when they are connected to the same UL 115 and AL 125. Handling of incoming service requests to TD 100 may be accomplished, and audited, in real time.

In general, TD 100 can orchestrate the following sequence of steps:

(1) Template retrieval. TD 100 requests a template from the local UL node 110A and gets an immediate response.

(2) Authentication of Template against Live Scan. TD 100 sends a Template and Live Scan to one or more Processor servers amongst AL nodes 120 (preferably Processor servers optimized for biometric matching). The Processor servers produce a result, returning it to TD 100. The Processor servers also add a record of the transaction to the AL 125. The duration of this step two hinges on the performance of these specialized servers.

(3) Execution of a transaction modifying UL 115 upon successful authorization in step (2). Execution of this transaction may be accomplished using a standard path of a smart contract. The transaction may be executed and validated in parallel on multiple instances within AL nodes 120. Process of validation may include a step where prior authorization from step (2) has to be verified. This verification is a query by a UL validating node 110 into the AL 125. This query can only produce a result after the AL 125 addition from step (2) has had enough time to propagate through the network of AL nodes 120. Once this happens and the query returns a result, smart contract processing can proceed, affecting the UL change that is eventually replicated across the entire network of UL nodes 110.

Operations within step (3) may take more time than those of steps (1) and (2). But, as it was stated earlier, transactions that include step (3) are typically not time critical. The significant majority of requests expected to be handled by the platform, in some embodiments, are initiated by Providers needing to confirm a User's identity. Such requests generate new AL records but do not affect the UL and, therefore, may be processed in steps (1) and (2) above, but need not proceed to step (3), whereby the platform may be capable of meeting high throughput requirements.

The User Ledger (UL)

User ledger (UL) 115 is a collection of user records. Each record corresponds to a registered User and stores a User's Template. UL 115 is preferably implemented using Distributed Ledger Technology. UL 115 is hosted on a network of interconnected computing devices, namely, UL nodes 110. Each node 110 preferably stores an identical copy of UL 115. UL 115 preferably leverages a number of key properties offered by the underlying technology, such as: byzantine fault tolerance; modifications to UL 115 are controlled by a distributed consensus protocol; UL 115 is decentralized (no central authority) except scenarios when it's deployed on a private network controlled by a single entity; UL 115 maintains an immutable history log, such that it is always possible to audit UL 115 and recreate its earlier state all the way back to UL's genesis; and all user data stored in the ledger is either encrypted or hashed, with the template possibly being scrambled using techniques described further hereinbelow.

The state of UL 115 is modified by submitting transactions to smart contracts executing on the ledger. History of transactions is persisted in the immutable log. Every time the state of UL 115 changes, it has to propagate through the entire network of nodes 110 storing a full replica of the ledger. This step causes latency. On the other hand, when client software, such as TD 100, reads data from UL 115, this process runs locally on a node 110A handling the request and may thus be executed with minimal latency.

Figures 2, 4:
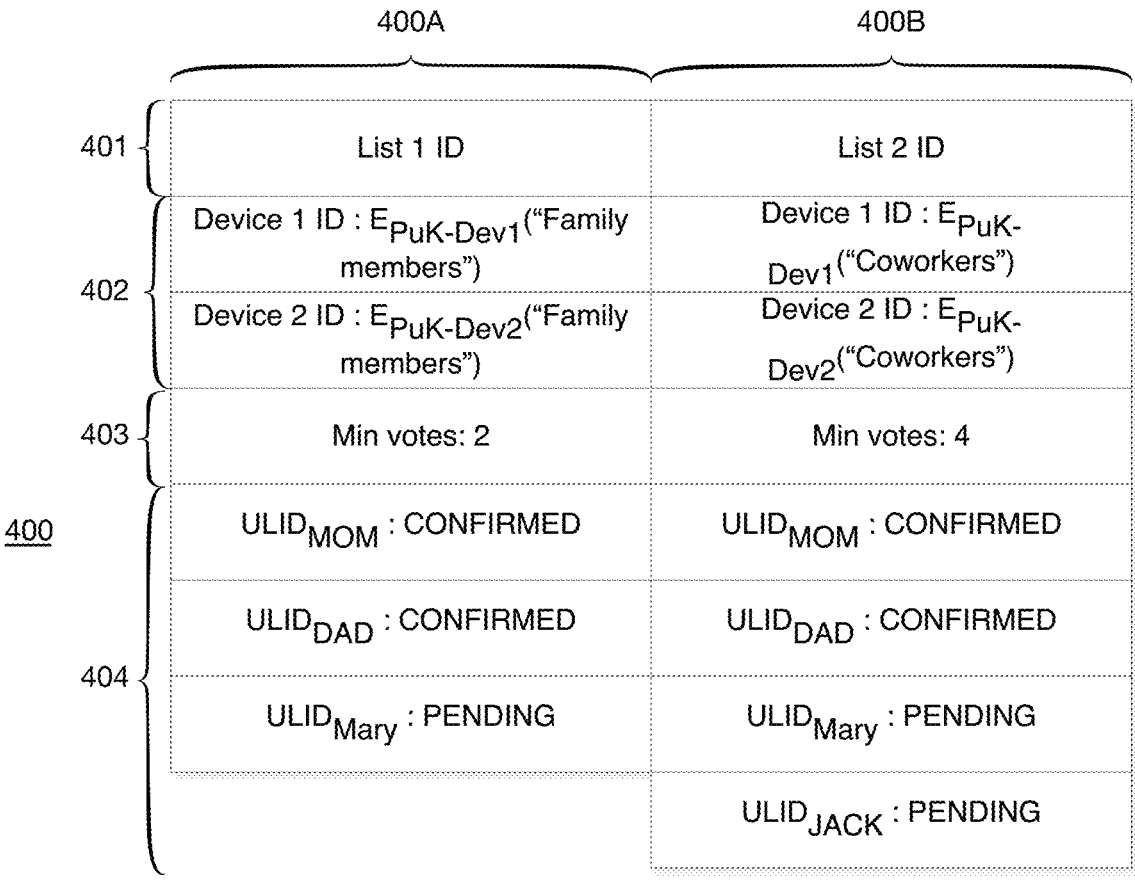
FIG. 2 is a user record diagram.
FIG. 4 is a set of Trusted List attributes.

FIG. 2 illustrates a typical ledger structure that may be utilized when a new User record is added to UL 115. The first field 200 is ULID—a unique identifier assigned to the record. This identifier may be a hash of a human-readable text supplied by the user. By default, users are preferably prompted to use their e-mail address but the system may accept any alphanumeric string as long as it results in a unique hash. The second field 210 is Template from the biometric sample supplied by User at registration. The contents of the first two fields may be fixed and never change after record creation.

The third field 220 reflects a current state of the user registration. Initially it is set to "ACTIVE", but it can also be set to "DISABLED" or "RECOVERY". In addition to the status setting this field may also contain some service information when a record is in RECOVERY. When status is set to ACTIVE, a service information portion of the field 220 may be empty.

The fourth field 230 is a nonce. Initially, it's set to zero. Every time a state of the record is changed by a smart contract, this field 230 is preferably incremented. The purpose of field 230 is to protect UL 115 from replay attacks.

The fifth field 240 contains information about the device used at registration. Other than new user registration, to be able to interact with UL 115, users must use one of their previously-registered devices. Registered devices can be mobile devices (such as a smartphone or tablet), or other electronic devices owned by the user. In some embodiments, a User may also utilize a shared device, or even a public terminal such as a bank automated teller machine (ATM), as a registered device, as long as the User trusts that device to be safe for storing private data including cryptographic keys used by the platform.

The fifth field 240 is an example of a UL record attribute. Even though a UL record must have at least one registered device attribute, any number of additional attributes can be appended to a record. More generally, three types of attributes may be attached to a record within UL 115: Registered Device, Provider Account, and Trusted List.

Figure 3:
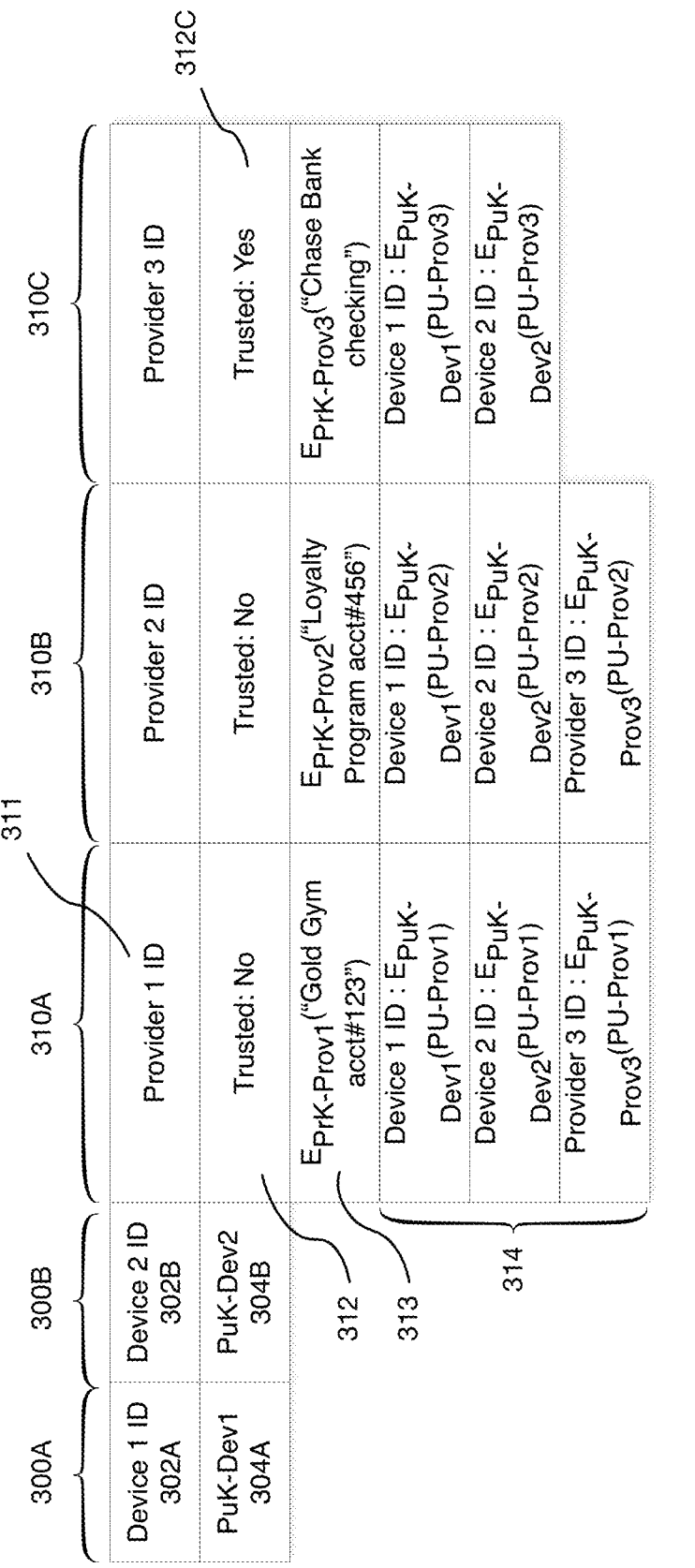
FIG. 3 is a UL record with provider account attributes.

FIG. 3 illustrates an exemplary set of UL record attributes with two Registered Devices and three Provider Accounts. (UL record ULID, Template, Status and Nonce fields are not shown in FIG. 3.)

A Registered Device attribute to a record within UL 115 (such as Attributes 300A and 300B in FIG. 3) may store information about devices that are authorized to produce Live Scans. A Registered Device attribute may consist of two fields: (1) a hash 302A-B of a hardware identifier for the device, such as an IMEI (which field may also be referred to as a Device ID); and (2) a public key 304A-B corresponding to the private key stored locally on a device referred to as PuK-Dev (described further below).

A Provider Account attribute stores information authorizing and enabling secure transactions between a User and particular Providers. Exemplary Provider Account attributes 310A, 310B and 310C are illustrated in FIG. 3. The User has registered three Providers: "Gold Gym acct #123" (associated with Provider Attribute 310A), "Loyalty Program acct #456" (associated with Provider Attribute 310B), "Chase Bank checking" (associated with Provider Attribute 310C). Chase Bank is "Trusted" (as indicated in field 312C) meaning that it is authorized to be used in a record access recovery protocol. Each Provider stores its private key (PrK-Prov1, PrK-Prov2 and PrK-Prov3) in an external database maintained by the respective Provider.

The Provider Account attribute may be constructed using a cryptographic public/private key pair. The Private Key is typically stored in a database maintained by a Provider associated with the attribute, and is never shared on UL 115.

In practice, a Provider Account Attribute such as attribute 310A may include four fields: a Provider ID 311, a Trusted Flag 312, encrypted account information 313, and a Public Key Translation Table 314. A Provider ID 311 may be formed from a hash of a public key for the Provider associated with the Attribute. Preferably, Provider IDs only exist in the context of a single User record, i.e., the same Provider will have different IDs for different Users. The Trusted flag 312 may be set to YES to indicate authorization for the Provider associated with the Provider Account Attribute to assist the User associated with the UL entry to assist in recovery of a UL record. Recovery procedures would typically be used when a User loses access to or control of all registered devices associated with a UL record. The encrypted account information field 313 is a description of the provider and/or of the account in free format. Text contents within encrypted account information field 313 is preferably encrypted using the Provider private key.

Public Key Translation Table 314 provides a cryptographic link enabling Registered Devices and Trusted Providers to recover a public key for a user, without storing the user's public key openly in UL 115. In particular, each Provider maintains a unique public key associated by the Provider with a specific User. This unique, user-specific public key may be referred to as PuK-ULID. PuK-ULID can be used to decrypt identifiable information about the Provider with which it is associated. To preserve confidentiality, the PuK-ULID is not openly stored in UL 115. Instead, PuK-ULID is preferably encrypted using a PuK-Dev associated with a registered device. Thus, a table row within Public Key Translation Table 314 for Provider 1 (i.e. Provider Attribute 310A) may contain a key-value pair of: Device 1 ID: $E_{PuK\text{-}Dev1}$ (PuK-Prov1); where the key is the ID of Device 1, and the value is the public key of Provider 1 encrypted with the public key of Device 1. To reverse this double encryption of user public key PuK-ULID, a Registered Device or Trusted Provider looks up its associated entry in translation table 314, retrieves the encrypted public key, and decrypts the user's PuK-ULID using its own local private key.

Since each registered device has its own PuK-Dev, multiple encrypted PuK-ULIDs are stored in a UL record; one for each registered device. Thus, in the example of FIG. 3, the User has registered two devices identified by hashes of their respective IMEIs: Device 1 ID and Device 2 ID. Private keys (PrK-Dev1, PrK-Dev2) are stored on the devices. Their respective public keys (PuK-Dev1 and PuK-Dev2) are stored in the second field of the attributes.

Trusted List Attribute

FIG. 4 illustrates Trusted List attributes 400A and 400B. Trusted List attributes 400A, 400B may be appended to a UL record and used in a Trusted Circle record recovery protocol as an alternative to recovery with the help of a Trusted Provider. Trusted List refers to a variable length list of users (Trustees) who can participate in a voting process to confirm identity of a User who lost all registered devices. There may be multiple Trusted Lists in one UL record (e.g. lists associated with attributes 400A and 400B, in the embodiment of FIG. 4). The same Trustee may appear in multiple Trusted Lists of a single UL record.

A Trusted List attribute 400 may be configured using a Registered Device (e.g. Device 1 associated with UL record field 300A and Device 2 associated with UL record field 300B). The Trusted List attribute 400 contains four fields: (1) a unique List ID 401, which may be automatically generated when the List attribute is created, as a hash of the data object with three fields (e.g. ULID, Device ID, hash of the list of trustee IDs); (2) an array of key-value pairs 402, with one pair per each Registered Device; the key is set to a Registered Device ID and the value is a description of the Trusted List encrypted with the device public key; (3) a minimum number of required votes 403; preferably, the User can set this number to be less than or equal to the total number of Trustees in the list; and (4) a List of Trustees 404. The List of Trustees 404 is a variable length array of key-value pairs. The key is a ULID of a Trustee. The value is Trustee's status. When a Trustee is first added to a Trustee List, the status is set to PENDING. After a Trustee confirms his or her participation, the Trustee's status changes to CONFIRMED. When a record recovery is in progress and Trustee responds with a vote, the Trustee's status changes to VOTED. Thus, for example, Trusted List attribute 400A is associated with two registered devices having key value pairs 402, has a list description of "Family members", requires at least two votes for recovery (specified in field 403), and includes a list of three Trustees in total ($ULID_{MOM}$, $ULID_{DAD}$, $ULID_{Mary}$). Trusted List attribute 400B is also associated with the user's two registered devices, has a list description of "Coworkers", requires at least four votes for recovery, and includes a list of four Trustees in total.

The Authentication Ledger

Figure 5:
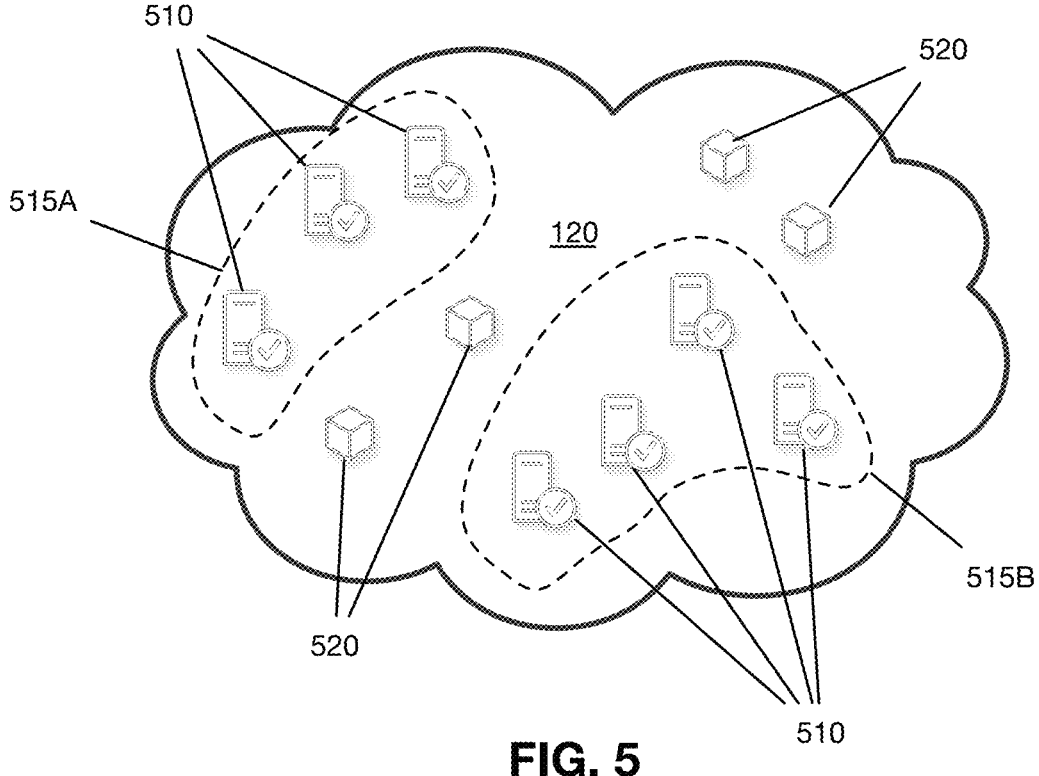
FIG. 5 is a schematic block diagram of an AL node network with multiple processing clusters.

Authentication Ledger is a collection of records that stores details of processed User Authentication requests. FIG. 5 provides a schematic block diagram illustrating AL nodes 120, implementing AL 125.

AL 125 is implemented using Distributed Ledger Technology. It is hosted on a network of interconnected computing devices referred to herein as nodes. Nodes 520 host AL 125 and interact with one another, and will Processors 510, to maintain AL 125. Processors 510 are nodes that also host specialized software responsible for the execution of biometric matching processing algorithms. Latency of Authentication request execution typically depends on the efficiency with which Processors 510 handle their computational tasks. Processors 510 should be implemented on hardware that is optimized for and capable of the biometric matching computations for which they will be used. In addition to processing Authentication requests, Processors 510 are responsible for storing the full logs of Authentication requests processed by them.

Some characteristics of AL 125 are defined by the selection of the underlying Distributed Ledger Technology platform and its configuration. For example, preferably AL 125 is: crash-fault-tolerant, unless installed on an insecure network where it may be byzantine-fault-tolerant; decentralized (no central authority) except scenarios where it's deployed on a private network controlled by a single entity; scalable to maintain required throughput; and immutable. Other preferred characteristics and benefits are domain-specific, for example: AL 125 maintains low latency using optimized hardware for biometric matching; and AL 125 supports real time audits. The size of AL 125 is optimized and transaction privacy is improved through the use of external storage for biometric data; to preserve auditability, AL 125 records store hashes of biometric data. Full logs of processed User Authentication requests are preferably stored externally. Further, AL 125 supports full biometric privacy mode where externally stored logs are encrypted.

FIG. 6 illustrates an exemplary User Authentication request 600 that may be transmitting by a TD 100 and implemented by AL nodes 120. ALID 601 is used as a record identifier in AL 125, and is determined (preferably computationally) by the instance of TD 100 that is submitting the request 600. TD 100 uses an appropriate technique for the calculation, to ensure a unique ALID for each transaction. For example, for a User Authentication request originated by a Provider 150, ALID 601 may be computed by hashing a data object comprising: a User ID (ULID), transaction information such as a hash of transaction data supplied by a Provider 150 (e.g. TX hash 610), and a Provider ID (such as a hash of a public key assigned to a User 140 by Provider 150 at Registration). For other types of requests, an ALID may be computed by hashing a data object with: ULID, Device ID (such as a hash of a hardware identifier associated with a device used in the request), and a nonce (i.e. a field of the User record that gets incremented each time the record is updated).

Timestamp 602 is obtained by TD 100 from its local environment and supplied with the request 600.

Live Scan 604 is supplied by the User 140 associated with request 600. As explained elsewhere herein, Live Scan 604 contains current biometric data from User 140, for which a comparison is requested with a User's Template. Template 606 specifies biometric information with which Live Scan 604 is to be compared. As described elsewhere herein, Template 606 may be retrieved from UL 115 by Transaction Director 110.

Encrypted HASH(Live Scan) 608 is supplied by the User 140, and may be used to verify the authenticity of Live Scan 604 during auditing. In particular, it may be decrypted by using a public key of one of the User's devices (PuK-Dev), and should equal the unencrypted hash of Live Scan data that is stored within the AL record, thus verifying, e.g., that the processed Live Scan was not switched with fake biometric data en route from the User device 145 to AL Processors 510.

TX Hash 610 provides a hash of Transaction details supplied by the Provider 150 that requested Authentication of User 140. The source of hash 610 may be a detailed record of a transaction between a Provider 150 and a User 140.

Device details 612 provides details descriptive of a device used by User 140 to produce or transmit Live Scan 604. For example, a User 140 may respond to an authentication request with a Live Scan, whether procured directly by a user PED 145 (e.g. a fingerprint scan, palm print scan or facial recognition data procured by sensors within PED 145), or procured by another source and transmitted by PED 145. When a User 140 responds to an authentication request with a Live Scan, software on User PED 145 may include encrypted detailed information retrieved from device, potentially via a device operating system (e.g. geo-location, SIM card information, IMEI, and the like) (subject to regulations and user privacy considerations), which information may be conveyed from PED 145 to transaction director 100 via, e.g., web interface 130. This field may be used when the Provider 150 that requested User Authentication requires such details to, e.g., confirm information about or impose constraints or requirements on the Live Scan source. The data within the device details 612 field may be encrypted with the requesting Provider's public key to avoid openly storing potentially private information concerning User 140 on a distributed ledger. Nonetheless, inclusion of transaction hash 610 and device details 612 in a record within AL 125 enables AL 125 records to be used as a proof of authenticity and non-repudiation for external transactions.

User MSG Hash 614 optionally includes a hash of the text message sent to the User 140 with a description of or reason for the requested authentication. The message is sent from Provider 150 and displayed to the User 140 in connection with agreement of User 140 to the requested biometric authentication. By performing biometric authentication, the User 140 authorizes a transaction described in the message. After the transaction, the full message is stored locally by User 140 and Provider 150, with MSG Hash 614 stored directly in AL 125. In a future audit event, one or both sides can present the full message and the User MSG HASH 614 can be retrieved from AL 125 and used to prove the authenticity of the presented message.

Cryptographic key 616 is optional, and includes a cryptographic key that may be used to encrypt the full biometric samples (Live Scan 604 and Template 606) supplied with the request 600, when stored locally by Processors 510. When this feature is used, future audit will only be possible by a party holding a key that's needed for decryption.

FIG. 7 illustrates a format for an AL record 700 stored within AL 125. ALID 702 is supplied with a request 600 in field 601. Timestamp 704 is supplied with a request 600 in field 602. Hash (Live Scan) 706 and Hash (Template) 708 are hashes of biometric samples supplied with the request 600. Encrypted HASH (Live Scan) 710 is supplied with the request 600 in field 608. TX Hash 712, device details 714 and User MSG Hash 716 are also supplied in the request 600 in fields 610, 612 and 614, respectively.

Field 718 contains the match outcome, which in some embodiments may be expressed as a yes/no result. Cluster ID field 720 contains an identifier for a processing cluster utilized to perform the matching operation yielding the result of field 718. This ID 720 can be used during audits for locating the original Authentication request record with full copies of Template and Live Scan (since that data is preferably stored locally by the Processor 520 performing the matching operation).

Handling of Authentication Requests

Each Authentication request is handled by a group of Processors 510, which may be referred to as a Processing Cluster. For example, in the embodiment of FIG. 5, AL nodes 120 include processing cluster 515A having three Processors 510, and processing cluster 515B having four Processors 510. In actual practice, processors 510 may be allocated to processing clusters with an objective of achieving fault-tolerant operation. AL 125 is built on transaction-level consensus. Processors 510 within a single Processing Cluster 515A, 515B receive an Authentication request, process it and agree on the Authentication outcome. This decision is final and is saved in the AL 125. If for some reason Processors 510 within a Processing Cluster 515A or 515B are unable to reach consensus (e.g. a majority of the Processors 510 within a Cluster 515 fail and/or lose connectivity), the Processing Cluster 515A or 515B returns a failure result to the requestor, but wrong Authentication outcome never gets written into AL 125.

AL nodes 120 can be set up in different environments in terms of security. The most critical components of AL nodes 120, the Processors 510, may be hosted in a tightly controlled secure environment where a main concern would be an intermittent connectivity loss or some other hardware failure rather than Processors 510 being hacked in such a manner as to control majority voting and produce false results. In this environment, Processing Clusters 515A, 515B can be configured to use one of the Crash-Fault-Tolerant distributed consensus algorithms that offer better performance and smaller Cluster size compared to the Byzantine Fault Tolerant family of protocols. The latter are designed to deal with a public network that is likely to contain misbehaving nodes, and therefore will require more Processors 510 in the Cluster 515 and will thus typically be slower to reach a consensus.

Additional methods and configurations may be used in setups where Processors 510 operate in a less secure environment. Reliability of results can be improved by using security auditing software that feeds preprocessed Template-Live Scan pairs to the Processors 510 and compares the generated results with pre-calculated values as described elsewhere herein.

Another way of monitoring security is by setting up a monitoring station that selectively intercepts incoming Template-Live Scan pairs, processes them locally, and compares the result with the one produced by a Processing Cluster 515A, 515B to which the comparison is assigned.

Processing Clusters 515 may be virtual groupings in a sense that Cluster members 510 do not necessarily need to share the same hosting facility: physical or cloud. AL 125 is preferably designed for scalability. Whenever a lack of processing capacity becomes a performance issue, more processors 510 may be added to AL nodes 120 in order to address the problem. Processing Clusters 515 can be formed dynamically for load-balancing optimization. Distributed Processing Cluster colocation may also be used to improve decentralization and eliminate a central hosting authority that might otherwise be effectively imposed on AL 125 if processors 510 were collocated in a single hosting facility or commonly-controlled hosting facilities.

Except for failed consensus situations on the cluster level, each User Authentication request results in a record added to AL 125. To facilitate audits, it may be necessary to store biometric data used by the Authentication request so that authentication matching results can be reproduced. However, some types of biometric data that may be desirable for use in authentication may involve significant volumes of data. Moreover, while each of AL nodes 120 is expected to host a full replica of AL 125, many AL nodes 120 may not be powerful Processor stations 510, such that storing each transaction's biometric data within the distributed ledger may impose significant storage burdens. To reduce required storage capacity for AL nodes 120, in some embodiments, each AL record will only include the hash of the processed request, as described above. A full copy of the request will preferably be stored by some or all of Processors 510 on a high-capacity fault tolerant storage media. This arrangement may significantly reduce the size of AL 125 while preserving its full auditability.

In some embodiments, AL 125 may support a full biometric privacy mode of operation. In this mode, externally stored logs of User Authentication requests are encrypted.

Transaction Director Request Handling

Requests handled by TD 100 may fall into at least two broad categories: (1) requests from Users 140; and (2) requests from Providers 150. Note that preferably, requests are always signed and the digital signatures of Users 140 and Providers 150 are verified by TD 100. For simplicity, the application and verification of digital signatures may not be explicitly listed in processes described hereinbelow.

Figure 8:
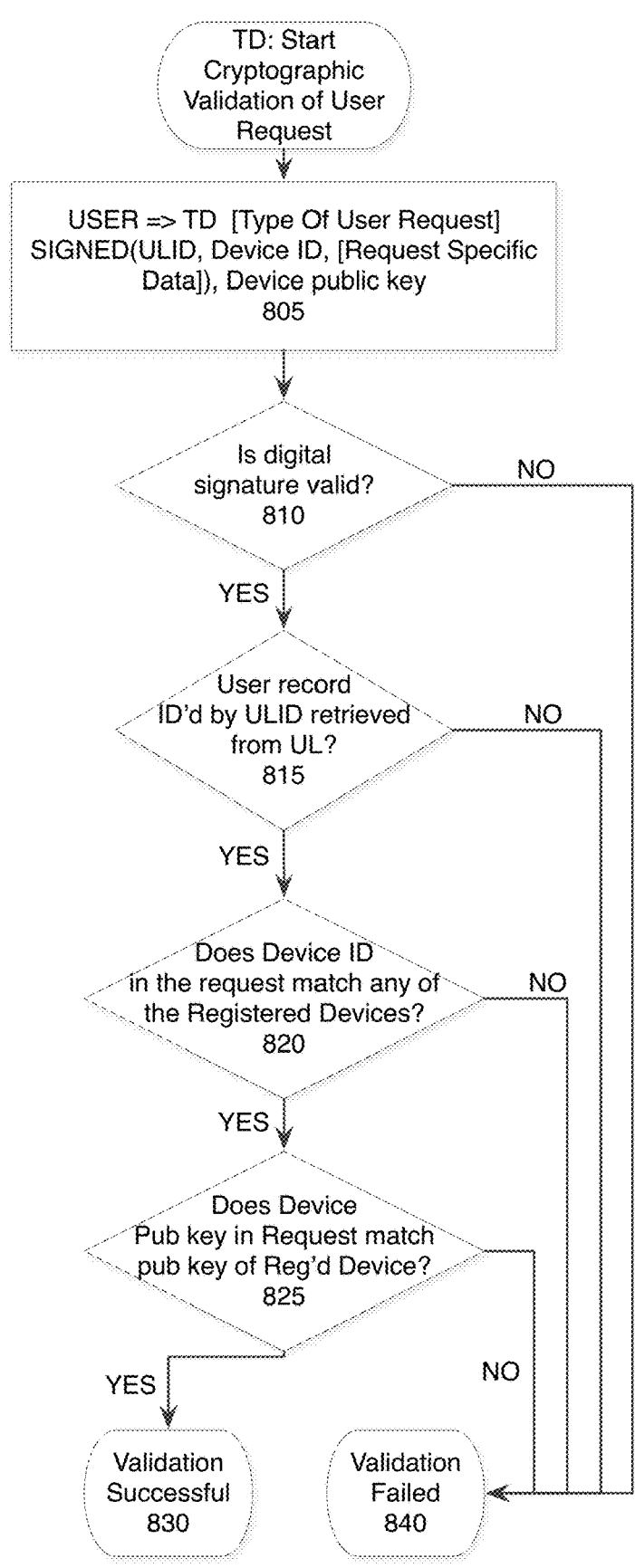
FIG. 8 is a process for validation of a user request.

FIG. 8 illustrates a method by which a transaction director may process a User request. This method may sometimes be referred to as Cryptographic Validation of a User Request. In step 805, a user 140 transmits a request to TD 100 via web interface 130. Request messages sent to TD 100 by a User 140 preferably include the following fields: User ID (UL record identifier ULID); Device ID (Hash of the hardware identifier of the device); and Request-specific data. The Request is signed by a User 140 with a private key stored locally on the user's device 145. A respective public key is attached to the message.

In step 810, TD 100 validates the digital signature applied to the Request. In step 815, TD 100 validates the User ID specified in the Request. Validation in step 815 succeeds if TD 100 is able to retrieve from UL 115 a copy of the User record identified by the ULID received in step 805. In step 820, TD 100 validates the requesting device 145 by finding the Device ID received in step 805 amongst Registered Devices in the User record retrieved in step 815. In step 825, TD 100 validates the public key supplied in step 805 by checking to confirm that it matches the public key of the Device ID in the User record retrieved in step 815. In any of the validations in steps 810, 815, 820 or 825 fails, then the overall User request is deemed to have failed (step 840). However, if the validations in steps 810, 815, 820 and 825 all succeed, then the overall validation effort is deemed successful (step 830).

In some scenarios, such as record recovery or new device validation, only one of steps 810-825 may be performed, with the remaining steps skipped.

Figure 13:
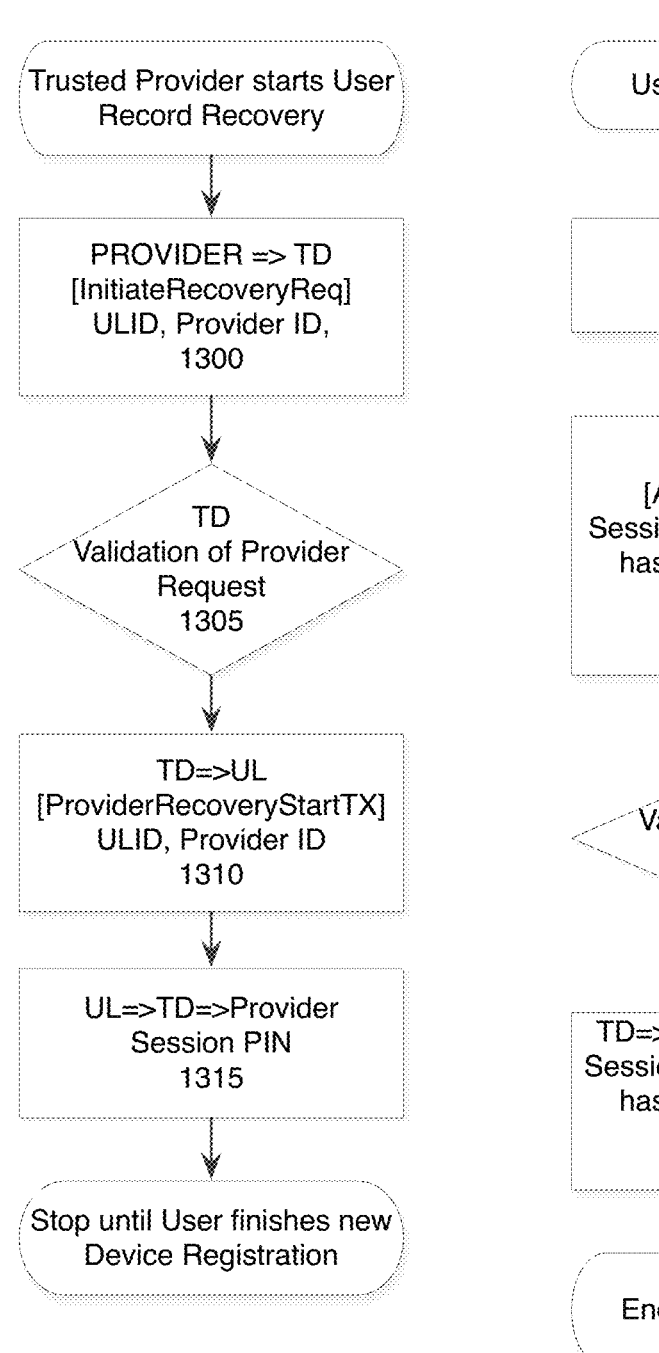
FIG. 13 is a process for trusted provider initiation of a user record recovery.
Figure 14:
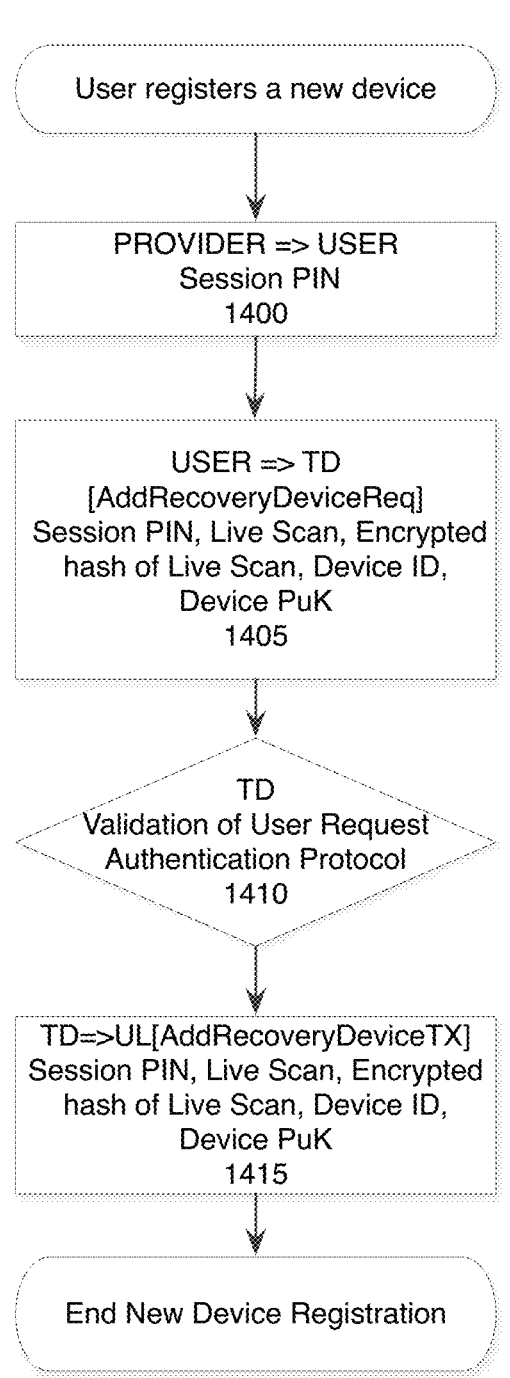
FIG. 14 is a process for user registration of a new device during trusted provider user record recovery.

In a Trusted Provider recovery, the ULID check in step 815 is replaced by a Recovery Session PIN check, as explained further in connection with FIGS. 13 and 14.

Figure 9:
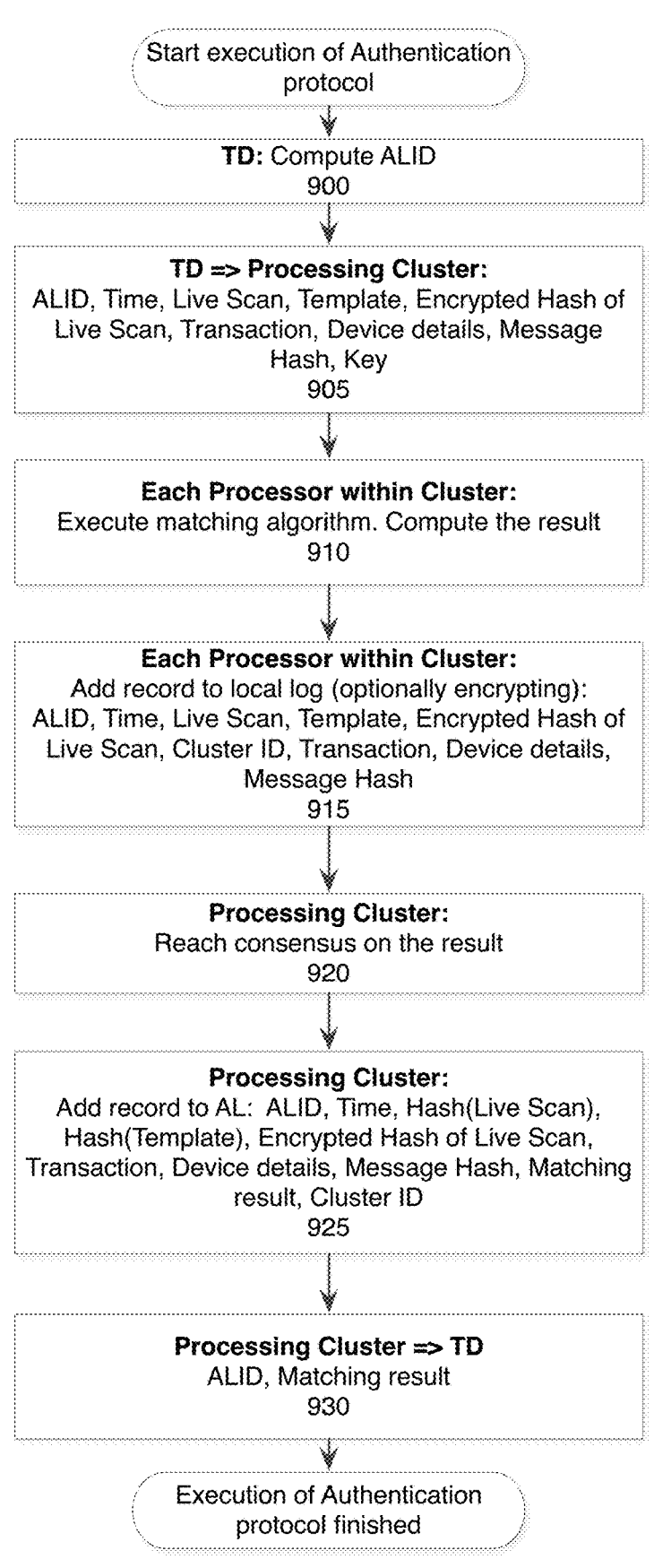
FIG. 9 is a process for an authentication protocol.

In the event that a User Request is successfully cryptographically validated (step 830), TD 100 may continue processing, such as via execution of an Authentication Protocol. FIG. 9 illustrates an exemplary Authentication Protocol method.

In step 900, TD 100 computes an AL record ID ("ALID"), as described elsewhere herein. In step 905, TD 100 sends a request 600 to a Processing Cluster (515A, 515B). The content of the request of step 905 is illustrated and explained in connection with FIG. 6.

In step 910, each of the processors 510 within a processing cluster (e.g. 515A or 515B) executes a biometric matching algorithm on Template 606 and Live Scan 604, and computes a result. In some embodiments, the result is an affirmative or negative indication that the Live Scan matches the Template.

In step 915, each processor 510 within the selected processing cluster (515A, 515B) adds a record documenting the processed request 600, to a local log maintained by the processor. The record added in step 915 preferably includes complete copies of the Template and Live Scan used in generating the result computed in step 910. If request 600 contained a cryptographic key 616, cryptographic key 616 is used to encrypt the record prior to storage in step 915.

In step 920, processors 510 within the selected processing cluster (515A, 515B) seek to agree on a matching result, following rules prescribed by a consensus protocol governing the cluster.

In step 925, the processing cluster (515A, 515B) adds a record of the Authentication request 600 to AL 125. In the record 700 logged in AL 125, the live scan content is replaced by live scan hash 706, the template content is replaced by template hash 708, and cluster ID field 720 is added, as described further elsewhere herein.

In step 930, the processing cluster (515A, 515B) sends the ALID and matching or Authentication result to TD 100, reporting completion of the authentication protocol.

Subsequent actions by TD 100 depend on the nature of the User Authentication request. In a case where a User Authentication is requested by a Provider 150 that is transacting with a User 140, TD 100 in turn finishes processing and returns an ALID and matching result to the calling Provider 150. In other cases, TD 100 may proceed by calling a smart contract 115A on UL 115 supplying data present in the User Request. In other scenarios, TD 100 may proceed by sending notifications to User devices, or other actions as desired to utilize the authentication result returned in step 930.

Figure 10:
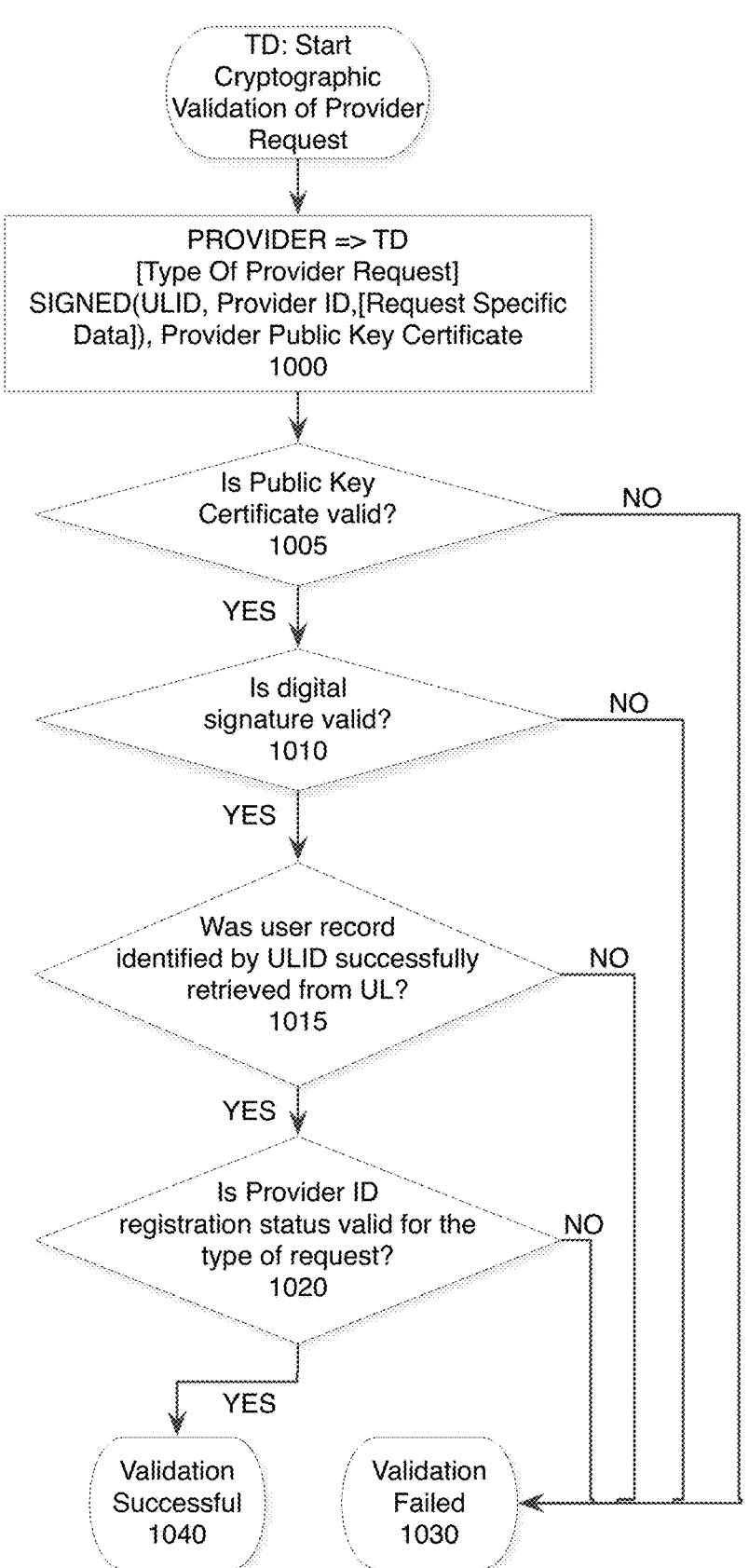
FIG. 10 is a process for validation of a provider request.

A transaction director may also process requests from Providers 150. FIG. 10 illustrates a process for cryptographically validating a message or request from a provider 150. In step 1000, a Provider 150 transmits a Request to TD 100 via web interface 130. This request may contain the following fields: a ULID; a Provider ID (such as a hash of the public key that was assigned to a User 140 by a Provider 150 during Provider Registration); and request-specific data. Such a provider request may be signed with the private key held by the Provider 150. A corresponding public key certificate may be attached to the message.

In step 1005, TD 100 verifies the validity of the Public Key Certificate contained within the request of step 1000. In step 1010, TD 100 validates a digital signature applied to the Provider Request. In step 1015, TD 100 validates the ULID specified in the request of step 1000. Validation in step 1010 succeeds if TD 100 is able to retrieve a copy of the User record identified by the ULID within the Request from UL 115. In step 1020, TD 100 checks if the requesting Provider 150 has been authorized by the User 140 specified in the request. A Provider ID supplied with the request in step 1000 has to match one of the Provider IDs found in the User record (e.g., within a Provider attribute (310A, 310B, 310C)). If TD 100 is processing a request to add a new Provider 150 and the associated Provider ID is already registered, validation results in failure (step 1030). Moreover, execution of the Provider Request is aborted on failure of any of the validations of steps 1005, 1010, 1015 or 1020. Otherwise, presence of the Provider ID in the record is interpreted as successful cryptographic validation (step 1040).

Addition of a Provider Account to a User Record

Preferably, to be able to request User Authentication, a Provider has to be authorized by the User. This authorization may come in the form of a Provider Account attribute attached to the User Record, as described elsewhere herein.

Some Provider Accounts can also be designated as "Trusted" indicating that they are authorized to assist a User in record recovery should the User lose all of his or her Registered Devices. In some embodiments, a user record in a database maintained by a Provider 150 already has a ULID and a pair of keys created by the Provider (namely, PrK-ULID(private) and PuK-ULID(public).) Provider Account attributes in records within UL 115 are identified by a Provider ID that is a hash of PuK-ULID.

Figure 11:
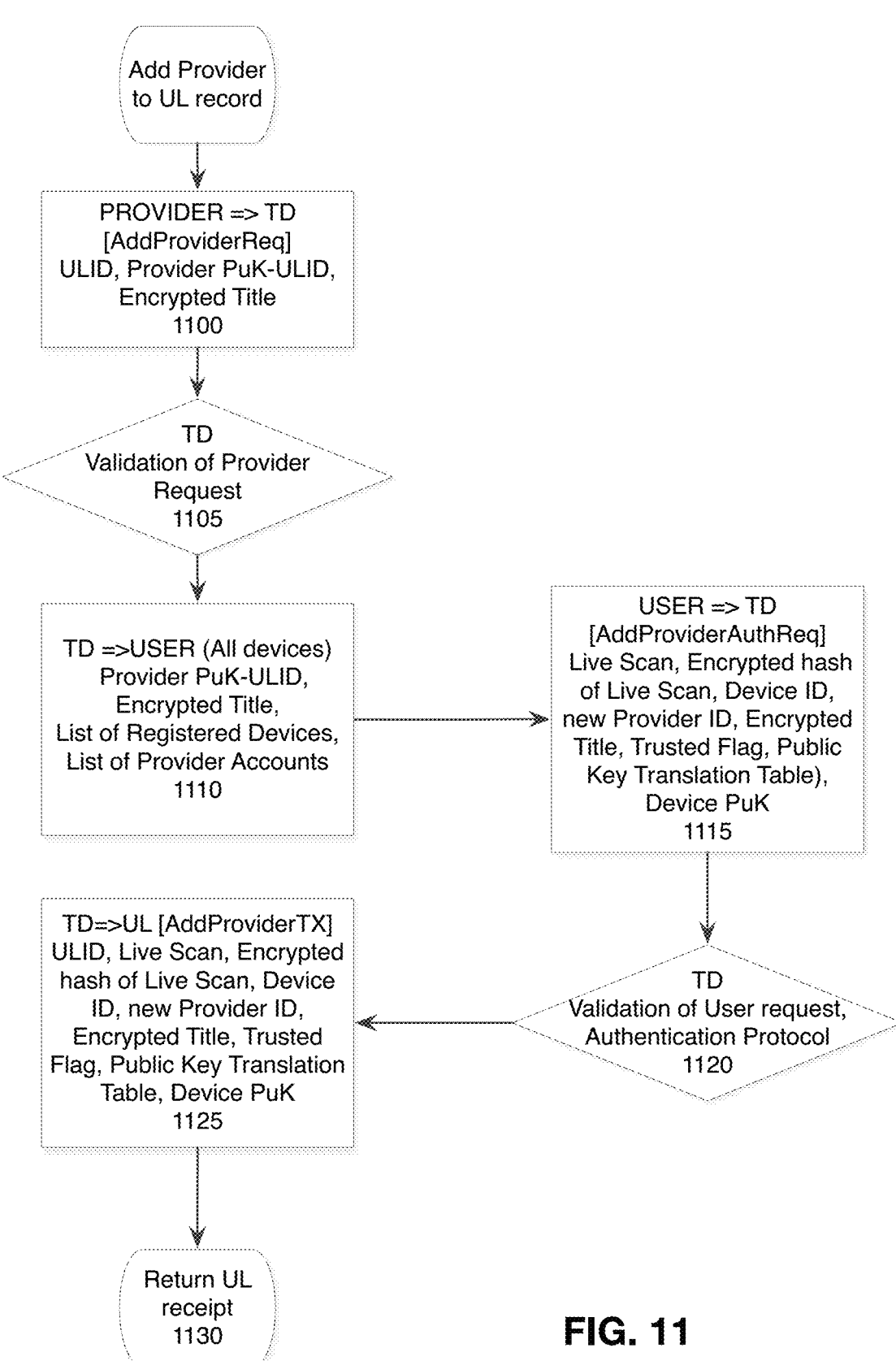
FIG. 11 is a process for adding a provider to a user ledger record.

In this context, FIG. 11 illustrates an exemplary process for addition of a Provider Account to a User record within UL 115. In step 1100, a Provider 150 sends to TD 100 an "Add Provider" request containing a user record ID (ULID), PuK-ULID, and a Provider title encrypted with PrK-ULID. In step 1105, TD 100 runs a Cryptographic Validation of Provider Request protocol, as described in connection with FIG. 10. In step 1110, using data from the User record retrieved by TD 100 in step 1105, TD 100 sends notifications to all User Registered Devices containing the Provider public key PuK-ULID, an encrypted title, a list of Registered Device Attributes, and a list of Provider Account attributes marked "Trusted".

In step 1115, an application running on User device 145 maintains a ULID and private/public key pair in local storage. PED 145 receives the message from TD 100 sent in step 1110, and decrypts the public keys of Trusted Providers from the list of Provider Account attributes. PED 145 further builds a Public Key Translation Table for the new Provider Account attribute. PED 145 creates a new Provider ID by hashing PuK-ULID. PED 145 then sends to TD 100 an "add provider authorized" request with Live Scan data, an encrypted hash of the Live Scan, Device ID, new Provider ID, Encrypted Title, a Trusted setting, and a Public Key Translation Table.

In step 1120, TD 100 runs protocols for Cryptographic Validation of User Request (as described in connection with FIG. 8) and Authentication (as described in connection with FIG. 9). In step 1125, TD 100 forwards a full copy of data received from PED 145 (and a software application executed thereby) to a smart contract 115A running on UL 115. The smart contract 115A validates the request and updates UL 115 with a new version of the User record containing a newly added Provider Account attribute. In step 1130, TD 100 receives confirmation of the transaction, relaying it to the Provider 150.

Exemplary Provider Requests for User Authentication

In an exemplary embodiment, a customer may request a service from a service provider. The service provider desires to confirm that the registered customer is indeed the person requesting the service. In such a scenario, the service provider can do so by using a biometric authentication platform that already contains a reference biometric sample of the customer. As an added benefit, the platform may allow saving of transaction details along with a record of the authentication result in an immutable log. The Provider can obtain a copy of this record at will and use it as proof of the authenticity of past transactions.

There are a wide array of business scenarios and Provider types where User Authentication requests may be beneficially used. For example, banks can add and enforce biometric authentication requirements to the process of contactless payments. In another example, biometric authentication can be added to online payments and replace or enhance the popular "3-D Secure" protocol. In yet another example, biometric authentication can be used instead of an ID card in all scenarios where a customer registers first, and obtains a product or service later, such as: gym membership, tickets purchased online, etc.

Figure 12:
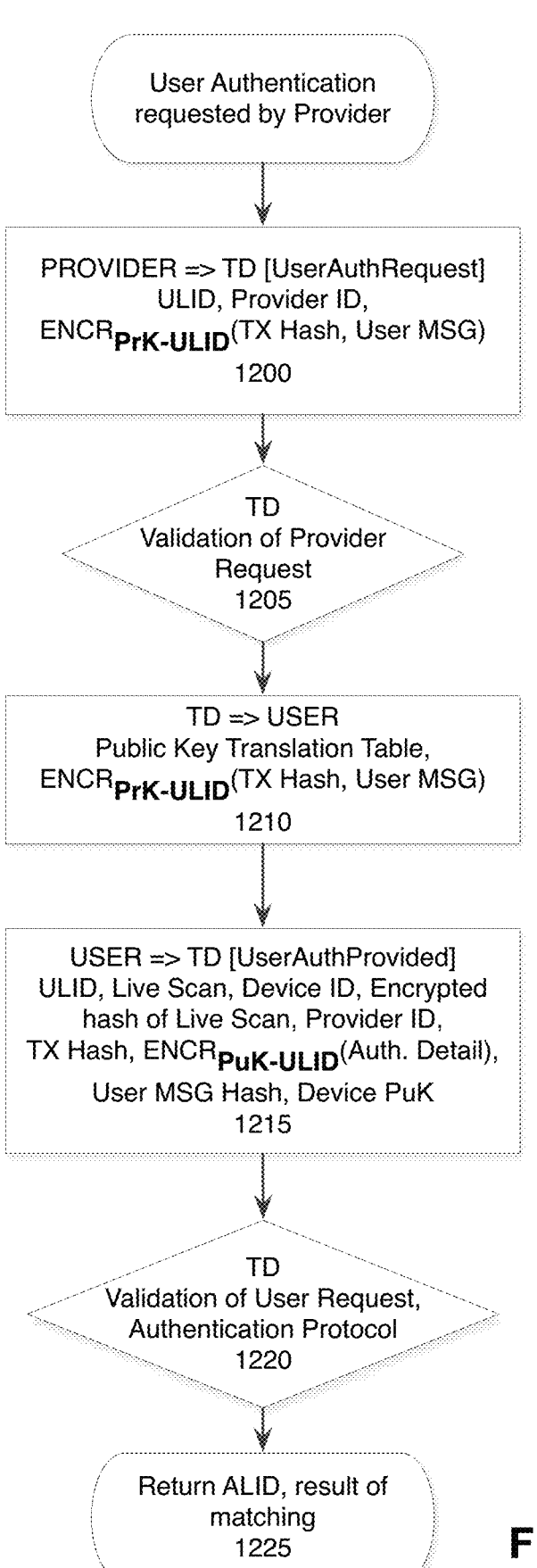
FIG. 12 is a process for user authentication requested by a provider.

FIG. 12 illustrates an exemplary process for implementation of such user authentication scenarios. In step 1200, a Provider 150 sends a "User Authentication Request" request to TD 100. The Request of step 1200 includes ULID, Provider ID, and $ENCR_{PrK-ULID}$(TX hash, User MSG). The Request may be formed by Provider 150 by, e.g., retrieval of User-specific information from a Provider-maintained database, such as ULID, private key assigned to the User by the Provider (PrK-ULID), and a corresponding public key (PuK-ULID). The Provider 150 puts together transaction details such as transaction amount, time, merchant information, and other information that may be relevant to a particular transaction. A transaction hash ("TX hash") is created by hashing this data together. This hash will subsequently be stored immutably in AL 125 as part of the Authentication request record. Provider 150 may generate a text-based message ("User MSG") that a User 140 will see on the user's PED 145, such as, "This is your bank. Please confirm the charge of $500." As described elsewhere herein, full copies of this message may be retained in the logs of the Provider application (e.g. accessible by management console 155) and the user application (e.g. executed by PED 145). Meanwhile, the hash of this message will be stored immutably in AL 125 and can be used as proof of the content of the original message. Provider 150 uses its private key to encrypt the data pair consisting of the transaction hash and the text message, to produce $ENCR_{PrK-ULID}$(TX hash, User MSG).

In step 1205, TD 100 runs a Cryptographic Validation of Provider Request protocol, as described in connection with FIG. 10. In step 1210, using a User record retrieved in step 1205, TD 100 sends notification to all Registered Devices (i.e. PEDs 145) attaching the Public Key Translation Table assigned to the requesting Provider 150, and the unmodified $ENCR_{PrK-ULID}$(TX hash, User MSG) from step 1200.

In step 1215, User 140 (via PED 145) responds to TD 100 with a User authentication response. In some embodiments, the User authentication response may be formed in accordance with the following steps. Each PED 145 maintains a ULID and private/public key pair in local storage. A user application on PED 145 hashes its hardware identifier and uses it for the Public Key Translation Table lookup. PED 145 locates a corresponding entry with the encrypted copy of the Provider public key PuK-ULID, and decrypts it using the local private key. PED 145 uses PuK-ULID to decrypt the encrypted data pair $ENCR_{PrK-ULID}$(TX Hash, User MSG). PED 145 hashes PuK-ULID to produce the Provider ID. PED 145 may then display the decrypted User MSG on, e.g., an associated device screen. This message prompts User 140 to provide a Live Scan. PED 145 may also capture additional information in accordance with Provider requirements (e.g. local time on PED 145, phone number information, geolocation of PED 145, etc.) This additional information may be encrypted with the PuK-ULID, creating $ENCR_{PuK-ULID}$ (Auth. Detail). PED 145 hashes the User MSG. PED 145 hashes the Live Scan and encrypts the Live Scan hash with the local private key on PED 145. PED 145 may then send to TD 100 the "User authentication response" message with ULID, Live Scan, Encrypted Hash of Live Scan, Device ID, TX hash, Provider ID, encrypted authentication details, and a hash of the User MSG.

In step 1220, TD 100 performs a Cryptographic Validation of User Request protocol and an Authentication Protocol, as described in connection with FIGS. 8 and 9, respectively. Finally, in step 1225, TD 100 returns the ALID and matching result to the requesting Provider 150.

Exemplary Use for Biometrically Authenticated Signed Documents

In some embodiments, the biometric authentication platforms and processes described herein may be utilized for a variety of diverse applications. One such application is biometric authentication of signed documents. Transaction data that is hashed to produce a TX hash (e.g. TX hash 610, 712) may include more than just a collection of bookkeeping fields, such as "Paid to: XXX; Payee Bank: YYY; Amount paid: ###." Instead the transaction description may contain information of independent significance, such as the content of a document.

For example, AL records may be used as proof of authenticity of legal contracts, as demonstrated in the following scenario. A User 140 may be in a rental office, prepared to sign a rental agreement. The parties may sign a contract. The Rental office party to the contract may be deemed a Provider 150 and registered on UL 115. The rental office (i.e. Provider 150) may scan the signed contract, and hash the digital file corresponding to the signed contract. The hashed digital file may be used as TX hash (e.g. in fields 610 and 712). The rental office, as Provider 150, requests User Authentication, supplying a text message with the contract number as a User MSG. This process creates a record on AL 125 that permanently links the hash of the scanned contract to the User's "biometric signature". In the future, the renter (User 140) would not be able to claim that its signature on the contract is forged or otherwise inauthentic. Likewise, the rental office (Provider 150) would not be able to modify the content of the originally-signed paper document without the modification being reveals by subsequent authentication. In this way, by hashing a scanned copy of a document as the TX hash, authenticity of the document may be verified using systems and methods described herein.

Record Recovery by a Trusted Provider

Should a User 140 lose all of his or her Registered Devices, Providers designated as "Trusted" can assist in registering a new device which effectively restores a User's ability to use his or her UL record within UL 115.

FIG. 13 illustrates an exemplary process for initiating a User Record Recovery by a Trusted Provider. In step 1300, a Provider 150 sends a request to initiate recovery ("InitiateRecoveryReq") to TD 100. The InitiateRecoveryReq contains a User record ID (ULID) and Provider ID. In step 1305, TD 100 runs the Cryptographic Validation of Provider Request protocol. If successful, in step 1310, TD 100 sends the ULID and Provider ID received in the InitiateRecoveryReq to a smart contract 115A on UL 115, which (a) changes the user record state 220 from ACTIVE to RECOVERY, and (b) creates a unique Session PIN. The Session PIN can be used in validation when a User 140 proceeds to add a new device. The Session PIN is introduced in order to ensure that a Trusted Provider and User are communicating and verifying each other while going through the protocol steps, as described. The Session PIN may be saved in registration state field 220 of a UL record, as described elsewhere herein. In step 1315, the smart contract 115A on UL 115 returns the Session PIN to TD 100, and TD 100 forwards the Session PIN to Provider 150—at which point Provider 150 waits for User 140 to register a new Device.

FIG. 14 illustrates a process via which User 140 may subsequently register a new Device. In step 1400, Provider 150 provides User 140 with the Session PIN returned in step 1315. The Session PIN may be provided, for example, in person, or via telephone. User 140 enters the Session PIN in a new PED 145, and produces a Live Scan. In step 1405, User 140 (e.g. via new Device PED 145) sends to TD 100 a request to add a recovery device ("AddRecoveryDevice-Req"), containing the Session PIN, Live Scan, an encrypted hash of the Live Scan, a hash of the device hardware identification (Device ID), and the local device public key.

In step 1410, TD 100 runs Cryptographic Validation of User Request and Authentication protocols, as described elsewhere herein. In step 1415, TD 100 forwards information received as a result of step 1410 to a smart contract 115A on UL 115, which updates the User record, adding a new Registered Device Attribute corresponding to the new Registered Device PED 145, thus completing the new device registration.

Figure 15:
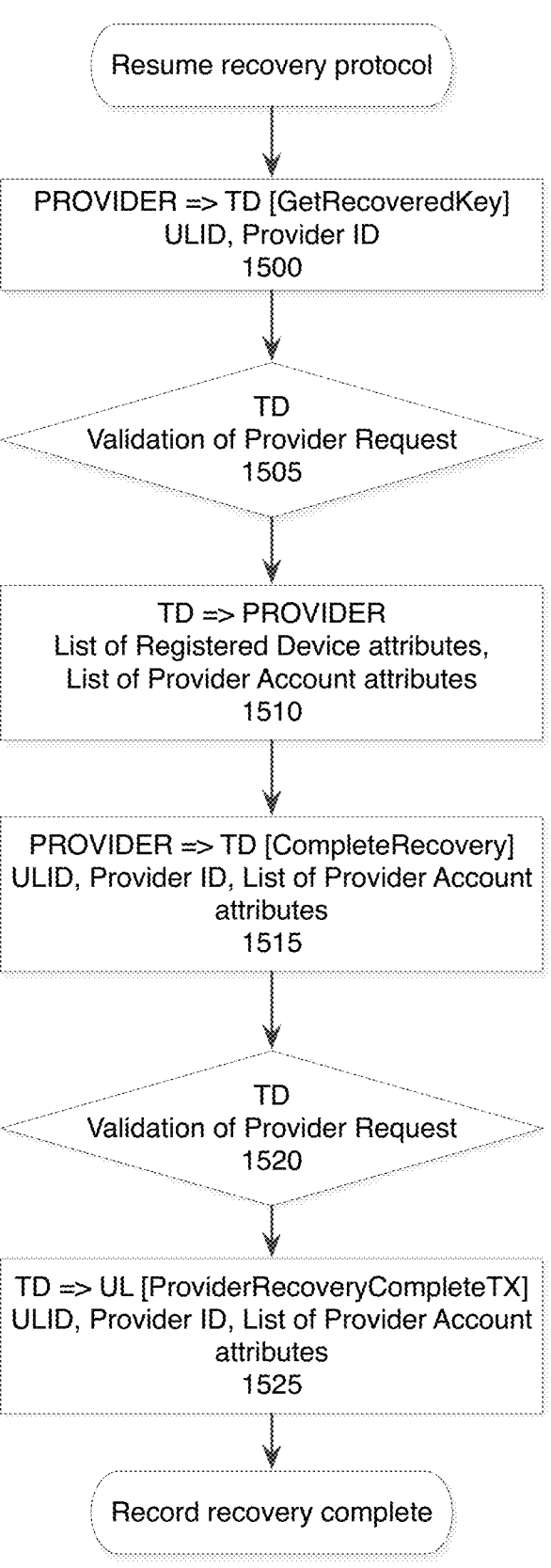
FIG. 15 is a process for completing a trusted provider user record recovery.

However, at this point, the User's Record in UL 115 is still marked in a RECOVERY status. FIG. 15 illustrates a final phase for Record Recovery by a Trusted Provider. In step 1500, Provider 150 sends to TD 100 a request to get the recovered key ("GetRecoveredKey"), which includes a ULID associated with the User record, and a Provider ID. In step 1505, TD 100 executes a Cryptographic Validation of Provider Request protocol. In step 1510, using data from the User record retrieved in step 1505, TD 100 replies to Provider 150, sending a list of Registered Device attributes and a list of Provider Account attributes associated with the User record. In step 1515, the Provider 150 processes the received lists, to identify the new Registered Device and its key. Provider 150 updates the Public Key Translation Table, adding entries encrypted with the public key of the new Device being added. Provider 150 then sends a "complete recovery" request to TD 100, containing the user record ULID, Provider ID, and an updated list of Provider Account Attributes. In step 1520, TD 100 runs a Cryptographic Validation of Provider Request protocol. Finally, in step 1525, TD 100 forwards a copy of data received by it in step 1515 to the smart contract 115A on UL 115. The smart contract in turn validates the request, updates the User record with an updated version of the list of Provider Account Attributes, and changes the User record Status field from RECOVERY to ACTIVE.

Removing Providers from a User Record

Figure 16:
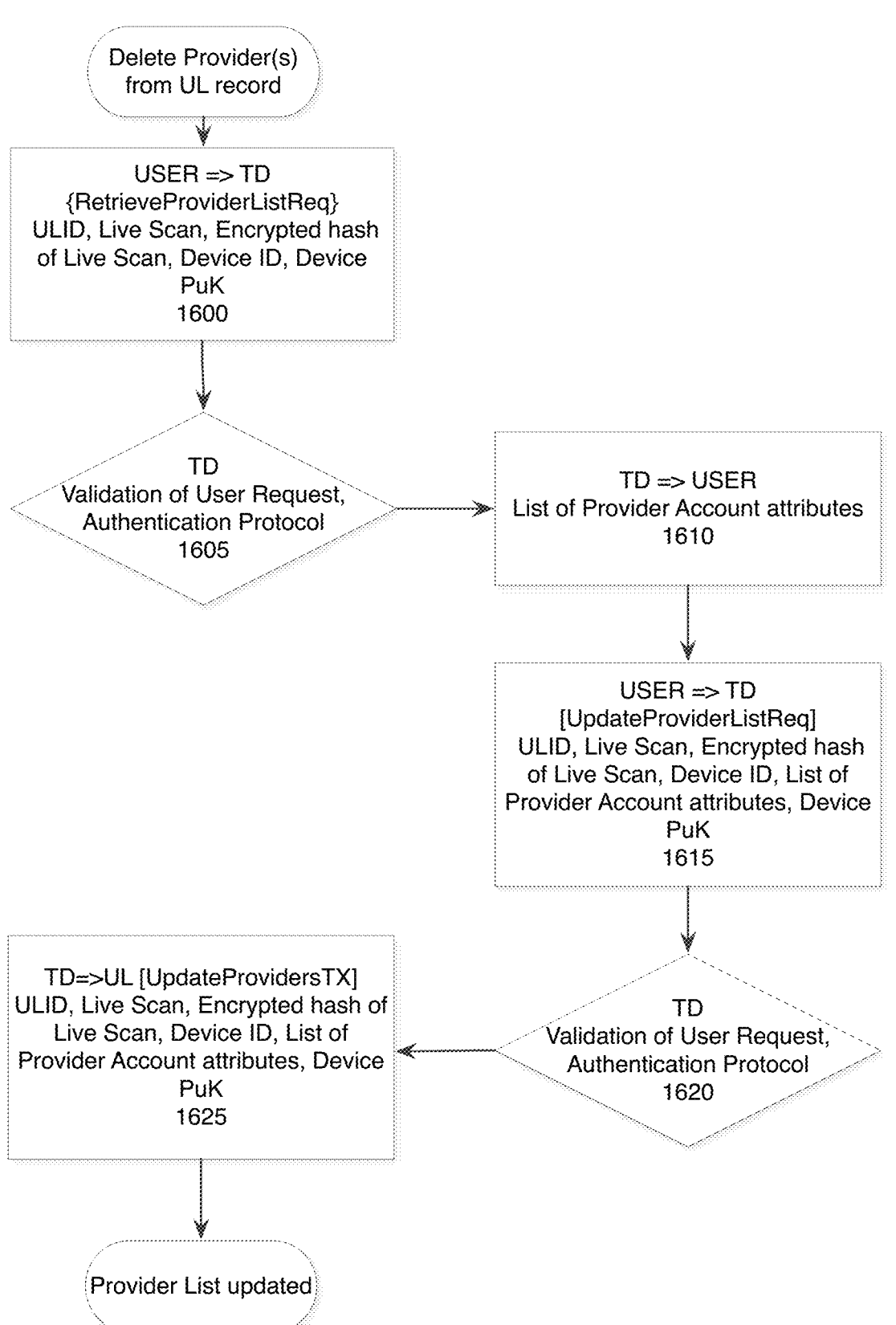
FIG. 16 is a process for removing providers from a user record provider list.

In some circumstances, a User may wish to remove one or several Provider Accounts from his or her record. Removed Providers will no longer be able to send User Authentication requests. FIG. 16 illustrates a process for such removal of Provider accounts.

In step 1600, User 140 (via PED 145) sends to TD 100 a request to retrieve a provider list ("RetrieveProviderLis-tReq"), containing a ULID, Live Scan, encrypted hash of Live Scan, Device ID, and device public key. In step 1605, TD 100 runs Cryptographic Validation of User Request and Authentication protocols, as described elsewhere herein. In step 1610, using data retrieved during step 1605, TD 100 replies to User 140 with the list of Provider Account Attributes contained in the User record.

In step 1615, an application implemented by PED 145 of User 140 decrypts Provider descriptions contained within the Provider Account Attributes returned in step 1610, and displays the decrypted Provider descriptions to User 140. Using PED 145, User 140 may edit the list (including deleting one or more Providers from it) and save an updated version. User 140 then sends to TD 100 a request to update the Provider list ("UpdateProviderListReq") to TD 100, containing the ULID, Live Scan, encrypted hash of Live Scan, Device ID, and the updated list of Provider Account attributes.

In step 1620, TD 100 runs Cryptographic Validation of User Request and Authentication protocols, as described elsewhere herein. In step 1625, TD 100 forwards data received in step 1615 to the smart contract 115A implemented on UL 115. The smart contract validates the request and updates contents of the User record.

Addition of a New Registered Device to a User Record

Preferably, only registered devices can be used for serving User Authentication requests by Providers. A User may have any number of Registered Devices configured in his or her UL record. Typically, to add (i.e. register) a new device, the User must be in possession of one of the previously registered devices.

Figure 17:
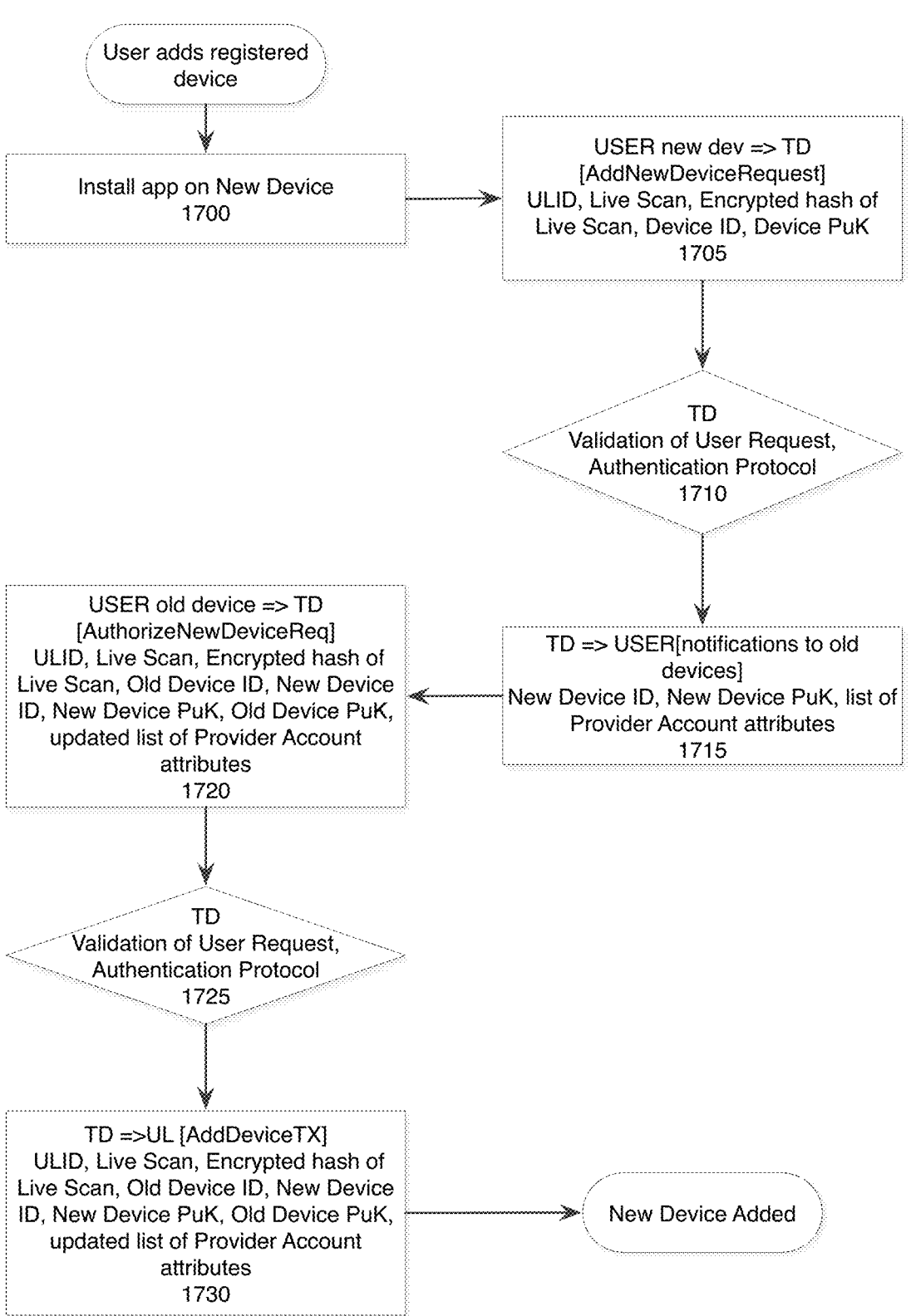
FIG. 17 is a process for adding a registered device to a user record.

FIG. 17 illustrates a process via which a user may register a new device using a previously-registered device. In step 1700, a User 140 installed an application on a new (i.e. not previously-registered) PED 145 ("New Device"), and via an application configuration process, selects an option presented on New Device to add the New Device to an existing UL account. In step 1705, New Device sends to TD 100 a request to add a new device ("AddNewDeviceReq") containing the User's ULID, Live Scan, encrypted hash of Live Scan, Device ID and Device public key. In step 1710, TD 100 runs a Cryptographic Validation of User Request protocol and Authentication protocol, as described elsewhere herein. In step 1715, using data from the User record retrieved in step 1710, TD 100 sends notifications to all Registered Devices associated with the User record, attaching the New Device ID, New Device PuK, and the list of Provider Account attributes.

In step 1720, User 140 uses one of the previously-registered Devices to reply to TD 100. In particular, an application on the previously-registered Device re-calculates the Provider Account attribute list, updating the Public Key Translation Tables for the New Device and its public key. User 140 (via the previously-registered Device) then sends a request to authorize the New Device to TD 100, which request includes the ULID, Live Scan, encrypted hash of the Live Scan, old Device ID, New Device ID, old Device PuK, New Device PuK, and the updated list of Provider Account Attributes.

In step 1725, TD 100 runs the Cryptographic Validation of User Request and Authentication Protocols, as described elsewhere herein. Finally, in step 1730, TD 100 forwards data received in step 1720 to the smart contract 115A running on UL 115. The smart contract validates the request and updates contents of the User record with the updated version of the Provider Account Attributes and a Registered Device attribute corresponding to the New Device.

Adding a New List of Trustees to a User Record

When a User 140 loses access to all of the Registered Devices, the User can no longer use services provided by various biometric authentication platforms described herein. Devices to be used for User Authentication have to be registered. To register a New Device, a User typically needs to be in possession of a previously-registered Device.

However, in some embodiments, other mechanisms may be provided for adding a New Device. One such mechanism utilizes the assistance of a Provider 150 that was previously designated by the User 140 as "Trusted". Some Users, however, may not have such a Trusted Provider. In that case, a "Trusted Circle" protocol may be utilized as another mechanism for registering a New Device and recovering the User account. A Trusted Circle protocol may use Trustee Lists containing ULIDs of Users who are designated as Trustees to send their votes confirming the identity of a User requiring addition of a New Device to their User record.

Figures 18, 19:
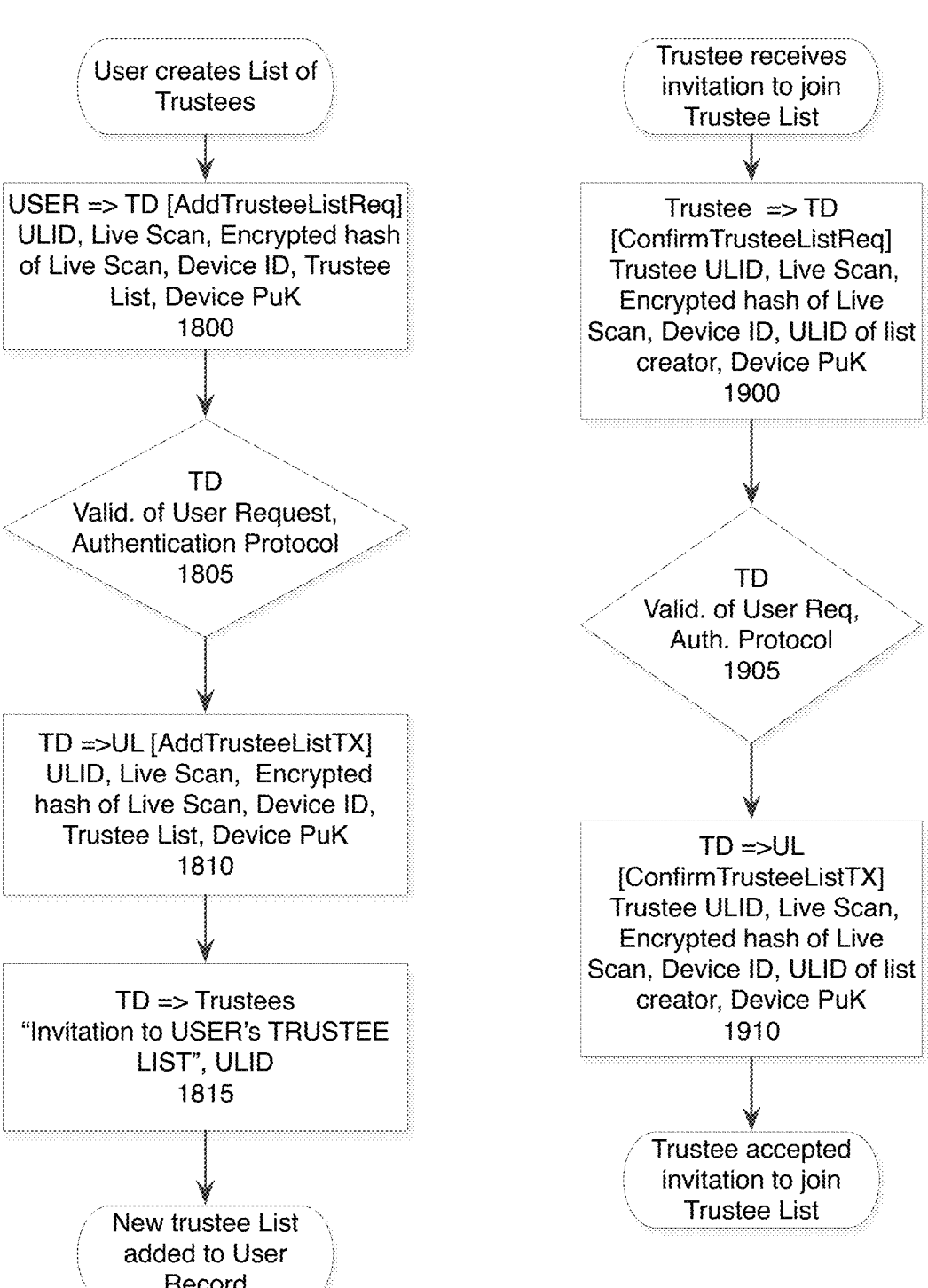
FIG. 18 is a process for creating a list of trustees.
FIG. 19 is a process for inviting a trustee to join a trustee list.

Addition of a Trustee list protocol may be implemented in two phases. During the first phase, a User 140 creates a list and the system sends out notifications to Trustees inviting them to join the list. FIG. 18 illustrates such a process. In step 1800, a User 140 configures a Trusted List on a Registered Device 145, and sends a request to add a trustee list ("AddTrusteeListReq") to TD 100. The AddTrusteeListReq includes the User's ULID, Live Scan, encrypted hash of Live Scan, Device ID, Trustee List, and Device public key. In step 1805, TD 100 runs a Cryptographic Validation of User Request protocol and Authentication protocol, as described elsewhere herein. In step 1810, TD 100 forwards the data received by it in step 1800 to a smart contract 115A on UL 115. The smart contract on UL 115 creates a Trustee List attribute, setting the status field of each Trustee to PENDING. The smart contract 115A on UL 115 further appends the Trustee List attribute to the User Record. In step 1815, TD 100 sends notifications to the Trustees designated in step 1800, attaching the User's ULID to an invitation to join the Trustee List.

During a second phase, each of the Trustees will respond signaling their acceptance (or refusal) of the invitation to join the User's new Trustee List. FIG. 19 illustrates such a process. In step 1900, an invited Trustee responds to the invitation of step 1815, by producing a Live Scan and sending to TD 100: a "Confirm Trustee Acceptance" request with the Trustee's ULID, Live Scan, encrypted hash of Live Scan, Device ID, ULID of Trustee List creator, and device public key. In step 1905, TD 100 performs Cryptographic Validation of User Request and Authentication protocols for information received from the Trustee, as described elsewhere herein. In step 1910, TD 100 forwards data received in step 1900 to a smart contract 115A on UL 115. The smart contract looks up a record belonging to the Trustee List owner and changes the status of the Trustee who responded in step 1900, from PENDING to CONFIRMED.

Trusted Circle Recovery Protocol

A Trusted Circle recovery protocol may run in two phases. FIG. 20 illustrates a process that may be implemented in a first phase. In step 2000, a User 140 initiates the Trusted Circle recovery by installing an application on a new PED 145 (i.e., a New Device) and during, e.g., an initial configuration, select an option to initiate Trusted Circle recovery. To be able to use this option, User 140 must remember the alphanumeric string that was used to create ULID. Preferably, this string is something unique and easy to remember, such as an email address. User 140 may also enter a text-based message to Trustees, such as "This is Joe on a new phone. I lost my old phone. Please, confirm that you know me." User 140 produces a Live Scan from the New Device, and sends a Trusted Circle Recovery Request to TD 100, containing the ULID, Live Scan, encrypted hash of Live Scan, message to Trustees, and New Device public key.

In step 2005, TD 100 runs Cryptographic Validation of User Request and Authentication protocols, as described elsewhere herein. In step 2010, TD 100 forwards data received by it in step 2000 to a smart contract 115A on UL 115; smart contract 115A in turn adds the New Device to the list of Registered Devices and changes the User Record status to RECOVERY. In step 2015, using data from the User record retrieved in step 2005, TD 100 sends notifications to Trustees, attaching the requesting User's ULID and message to Trustees.

A second phase of Trusted Circle recovery is illustrated in FIG. 21, whereby each of the Trustees will respond to the notification by voting for the User whose record access is being recovered. A Trustee has received an invitation sent by TD 100 in step 2015. In step 2100, the Trustee produces a Live Scan and sends a request to Confirm User Recovery, which includes the Trustee's ULID, the Trustee's Live Scan, an encrypted hash of the Trustee's Live Scan, the Device ID, a ULID of the User being recovered, and the device public key. In step 2105, TD 100 runs the Cryptographic Validation of User Request and Authentication protocols, as described elsewhere herein. In step 2110, TD 100 forwards data received in step 2100 to smart contract 115A on UL 115. Smart contract 115A looks up a record of the User being recovered and marks all instances of the responding Trustee in the Record's Trusted Lists to VOTED. Every time a new vote comes in, a smart contract 115A on UL 115 checks if a minimum vote count condition in any one of the Trustee Lists has been met. If it has, voting is complete; all Trustees are reset to ACTIVE; and the User record Status changes to ACTIVE. The User can now use the New Device.

For security reasons, Trustees may not be provided with access to the public keys of Provider Accounts that would be required to decrypt Provider Account descriptions. In such embodiments, when a User with one or several Provider Accounts recovers his or her Record using the Trusted Circle protocol, the New Device will not be able to display the Trusted Account titles that would be shown during a Provider Account removal protocol. This inconvenience can be resolved by, e.g., contacting Providers and asking them to reset their registration to support the User's New Device. This restriction may be implemented intentionally, as it may be undesirable for Trustees from a Trusted Circle List to be able to read contents of the Provider Accounts configured in the record of the Trustee List creator.

Enhanced Security of Stored Biometric Samples

In some embodiments, it may be desirable to enable modification of stored Templates while preserving UL record ownership. For example, biometric data is sensitive and often considered to be irreplaceable. In modern biometric authentication systems, templates and live scans are almost always encrypted when transferred from clients to servers; and templates are stored separately from their decryption keys on the server side. This addresses the concern of data security during transportation and storage. However, during matching, templates and live scans still need to decrypted back to their original formats to be matched. If a matching node is compromised or if matching is performed on a public network, it is possible that a hacker can steal the original template. If this happens, a hacker can create a fake live scan by modifying the template in an insignificant way to spoof the matching algorithm. Since a user's biometric information does not change, once an original template is stolen, it will not be safe for the user to use the same biometrics anymore.

To address this issue, a technique may be implemented that allows a user to revoke and replace biometric templates. Such a technique may be based on scrambling biometric templates and live scans and matching the scrambled pairs directly without de-scrambling them.

A template is a mathematical representation of a user's biometric information. A matching algorithm takes input of a pair of representations and computes their similarity. Without losing generality, hereinbelow are described two commonly used representations and their associated similarity measurements.

A first type of representation is a feature vector whose similarity is computed as a function of dot product. For this example, one may denote the vectors of template and live scan as $A=[a1, a2, a3, \ldots, an]$ and $B=[b1, b2, b3, \ldots, bn]$. The similarity is computed as a function of $C=\text{sum}(a1*b1,$ a2*b2, a3*b3, . . . , an*bn). A can be scrambled by multiplying a matrix M with the effect of swapping the order of elements and/or adding different coefficients to different elements. For instance A'=[k2*a2, k1*a1, kn*an, . . . , k3*a3]. B can be scrambled by multiplying the inverse of M, M', B'=[a2/k2, a1/k1, an/kn, . . . , a3/k3]. Similarity C'=sum (a2*b2, a1*b1, an*bn, . . . , a3*b3)=C.

A second type of representation is a Fourier transform vector. Denote the vectors of template and live scan as A=[a1*exp(−i*α1), a2*exp(−i*α2), . . . , an*exp(−i*αn)] and B=[b1*exp(−i*β1), b2*exp(−i*β2), . . . , bn*exp(−i*βn)]. Similarity is computed as a function of the element-wise product, C=[a1*b1*exp(−i*(α1+β1)), a2*b2*exp(−i*(α2+β2)), . . . , an*bn*exp(−i*(αn+βn))]. Similar to the method described in the previous section, we can multiply A and B with a scramble vector M and its element-wise inverse vector M'. A'=[k1*a1*exp(−i*a1−i*Ω1), k2*a2*exp(−i*α2−i*Ω2), . . . , k2*an*exp(−i*αn−i*Ωn)] and B'=[a1/k1*exp(−i*β1+i*Ω1), a2/k2*exp(−i*β2+i*Ω2), . . . , an/kn*exp(−i*βn+i*Ωn)]. The element-wise product C' will be the same as C. Note that in image processing, Fourier transform is often computed as 2D matrices instead of 1D vectors. However the above technique is still applicable as the rows of a 2D matrix can be concatenated into a single vector. We can then apply the same element-wise operation above and reshape the result vector back into a 2D matrix of the original form.

Figures 22, 23:
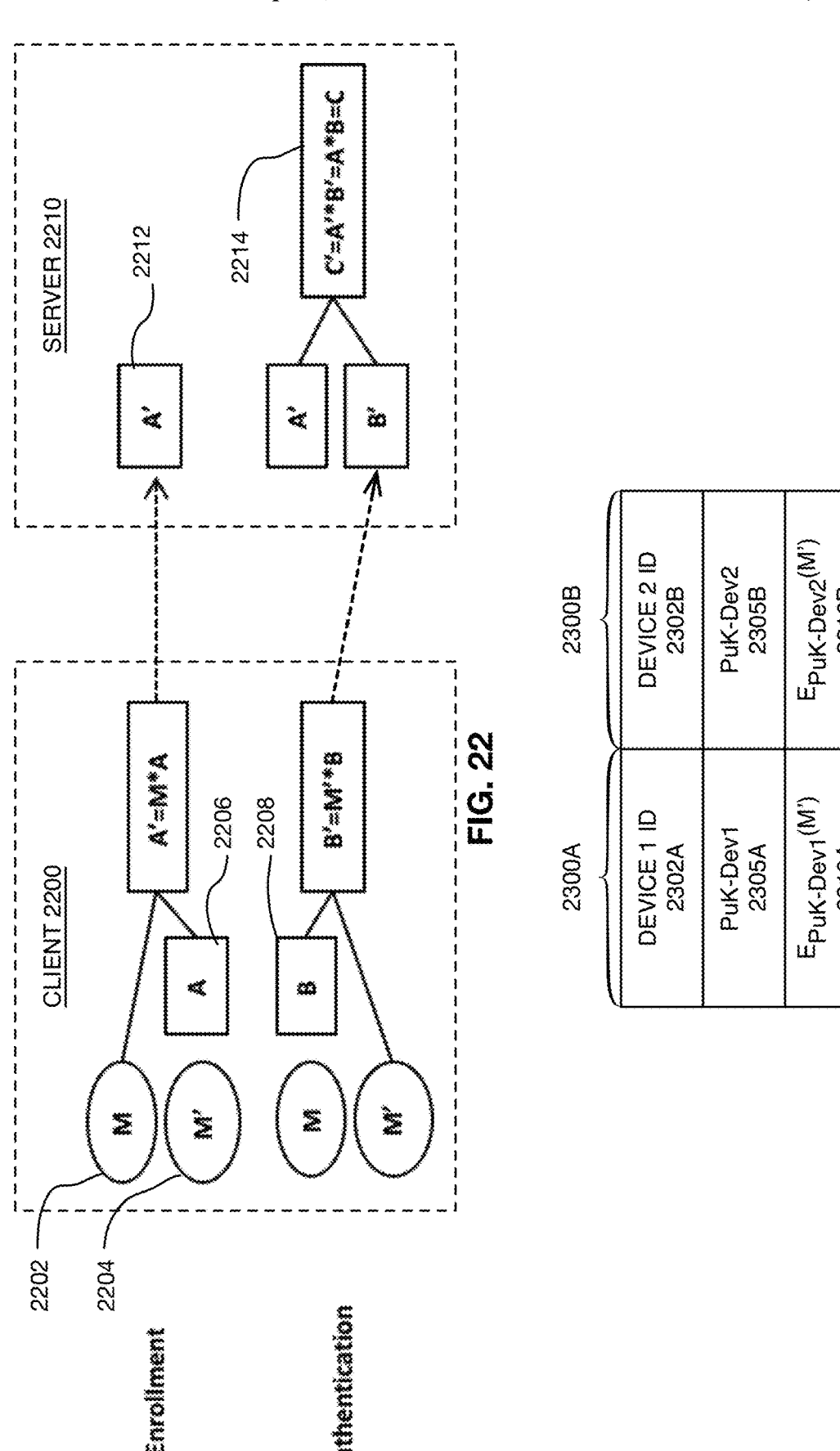
FIG. 22 is a process for applying a scrambling technique within a biometric authentication platform.
FIG. 23 is a user ledger record portion enabling application of a scrambling technique.

FIG. 22 shows how to apply the scrambling technique to the proposed biometric authentication system. During enrollment, a client app 2200 randomly generates a scramble matrix/vector M (2202) and its inverse (2204) and stores them locally. Upon capturing the biometric template A (2206), the client app calculates a scrambled template A' by scrambling A using M, and sends the scrambled template A' to the server 2210. The server saves A' as a template 2212. During authentication, the client app 2200 captures a live scan B (2208), scrambles it with M' and sends the scrambled live scan B' to the server 2210 for matching. The server 2210 fetches A' and matches it with B'. The result 2214 will be the same as matching the unscrambled A and B.

Scramble matrix/vector M is irreversible, i.e., one cannot derive the original template and live scan A and B from their scrambled representations A' and B' without knowing M and M'. Since M is only used to scramble the template and can be discarded afterwards, and M' is only stored in an encrypted format and can only be recovered by registered devices using their own private keys, and A' and B' are matched without de-scrambling on the server side, even when a server node is compromised, the hacker can only get access to A' and B' but will not be able to recover A and B. Thus, the original biometric sample and live scan remain secure. After such a hack is detected, the user can simply revoke the enrolled template A', generate a new pair of M and M', then re-enroll. The hacker will not be able to spoof the system by resending slightly modified version of A' or B' as the new template is scrambled using a completely different matrix/vector. Since M and M' are randomly generated, there are infinite number of pairs. So the user can revoke biometric templates as many times as he/she wants to.

In one embodiment, User 140 can create a separate UL record for each registered device. In this configuration, M' can be stored locally in the registered device. In other embodiments, a UL record is associated with multiple registered devices. To implement this approach, a M' field will be stored in an encrypted format as a part of a UL record. The technique used to store it will be analogous to the Public Key Translation Table. Each registered device will be able to load an encrypted M' and decrypt it with its local private key. FIG. 23 illustrates an example of two registered device attributes 2300A and 2300B that may be appended to a UL record. Attribute 2300A contains Device 1 ID 2302A, encryption key 2305A (PuK-Dev1), a field 2310A with M' encrypted with PuK-Dev1. Similarly, attribute 2300B stores M' for a second registered device in field 2310B, along with Device 2 ID 2302B and encryption key 2305B (PuK-Dev2).

To support this enhancement, most protocols will require a minor modification wherein before submitting a Live Scan, the User 140 will obtain a copy of the encrypted M' from UL 115 via TD 100. UL 115 may be queried for encrypted M' in the same manner as described elsewhere herein.

Proving Authenticity of Matching Results by Inserting Test Tasks

While the consensus protocol over a decentralized framework is usually sufficient to guarantee the authenticity of a matching result, to further enhance security, an additional technique can be applied to verify whether a processing node faithfully reported the authentic matching result. This can be particularly useful when matching is performed over a public network or when the consensus protocol only requires votes from a small number of nodes.

Figure 24:
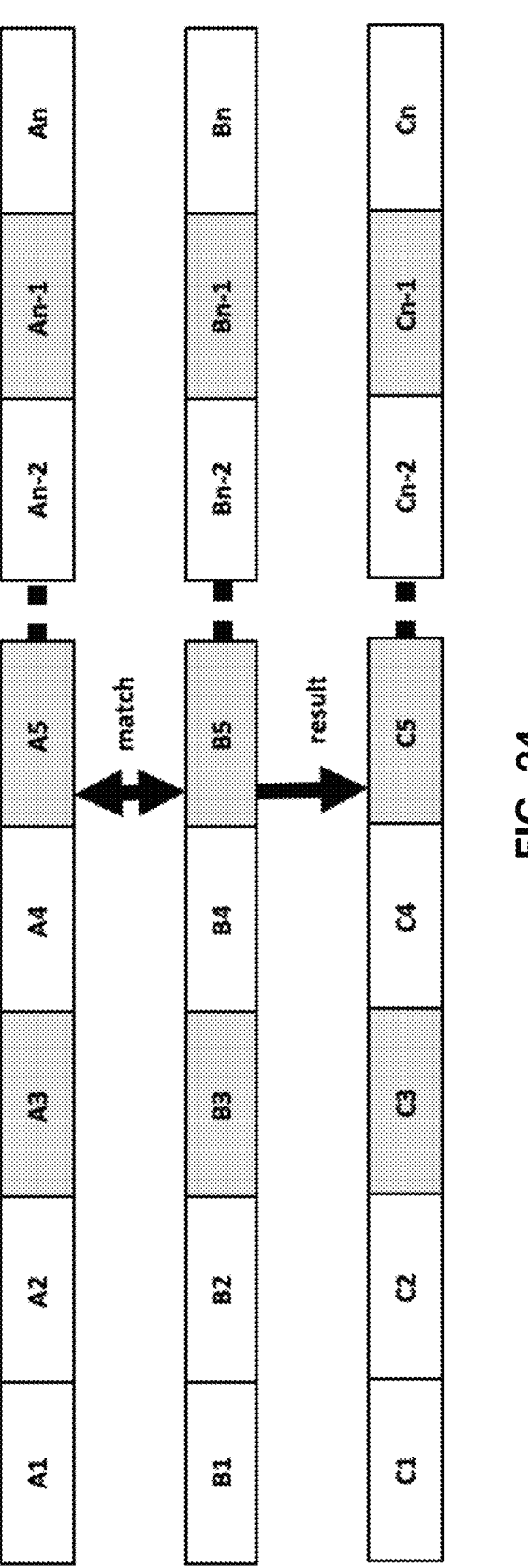
FIG. 24 is schematic illustration illustrating insertion of test tasks to prove authenticity of matching results.

When passing a series template and live scan pairs to AL 125 for matching, TD 100 can insert testing pairs whose matching results are known to TD 100 as shown in FIG. 24. A and B are two sets or series of biometric scans that TD 100 sends to AL 125, one as templates and the other as live scans. The notation is abstract. Their elements can be whole biometric scans or sub-pieces. The series or sets can be sent simultaneously as a single task or can be sent over time as TD 100 continues to send matching requests to AL 125. There are two types of elements. The shaded elements represent testing template and live scan pairs whose matching results are known to TD 100. The others represent normal pairs whose matching results are unknown. Test pairs may be interspersed into the series over time with pairs having unknown results. Testing pairs can be randomly generated by TD 100 and their results are computed by TD 100 using the same matching algorithm that AL 125 uses. Or TD 100 can store previous biometric scans and their matching results that have been verified and use them as future testing data.

By matching the reported and known results of the testing pairs, TD 100 can decide whether a node or even the entire ledger has been compromised with high confidence. When the result is in the format of a Boolean value, n testing pairs can verify the authenticity to the accuracy of 1/(2^n). Or when the result is a floating point value, a single testing pair is usually enough.

Advanced Installation and Security Options

In some circumstances, UL 115 and AL 125 may be deployed in environments with differing requirements and/or regulations governing security, auditability and confidentiality. Alternative installation configurations may be implemented to accommodate varying priorities and requirements.

In some embodiments, a platform may be designed in such a way that AL 125 and UL 115 are decoupled. Theoretically, AL 125 can be used without UL 115. This could be accomplished by, for example, adding an Application Programming Interface (API) to TD 100 that would allow it to accept Live Scan/Template pairs from an external source, with User Authentication run on AL 125 to produce an immutable record with the matching result.

Figure 25:
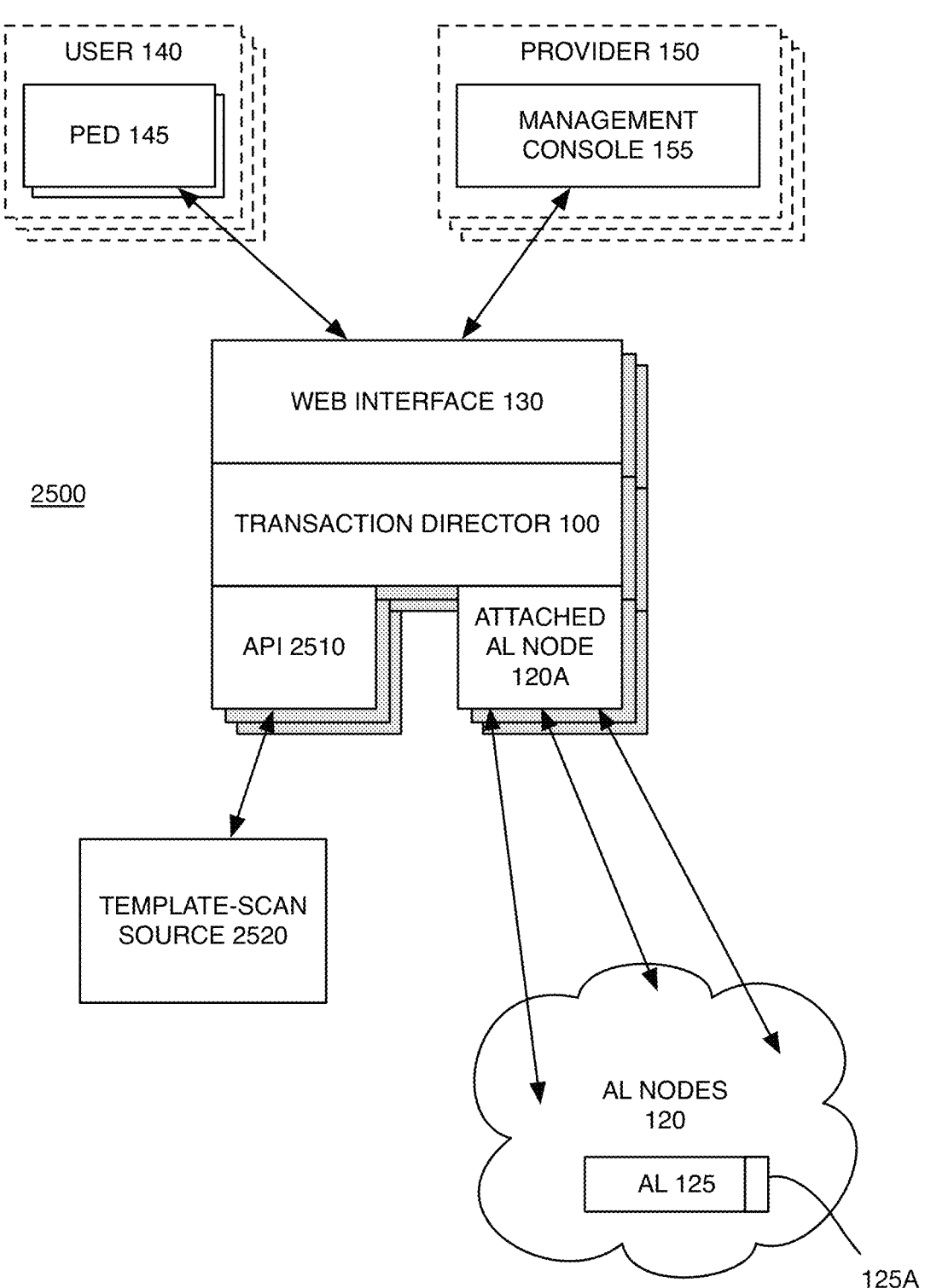
FIG. 25 is a schematic block diagram of a system for performing biometric authentications using a distributed authentication ledger, without a user ledger.
Figure 26:
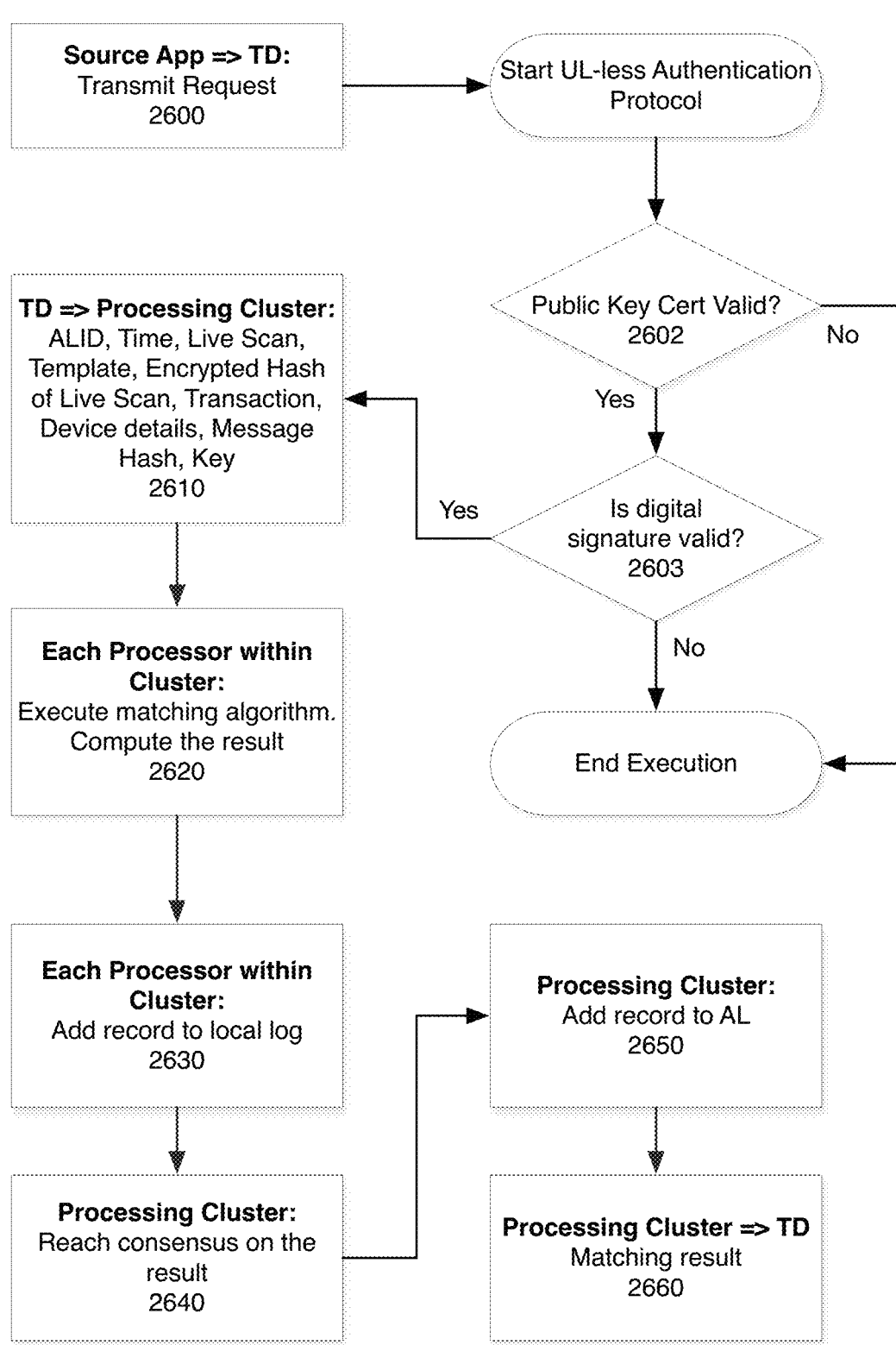
FIG. 26 is a process for performing biometric authentications using a distributed authentication ledger, without a user ledger.
Figure 27:
FIG. 27 illustrates a message format for a biometric authentication request in an environment with a distributed authentication ledger, without a user ledger.

FIG. 25 illustrates such an embodiment, in which networked system 2500 performs biometric authentications using AL 125 without a UL. FIG. 26 illustrates a process for biometric authentication in the environment of FIG. 25. TD 100 includes API 2510. API 2510 enables a network-connected external application, template-scan source 2520, to transmit a biometric authentication request 2700 (FIG. 27) to TD 100 (step 2600). Template-scan source 2520 may be, e.g., one of numerous third-party network-connected application servers using system 2500 for biometric authentication. Request 2700 includes ALID 2705, live scan 2710, and template 2720. Optional attribute fields 2730 and 2740 can be used by the requesting application (source 2520) according to its business needs; the contents of fields 2730 and 2740 will become part of an immutable AL record and can be accessed later as needed. Optional cryptographic key 2750 (if provided), will be used to encrypt live scan 2710 and template 2720 to the extent they persist in external storage. Request digital signature 2760 is computed by encrypting the request with a private key owned by an external application. Digital key certificate 2770 confirms ownership of the private/public key pair. In some deployments, if verifiable certificates are deemed unnecessary, digital key certificate field 2770 can be replaced with a public key from the encrypting private/public key pair.

Transmission of the authentication request in step 2600 initiates the UL-less authentication protocol. In step 2602, TD 100 determines whether cryptographic key certificate 2750 is valid, failing which the authentication protocol is terminated. If valid, in step 2603, TD 100 uses the public key from cryptographic key certificate 2750 to validate digital signature 2760; if invalid, the authentication protocol is terminated.

Figure 28:
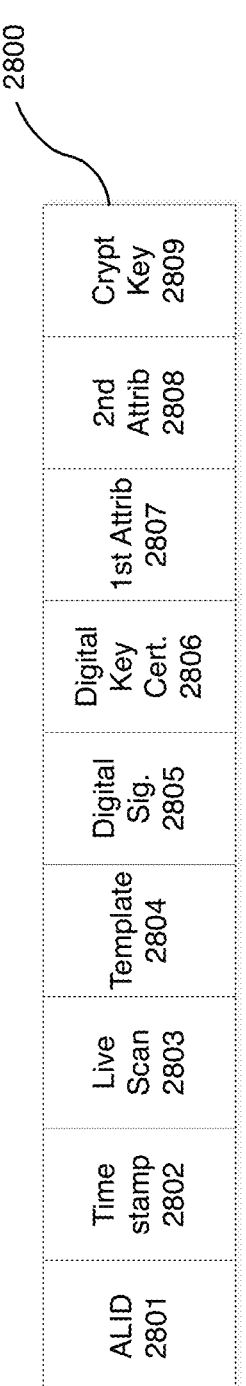
FIG. 28 illustrates a message format for transmitting a biometric authentication task to a processing cluster in an environment with a distributed authentication ledger, without a user ledger.

Because an ALID is provided by source 2520 in request 2700, TD 100 need not compute an ALID as in prior embodiments. Rather, in step 2610, TD 100 sends a biometric authentication task request 2800 (variably referred to as a task or a request) to a Processing Cluster (e.g. 515A, 515B), the contents of the request being described in FIG. 28. Request 2800 includes ALID 2801, timestamp 2802, live scan 2803, template 2804, digital signature 2805, digital key certificate 2806, optional attribute 1 2807, optional attribute 2 2808, and cryptographic key 2809. Request 2800 differs from the UL referencing format illustrated in FIG. 6 in that: (1) the encrypted hash of the live scan 608 is replaced by digital signature 2805; (2) the TX hash 610 is replaced by digital key certificate 2806 (or a public key as described above); (3) optional attribute 2807 replaces optional device details 612; and (4) optional attribute 2808 replaces the optional hash of the user message 614.

Figure 29:
FIG. 29 is an AL record format in an environment without a user ledger.

In step 2620, each processor within the processing cluster executes a biometric matching algorithm on template 2804 and live scan 2803 to compute a result, e.g. an affirmation or negative indication as to whether the live scan matches the template. In step 2630, each processor in the cluster adds a local record indicative of the processed request, preferably including copies of the template and live scan. If request 2800 includes a cryptographic key, the key is used to encrypt at least the template and live scan as stored within the logged record. In step 2640, the processing cluster nodes (e.g. 515A, 515B) reach consensus on a result, in accordance with rules prescribed by a consensus protocol governing the cluster. In step 2650, the processing cluster adds a record 2900 to the AL, having the format illustrated in FIG. 29. Record 2900 includes ALID 2901, timestamp 2902, live scan hash 2903, template hash 2904, digital key certificate 2905, digital signature 2906, first attribute 2907, second attribute 2908, match result 2909 and cluster ID 2910. In step 2660, the processing cluster reports the ALID and matching result to TD 100, signaling completion of the authentication protocol.

In an analogous manner, UL 115 could also be used without AL 125, as a reliable, decentralized, auditable registry of biometric templates pursuant to processes described above, with another system other than AL 125 actually performing template/live scan matching.

In yet other embodiments, AL 125 and UL 115 may communicate with one another (e.g. as described above), but may still be architected to accomplish desired objectives in security, auditability or confidentiality. Consider, for example, a bank that, on the one hand, does not trust other banks to host Processors that are used for User Authentication of the bank's customers; but on the other hand, the bank is willing to use a shared repository of biometric Templates. To satisfy this requirement, an AL may be deployed on the bank's internal network, while the UL may be deployed across a public or third party network. Transaction Directors will be installed within the bank's internal network, while connecting to the UL network via a secure channel. Multiple such banks may operate in this manner, with private authentication ledgers and a shared user ledger.

Figure 30:
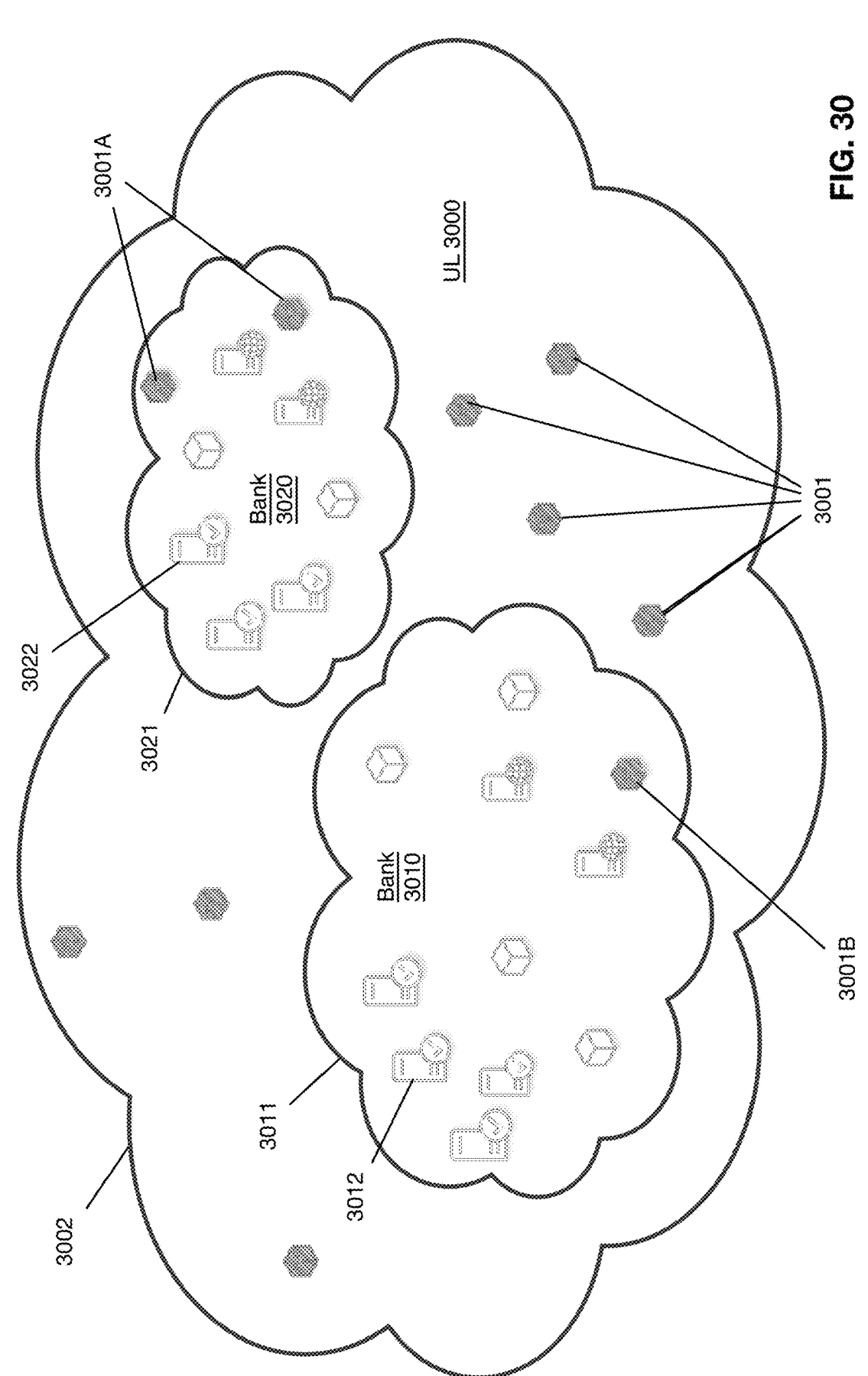
FIG. 30 is a schematic block diagram of a distributed ledger network with private AL and shared UL.

FIG. 30 illustrates such a network. Bank 3010 operates a private network 3011 implementing an AL using AL nodes 3012 (which include at least one or more Processors, and optionally other nodes). Bank 3020 operates private network 3021 implementing a second AL using AL nodes 3022 (which include at least one or more Processors, and optionally other nodes). UL 3000 is implemented on shared network 3002, and includes one or more shared UL nodes 3001 operating within shared network 3002. Further, bank 3010 may operate UL node 3001B within its private network 3011. Likewise, bank 3020 may operate UL node 3001A within its private network 3021.

Figure 31:
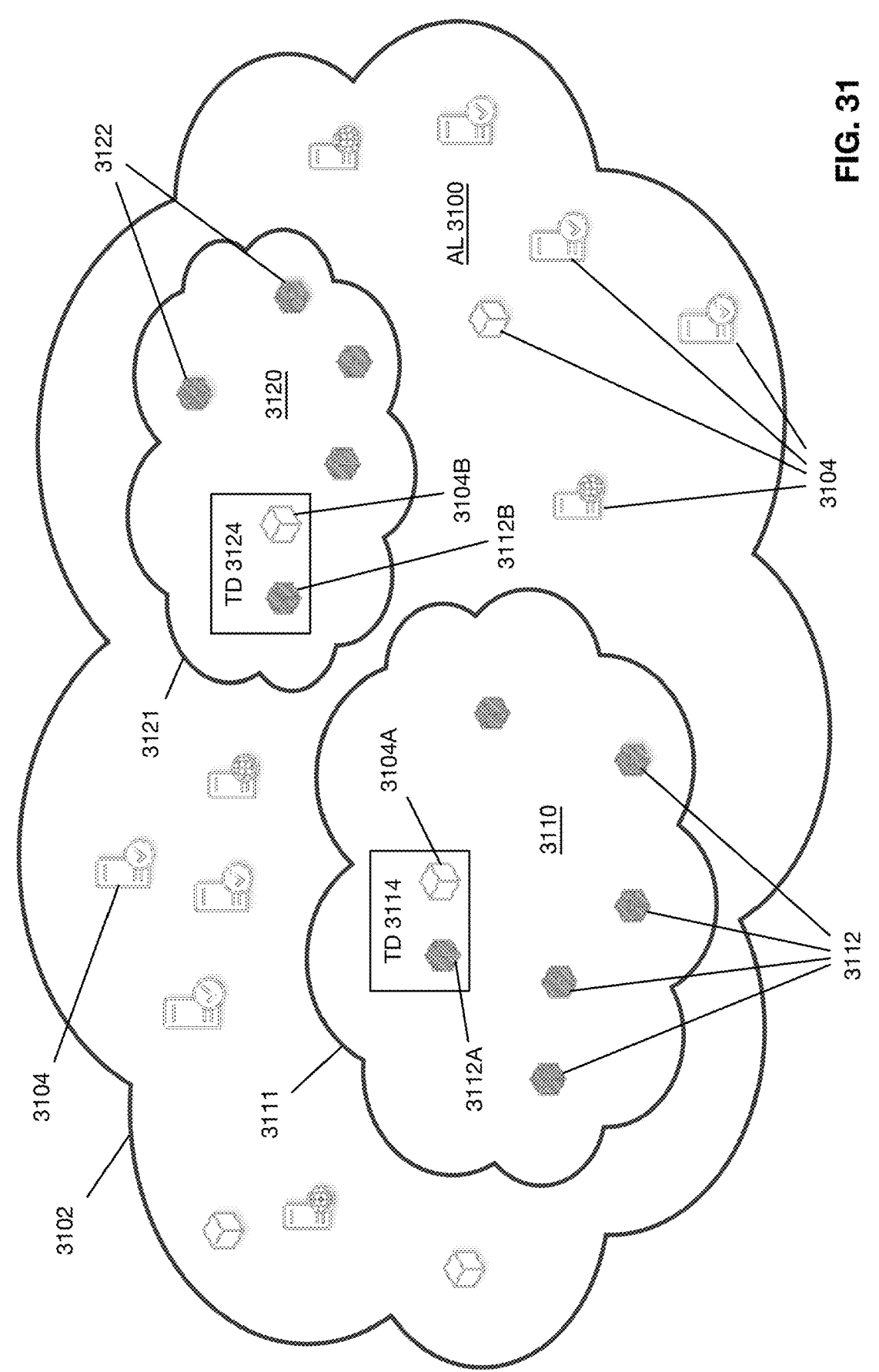
FIG. 31 is a schematic block diagram of a distributed ledger network with private UL and shared AL.

In other circumstances, for regulatory or other reasons, some organizations may wish to avoid storing certain data (such as employee data) outside of the organization's own network. Several similarly situation organizations may collaboratively set up a secure shared processing facility hosting Processors and other nodes of the AL network, while each participant may host its own UL on an internal network. FIG. 31 illustrates an example of such a configuration. AL 3100 is implemented within a wide area network 3102, accessible to a first company private network 3111 and a second company private network 3121. Private company network 3111 implements a private UL 3110 with private UL nodes 3112. Private company network 3121 implements a private UL 3120 with private UL nodes 3122. Transaction directors may be hosted locally within each company's private network. For example, network 3111 hosts transaction director 3114, having attached UL node 3112A and attached AL node 3104A; attached AL node 3104A is provided with data connection to shared network 3102, e.g. via some secure channel, thus enabling communications with other AL nodes 3104. Similarly, network 3121 hosts transaction director 3124, having attached UL node 3112B and attached AL node 3104B; with attached AL node 3104B having a data connection with shared network 3102 and thus other AL nodes 3104. In such a configuration, the organizations may implement one shared AL with multiple privately-hosted ULs.

In other circumstances, even more complex scenarios may demand a hybrid approach, with multiple ALs and multiple ULs. For example, one of the banks (3010, 3020) in the configuration of FIG. 30 may desire to maintain a repository of its employees' biometric data inside the bank while using a shared UL for its customers' biometric data. Such a bank may utilize a privately-hosted UL for its employees, while accessing a shared UL for its customers. In such a configuration, some Transaction Directors may be implemented on hosts running local AL and external UL nodes, while others will be implemented on hosts running local AL and local UL nodes.

Secondary Channel Audits

In some circumstances, a Provider may wish to audit results from a transaction director, potentially in real time, to confirm the reliability of the transaction director to provide accurate and uncompromised results. One approach to such confirmation is use of secondary channel audits. This feature can be employed on the Provider side to audit results coming back from a TD 100 in real time, so that Provider 150 may make a prompt determination should a TD 100 become compromised. In some embodiments, it may be desirable for Provider 150 to utilize secondary channel audit immediately, each time Provider 150 receives an authentication result from a TD 100, thereby providing some level of real-time monitoring of the integrity of a transaction director pool.

Figure 32:
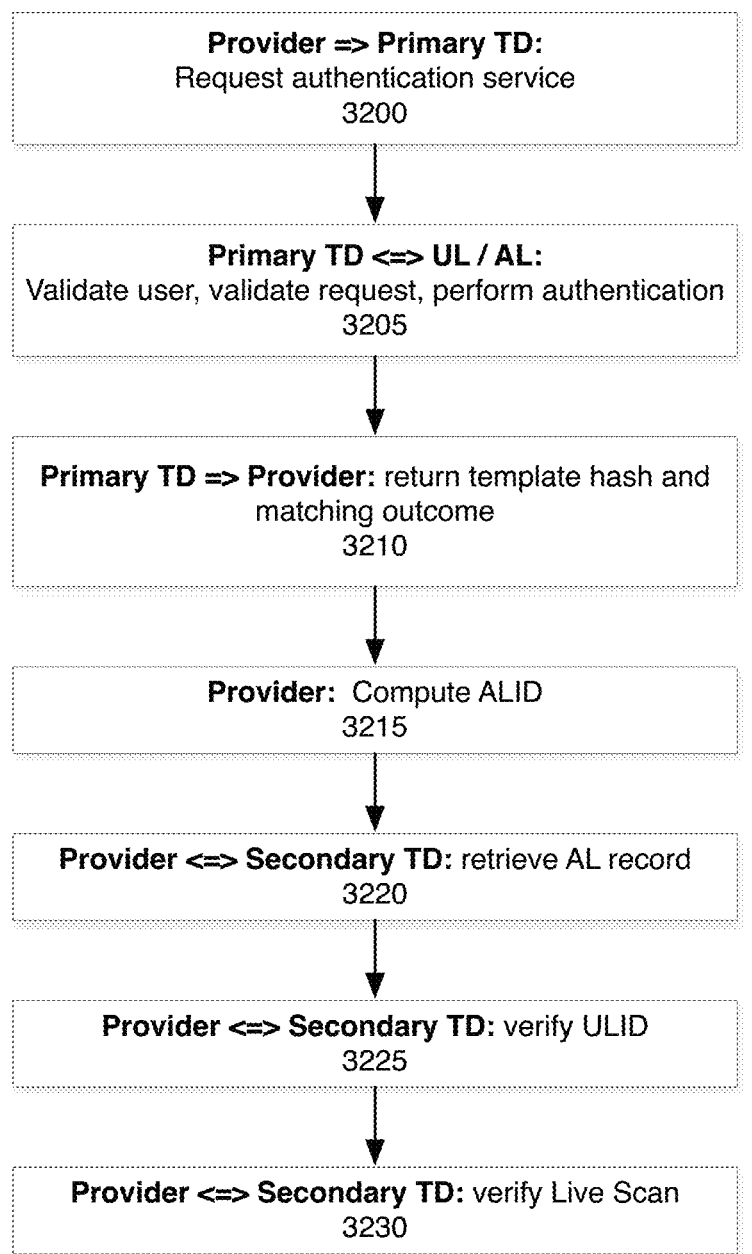
FIG. 32 is a process for implementing secondary channel audit.

FIG. 32 illustrates an exemplary process for implementing secondary channel audit, within the context of the exemplary system illustrated in FIG. 31. When Provider 150 needs to use the User Authentication service, it requests service from a primary TD 3114 (step 3200). In step 3205, primary TD 3114 runs all the appropriate steps in response to an authentication service request (e.g. user validation, request validation, and authentication) and returns two values (step 3210): a hash of Template used in matching (from UL 115) and the matching outcome, all as described elsewhere herein.

Provider 150 further connects to one or several transaction directors other than primary TD 3114, such as secondary TD 3124. Secondary TD 3124 may be running in a pass-through mode acting as gateway(s) and only capable of servicing simple queries.

In such an environment, Secondary Channel Audits may be implemented as follows, with reference again to the exemplary network configuration of FIG. 31. Provider 150 computes an ALID for the authentication transaction on its own (step 3215), by hashing known information: the ULID (ID of Authenticated User), Provider ID (hash of its own public key), and hash of TX data. Provider 150 can then use the computed ALID to retrieve an AL 125 record created as a result of Provider 150's User Authentication request handling via the Primary TD 3114, which retrieval is performed using the services of one or more secondary TDs 3124 (step 3220). An assumption here is that it's very unlikely that multiple TDs become simultaneously compromised and in the unlikely event that they are, are colluding with one another.

Provider 150 receives an AL 125 record and uses its fields to conduct several checks. In step 3225, Provider 150 verifies that the ULID that Provider 150 originally requested has the same Template as the Template that was submitted to AL Processors within AL nodes 120. This can be accomplished by comparing a Hash(Template) field of the AL 125 record with a Hash(Template) of the User record in ULID. To conduct this check, Provider 150 contacts UL 115 directly via a secondary TD 3124 and issues a simple query sending the ULID and Hash(Template) it obtained from the AL 125 record.

The second check is to confirm that the Live Scan used for matching on AL 125 was indeed the Live Scan sent from User's device 145 used for scanning (step 3230). This can be accomplished using two fields of the AL 125 record: Hash (Live Scan) that was computed by AL Processors (e.g. processors 510), and Encrypted Hash of Live Scan that accompanied the Live Scan data when it was first submitted by the User device 145. Provider 150 contacts UL 115 directly using one or more secondary TD 3124 and issues a simple query with these two fields: can [encrypted hash of live scan] be decrypted to [hash of live scan] using any of the public keys registered with User Devices for ULID record. If it can—then Provider 150 has verified that the Live Scan processed by AL 125 was authentic.

Should such a secondary channel protocol detect a mismatch, all participating TDs (3114, 3124) are preferably taken off line and analyzed. Regardless, one or several compromised TDs would not be able to compromise the integrity of either AL 125 or UL 115.

Combining Biometrics with Cryptography to Control Access to a UL Smart Contract

As described herein, when there is a need to modify contents of the UL 115, a transaction may be posted to a smart contract. The smart contract processes the transaction and updates the UL 115. In some embodiments described herein, write operations of the UL smart contract may be secured by cryptographic confirmation. In other embodiments, security of UL modifications can be assured by a multiple factors, such as a combination of biometrics and cryptography. In such embodiments, only biometrically (by biometric matching against a pre-registered Template) and cryptographically (by digitally signing the data sent from a pre-registered device) authenticated Users 140 are allowed to invoke ledger-modifying transactions (although creation of a new User record in the UL is not biometrically authenticated). Biometric authentication can be achieved using the authentication procedure described in connection with the Transaction Director.

Decentralized Validation of UL Transactions Against an External Distributed Ledger (AL)

When TD 100 posts a transaction to a smart contract on UL 115, the validity of the transaction is preferably verified by all validating UL nodes 110. Two types of validation can be implemented on UL 115. A simple validation would be a process that makes sure that a UL state transition triggered by a particular transaction is valid. For example, a transaction cannot modify a Provider Account attribute unless this attribute exists. This type of validation assures that UL 115 instances are in the same valid state on all UL nodes 110. Validations of this kind are commonly implemented in Distributed Ledger Technology-based platforms.

Full validation of transactions on UL 115, however, is more involved. Users are preferably authenticated on AL 125 to be able to submit a UL-modifying transaction. Therefore, full validation on UL 115 must include a verification of a corresponding AL 125 record. To preserve the decentralized nature of certain embodiments of the platform, however, UL validators cannot rely on a transaction-submitting TD 100 as a proof of biometric authenticity of the request. That would introduce a single point of failure.

Figure 33:
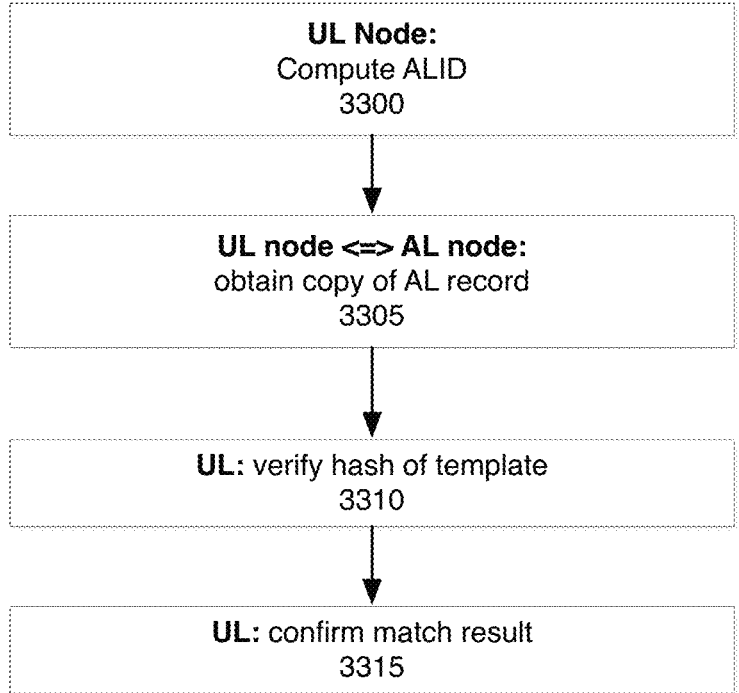
FIG. 33 is a process for UL nodes to verify authenticity of a TD request.

One way to resolve this problem is to enable fully-validating UL nodes 110 to access AL 125 directly, get a copy of the AL 125 record, and verify authenticity of the request independently from TD 100. FIG. 33 illustrates a process that may be utilized in connection with some embodiments.

A smart contract 115A that is executed by every fully validating UL node 110 may perform the following steps. In step 3300, the UL node 110 implementing smart contract 115A computes an ALID, by hashing known information, specifically: ULID (ID of Authenticated User), Device ID (hash the device hardware identifier), and nonce (a UL record field that is incremented every time the record is modified).

In step 3305, the UL node 110 implementing smart contract 115A requests a copy of the AL 125 record from a connected AL node 120. Every fully validating UL node 110 is configured with information on how to access AL nodes 120 directly. TD 100s running in pass-through mode may be used to intermediate this query. In step 3310, the UL node 110 implementing smart contract 115A verifies that Hash (Template) from the UL 115 record is the same as a hash of the UL-stored User Template. In step 3315, the UL node 110 implementing smart contract 115A confirms that the "match result" field of the AL 125 record is set to "yes".

Improved Latency by Parallel Processing of Sub-Samples

A significant factor affecting the speed of User Authentication request processing is the amount of time required for execution of a biometric matching algorithm by individual Processors 510. This duration translates into overall latency of the platform, as perceived by its users. Therefore, the time required for execution of a biometric matching operation may an important factor in achieving high levels of overall system performance and user satisfaction.

In some embodiments, it may be desirable to reduce the time required to complete a single biometric matching request by splitting Templates and Live Scans into sub-samples, evaluating each sub-sample individually in parallel with other sub-samples, and evaluating a set of sub-outcomes to determine the final result.

Figure 34:
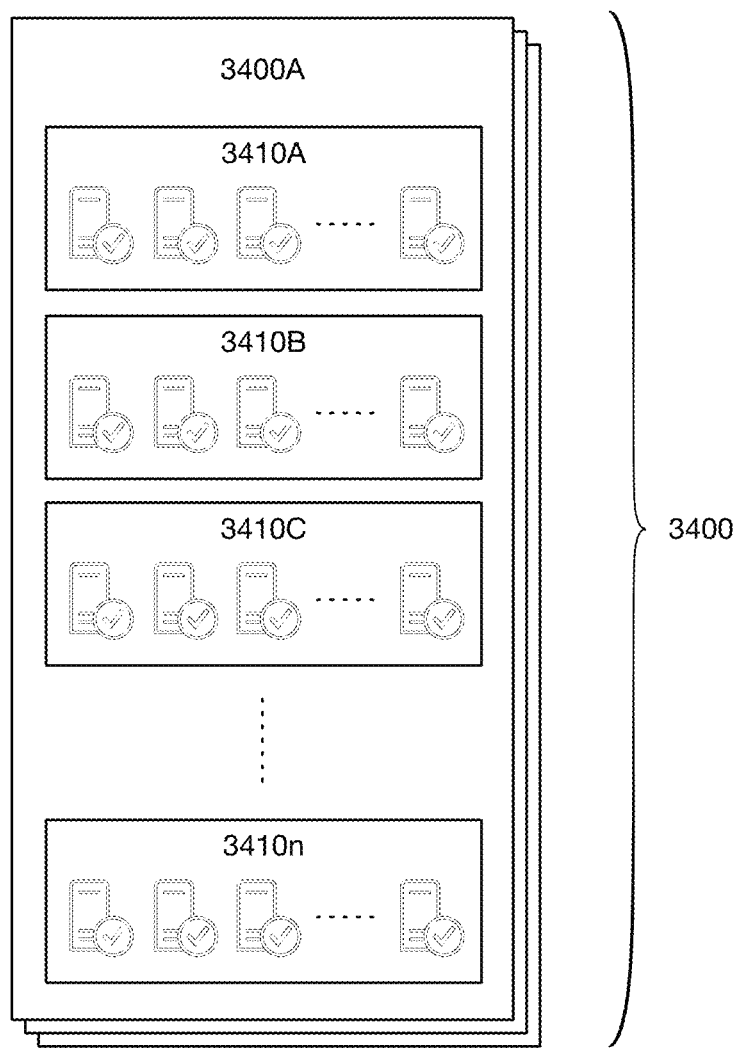
FIG. 34 is a schematic block diagram of AL processor arrangement for parallel processing of biometric samples.

To support this method of optimization in the context of decentralized AL 125, Processors may be organized in two-level clusters, as illustrated in FIG. 34. AL Processors 3400 may be organized into one or more Processing Clusters, such as Cluster 3400A. A Processing Cluster may be further grouped into Sub-Sample Processing Clusters (SSPCs). For example, Cluster 3400A is divided into n SSPC 3410A-n. Each SSPC may contain a subset of processors within a Processing Cluster.

Figure 35:
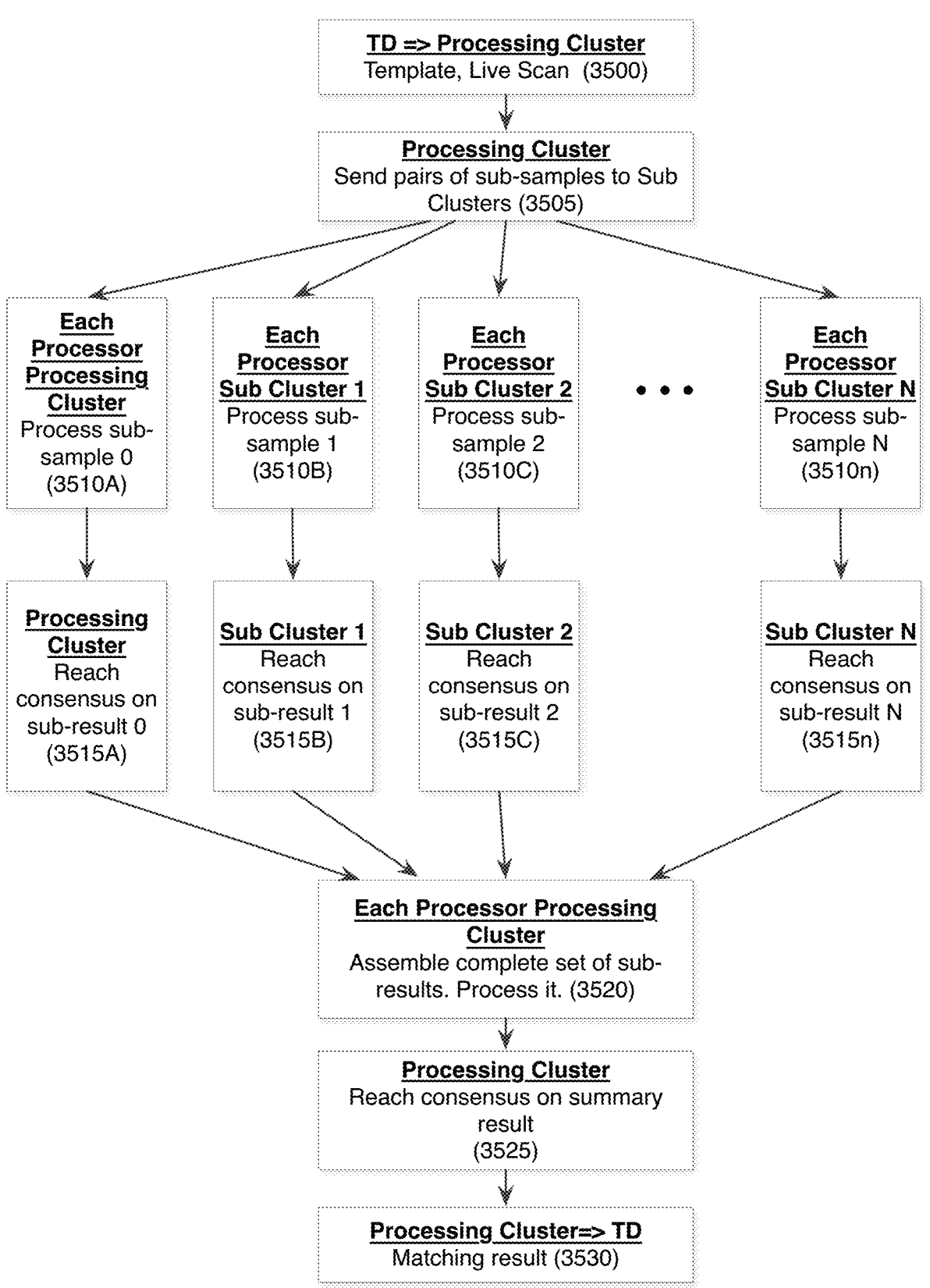
FIG. 35 is a process for parallel processing of biometric samples.

FIG. 35 illustrates a process via which the Cluster and SSPC arrangement of FIG. 34 may be utilized for parallel processing of Sub-Samples. In step 3500, a Processing Cluster 3400A receives a request from a TD 100. In step 3505, the Processing Cluster 3400A splits the Live Scan and Template into n sub-samples, with a first SSPC 3410A handling one sub-sample (step 3510A) and sending the remaining n−1 sub-samples to SSPCs 3410B-3410n (steps 3510B-3510n). Each SSPC processes its assigned sub-sample, implementing a biometric matching algorithm to compare a Live Scan sub-sample with a corresponding Template sub-sample. The SSPC 3410A-n each reach internal consensus on the result of their sub-samples and report back to the Processing Cluster 3400A (steps 3515A-n). The primary Processing Cluster 3400A waits for the complete set of sub-results (3520) and combines the sub-results (step 3525) before reporting back the combined matching result to TD 100 (step 3530). Depending on the underlying biometric algorithm, different approaches can be used to combine the sub-results. In some embodiments, the final combined result is a weighted average of the sub-results. In other embodiments, the final result may be chosen as the maximum or minimum value of the sub-results.

This sub-sampling approach can significantly reduce the overall workload of biometric matching. For example, assuming that each of the n SSPCs of the cluster 3410A contains m nodes, the total number of nodes is n*m. Without sub-sampling, the workload is n*m full template matching, which equals n*m*n sub-sample matching. With sub-sampling optimization, the total workload may be only n*m sub-sample matching.

While certain embodiments may assign each sub-sample to a different SSPC, in other embodiments, a processing cluster may assign multiple sub-samples to a given SSPC. Furthermore, in some embodiments sub-samples may have uniform length, while in other embodiments sub-samples may vary in length. In some embodiments, allocation of sub-samples amongst SSPCs may be based in whole or in part upon factors such as SSPC availability, and/or the computational performance capabilities of processors within a SSPC. In such circumstances, available, higher-performing SSPCs may be assigned to process greater numbers, and/or larger, sub-samples as compared to lower-performing SSPCs.

Alternative Implementations with Additional Protection of Stored and Transmitted Biometric Data In most cases, Distributed Ledger Technology underlying implementation of User Ledger 115 will be sufficiently secure to store biometric templates without any additional effort. Hyperledger Fabric, for example, already has encryption in place and all assets stored on a Hyperledger Fabric-based platform will be encrypted and secured by the platform itself.

However, under certain conditions (for instance, from the use of insecure networks, stricter private data storage policies, and the like), keeping User templates unencrypted may be deemed unacceptable even if they are scrambled using techniques described hereinabove. In such circumstances, alternative approaches may be utilized to further improve data privacy.

In such embodiments, Templates and Live Scans may be sent to AL processors encrypted, and need to be decrypted by the private keys of AL processors before matching. Since each AL processor has its own private key, a technique may be adopted that allows the same encrypted data stream to be decrypted using different private keys.

Figure 36:
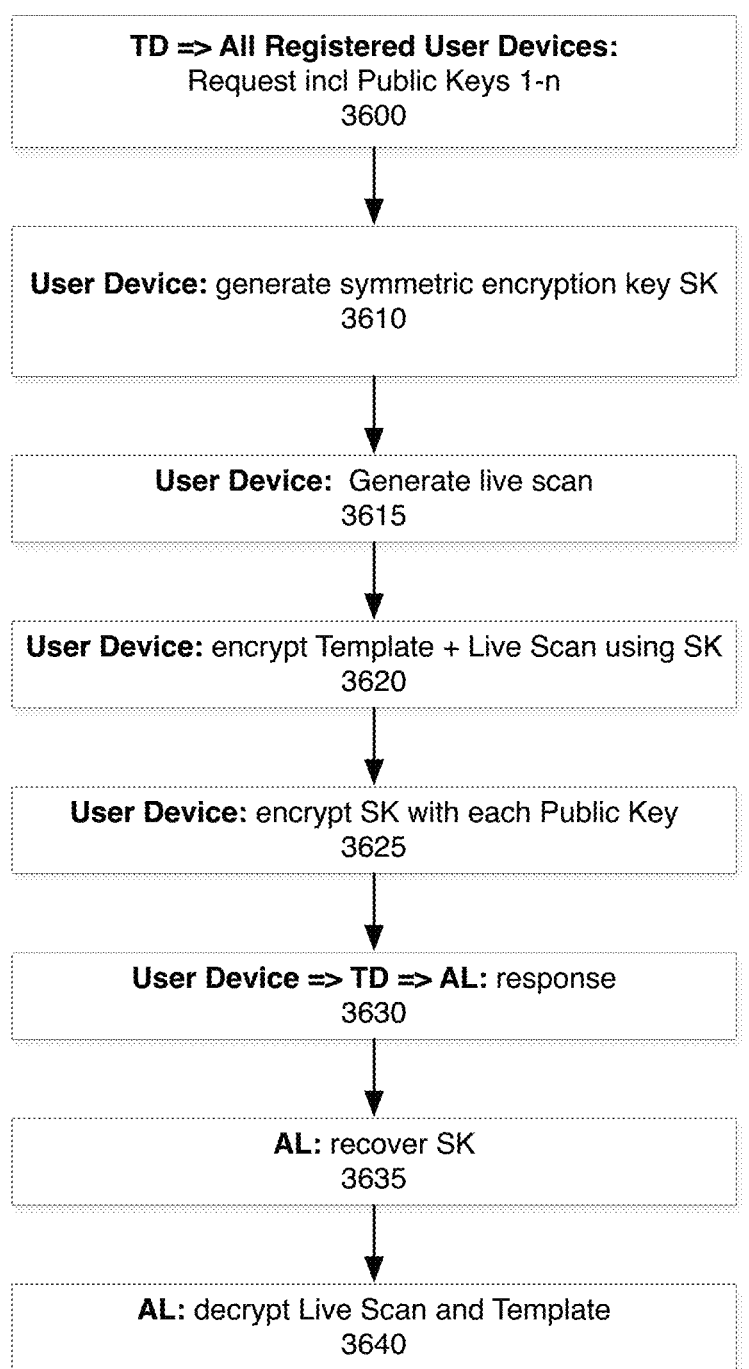
FIG. 36 is a process for maintaining encryption of user templates.
Figures 37, 38:
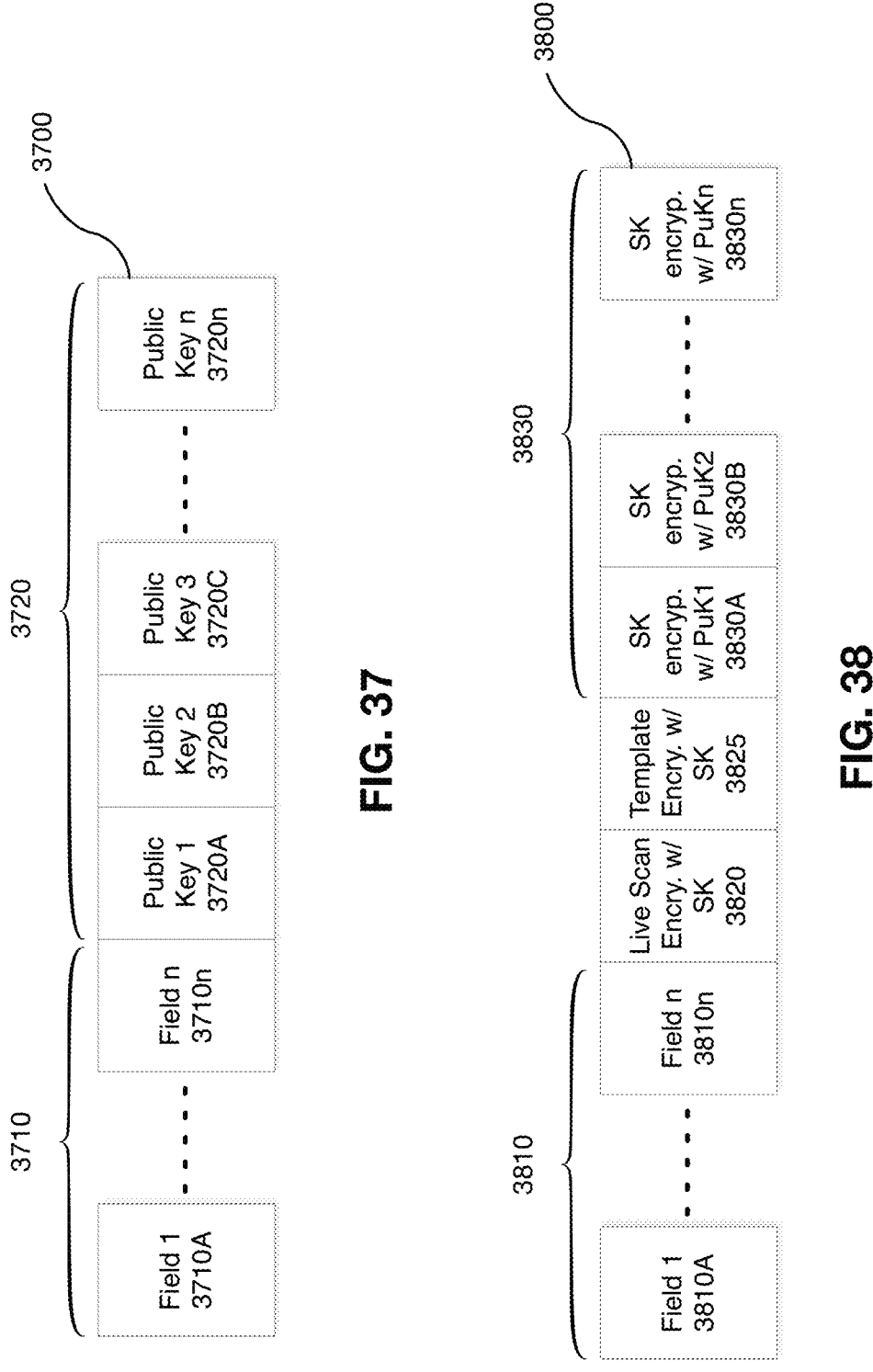
FIG. 37 is a TD request format in an environment maintaining encryption of user templates.
FIG. 38 is a user device response format with encrypted live scan and template.

FIG. 36 illustrates an exemplary process embodiment. In step 3600, TD 100 transmits a request 3700 to each registered user PED 145, having a format illustrated in FIG. 37. Request 3700 includes a set 3710 of data fields 3710A-n, having contents comparable to other TD request messages described elsewhere herein. However, request 3700 further includes one or more public keys 3720, each public key 3720A-n corresponding to one of the AL processors. In step 3610, a responding user PED 145 generates an encryption key SK, using a symmetric encryption algorithm such as Blowfish or the like. In step 3615, the responding user PED 145 is used to generate a live scan. In step 3620, the responding user PED 145 encrypts the template stored on the device, and the live scan captured in step 3615, in each case using encryption key SK. In step 3625, the responding user PED 145 encrypts SK once with each public key 3720. In step 3630, the responding user PED 145 transmits a response 3800 to TD 100, which may be further communicated to AL processors, with the response structure illustrated in FIG. 38. Response 3800 includes a set 3810 of multiple data fields 3810A-n, having contents comparable to other user device response messages as described elsewhere herein. Response 3800 further includes field 3820, containing the live scan encrypted by SK as calculated in step 3620. Field 3825 includes the template encrypted with SK as also calculated in step 3620. Response 3800 also includes a set 3830 of fields 3830A-n, each of fields 3830A-n containing a copy of the SK encryption key, further encrypted with one of public keys 3720A-n. Specifically, we encrypt the symmetric key with a public key 3720A of processor 1 and attach the result to response 3800, then encrypt the symmetric key with public key 3720B of processor 2 and attach the result to response 3800, with the process repeated n times (once for each processor), until each response 3800 includes copies of SK encrypted by each of public keys 3720.

When AL processors receive a data stream containing response 3800 as illustrated, each of them can decrypt one of set 3830 using its own private key and obtain the original symmetric key SK (step 3635). Symmetric key SK can then be used to decrypt fields 3820 and 3825 to obtain the live scan and template (step 3640). Elsewhere herein, this technique may be referred to as "encrypt with multiple public keys, decrypt with any of the corresponding private keys".

In some embodiments, each processor receives a data stream such as response 3800, which includes all copies of SK encrypted using different public keys. However, in other embodiments, an intermediary (such as TD 110) may extract portions of, e.g., response 3800 that are relevant for each processor, to be relayed to each processor. For example, a TD 110 may relay an authentication task request containing contents of response 3800, except that each processor is sent a subset of fields 3830A-n, such as fields 3830A-n encrypted using a public key associated with a public/private key pair for which the receiving processor knows the private key (which in many embodiments, will be only one of fields 3830A-n).

While the embodiment described above with reference to FIGS. 36-38, with each processor using its own public/private key pair for encryption, provides a high level of protection over biometric data, it is contemplated and understood that other variations on use of biometric data encryption may also be utilized to provide added protection as compared to base cases described herein. For example, in some embodiments, all processors may share a public/private key pair. In such embodiments, the process described in FIG. 36 remains the same, except that in step 3620, the template and live scan are encrypted directly with the shared processor public key; the creation, encryption and recovery of SK in steps 3610, 3625 and 3635, respectively, are unnecessary; and in step 3640 each processor may decrypt the encrypted live scan and encrypted template using the share processor private key.

In yet other variations, multiple public/private key pairs may be employed within a set of processors, but each processor need not employ a unique pair. For example, in some embodiments, a processing cluster or processing subcluster may share a public/private encryption key pair. In other embodiments, processors controlled by a common entity may share a public/private encryption key pair. Each such embodiments, the process of FIG. 36 and messaging of FIGS. 37-38 may remain the same, except that multiple processors may be associated with any given processor public key.

For sake of clarity, it should also be understood that references to a user device, or user devices, should not be limited to, e.g., personal electronic devices associated with a specific user, such as a mobile phone. User devices may include a variety of types of registered devices, including client applications implemented via systems not limited to personal electronic devices, kiosks, servers, cloud computing resources, or combinations thereof. User devices may be uniquely associated with an individual or utilized by multiple individuals. These and other variations are contemplated and may be implemented in various embodiments.

Store Templates on Registered Devices and Store Hashes of Templates in UL

In certain embodiments described hereinabove, full Templates are stored on registered devices, while only Template Hashes are stored in UL 115. During authentication, AL 125 acquires an encrypted Template from the registered device and the corresponding Template Hash from UL 115. AL 125 will then decrypt the Template and verify its authenticity by computing the hash of the decrypted Template and comparing the computed hash with the Template Hash acquired from UL 115.

Such a baseline embodiment may be extended in the following areas:

Storage: In ledger storage, the Template field of UL 115 may be replaced by a Template Hash. In local storage, Registered Devices (e.g. PED 145) store Templates along with their own private keys and the ULIDs of the Users 140. To enable User Record Recovery by a Trusted Provider, a copy of the Template is stored by a Trusted Provider. If AL 125 processors are required to save User Authentication Request for the purpose of auditing, they will save a full copy of the processed biometric matching requests in local storage. This copy is encrypted with the Processor's public key. The optional Cryptographic Key in the original design can still be applied to add a second layer of encryption.

Messaging: Biometric data including Template and Live Scan are sent through the network encrypted. They are only decrypted after arriving at AL processors. Intermediaries such as TDs cannot decrypt such biometric data. In this setup, all AL Processors have to be digitally certified. Each of them will have its own verifiable public key. Live Scans and Templates sent from User PEDs 145 to Processors via TD 100 are always encrypted with one or several public keys of the Processors.

To encrypt Templates and Live Scans, Public keys of Processors are sent to Registered Devices through TDs. TDs keep track of Processing Clusters and states of individual Processors and verify whether keys are valid and can be used for encryption. Double validation by both TD and Registered Device is made to prevent a compromised TD supplying fake public keys to steal User Templates. Processors' public keys should be certified, and a User App on Registered PEDs 145 will be verifying each public key it receives from a TD prior to submitting encrypted biometric samples.

User Authentication request format is modified: Live Scan and Template fields are now encrypted, and a new field Template Hash is added. This Template Hash field is supplied by a TD and is used to by Processors to prevent User Registered Devices from faking encrypted Templates.

Figure 39:
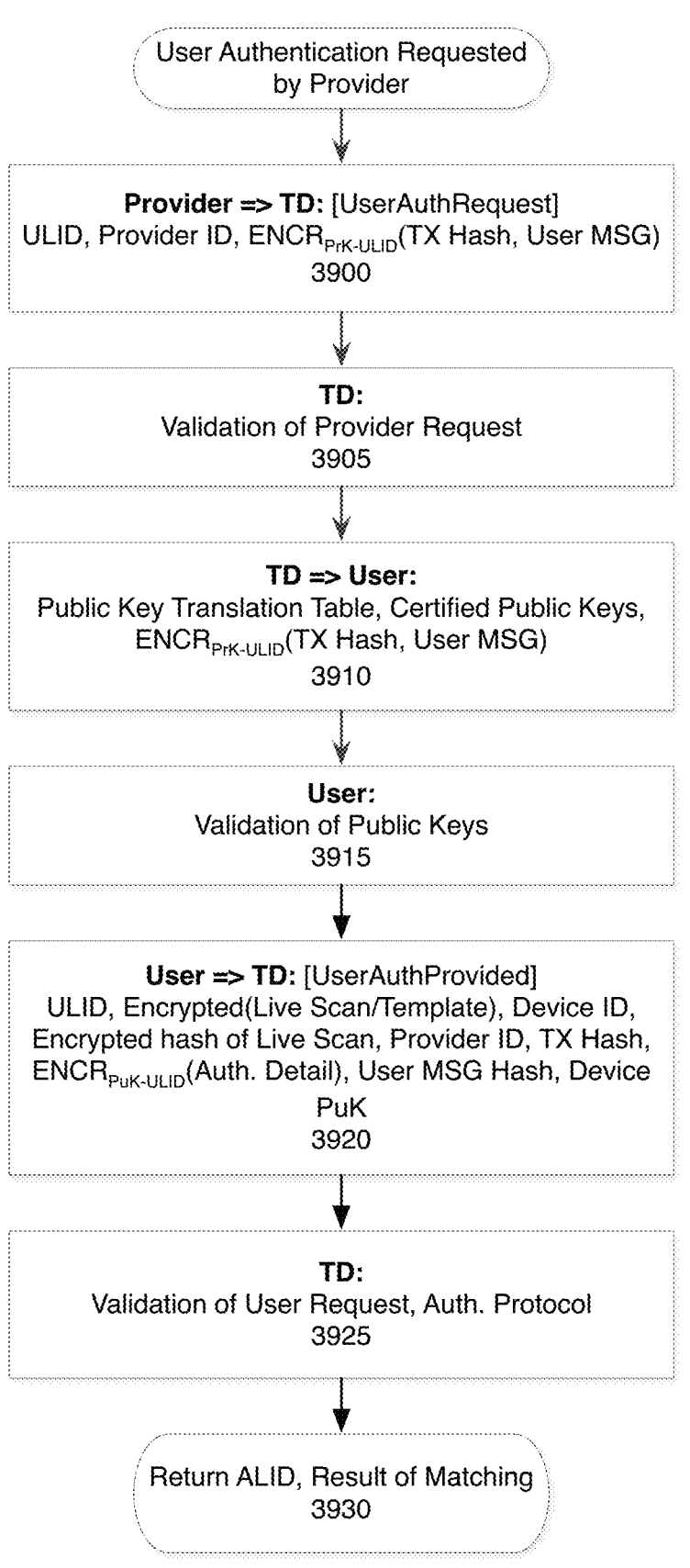
FIG. 39 is a process for a provider request for user authentication in accordance with another embodiment.

Affected Protocols: To enable implementation of the above approach storing encrypted Templates on user devices, protocols such as Provider-requested User Authentication may be changed. FIG. 39 illustrates an exemplary modification of the Provider-requested User Authentication process illustrated in FIG. 12, to accommodate encrypted Template storage on user devices. Step 3900 is comparable to step 1200. Step 3905 is comparable to step 1205. Step 3910 is comparable to step 1210, except that the TD is now additionally supplying a list of public keys. In new step 3915, the User App validates the public keys provided in step 3910. Step 3920 is comparable to step 1215, except that instead of sending Live Scan data, the User App sends a Live Scan/Template pair that is encrypted with the public keys received in step 3910. Step 3925 is comparable to step 1220, and step 3930 is comparable to step 1225.

Other changes that may be implemented to accommodate user device storage of biometric templates include the following: During new user registration, the User saves a Template on the registered device, and sends a Hash of the Template to UL 115. Record recovery by a Trusted Provider will have an additional step where a Trusted Provider encrypts the Template with a public key of the new Regis- tered Device and sends it via TD to the device. Record recovery by Trusted Circle will revoke the old Template and replace it with a new one from the newly added Registered Device.

In some protocols, User initiates communication with a TD. Addition of a Registered Device, addition and removal of an authorized Provider, record recovery, etc. are examples of such protocols. An additional step may be included in each such protocol, where prior to sending a Live Scan/ Template to TD, the User will first ask the TD for a list of keys to use for encryption.

Multiple protocols also include a segment where a Pro- vider sends information or a notification to a Registered Device and User responds submitting a Live Scan. In such protocols, a TD will now be including one or several public keys in its transmission. Prior to proceeding with a User action, a User App on the user device (e.g. PED 145) will verify the status of each public key by querying a Certificate Authority. Having done that, the User App will use only verified keys to encrypt a submitted Live Scan/Template pair.

Store Encrypted Templates in UL and Store Decryption Key on Registered Device

In embodiments described immediately above, during enrollment, a Template is captured on a Registered Device and encrypted. After that, the encrypted Template is saved to UL 115. The key is copied to all Registered Devices and Trusted Providers as they are added into UL 115. During authentication, AL processors 120 obtain the encrypted Template from UL 115. They also receive an encrypted Live Scan and an encrypted key from the Registered Device. The Template and Live Scan are encrypted by the same key. The key is encrypted using the public keys of the processors. The processors will then decrypt the key first then use the decrypted key to decrypt the Template and Live Scan and match them. For better performance, it is recommended to use the same symmetrical key SK to encrypt and decrypt both Template and Live Scan.

The original platform may be further extended by such an approach in these areas:

Storage: In ledger storage, the Template field of UL 115 is replaced by an encrypted Template. In local storage, Registered Devices and Trusted Providers store the decryp- tion keys.

Messaging: The same as the first embodiments, except that Registered Devices send encrypted decryption keys instead of an encrypted Template.

Figure 40:
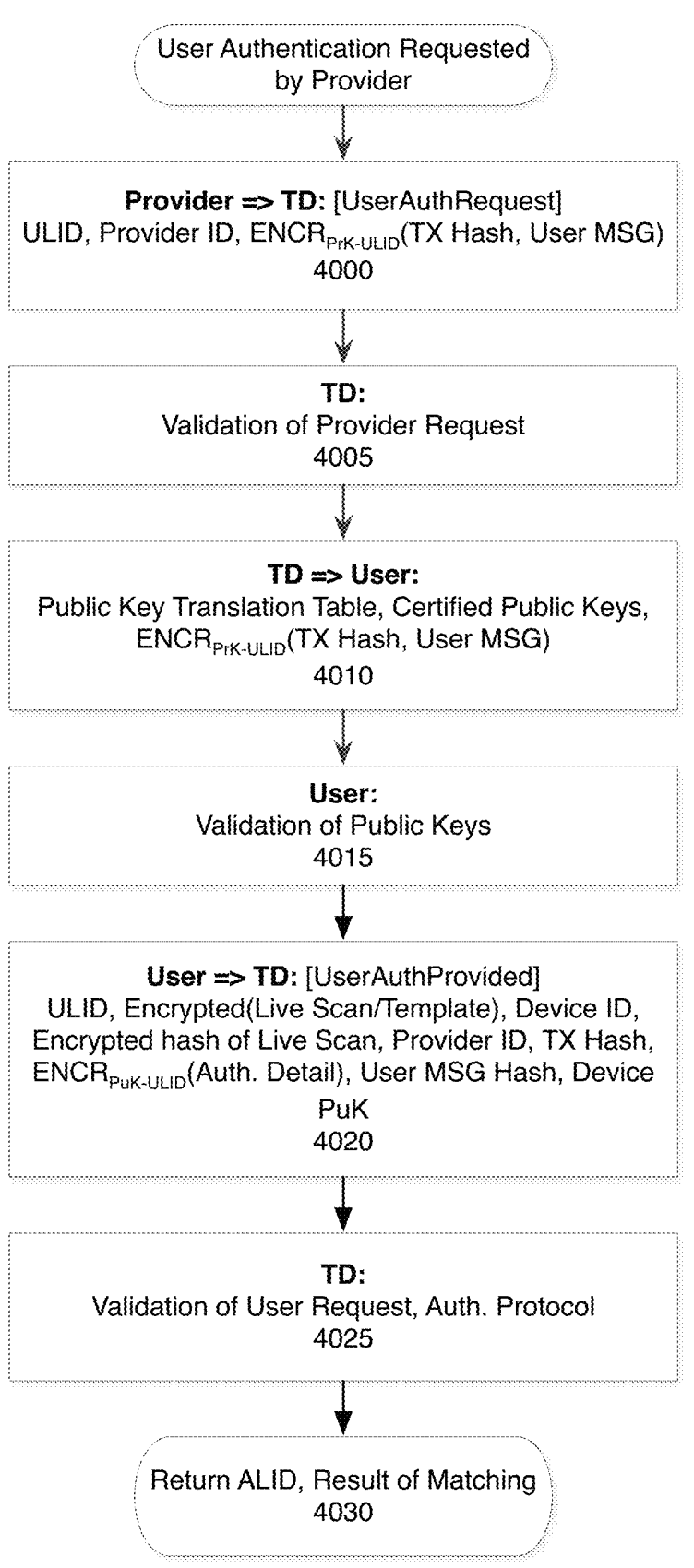
FIG. 40 is a process for a provider request for user authentication in accordance with yet another embodiment.

Affected Protocols: Several protocols in the original plat- form design may be modified. For example, FIG. 40 illus- trates a modified version of the Provider-requested User Authentication Protocol illustrated in FIG. 12. Step 4000 is comparable to step 1200. Step 4005 is comparable to step 1205. Step 4010 is comparable to step 1210, except that the TD is now additionally supplying a list of public keys. In new step 4015, the User App validates the public keys provided in step 4010. Step 4020 is comparable to step 1215, except that instead of sending Live Scan data, the User App sends an encrypted Live Scan and a set of encrypted Template Decryption Keys. Each member of this set is a Template Decryption Key encrypted with a public key of one of the Processors. This Template Decryption Key (when decrypted) can be used to decrypt both the Live Scan and Template. Step 4025 is comparable to step 1220, and step 4030 is comparable to step 1225.

Other changes that may be implemented to accommodate such embodiments include: During New User registration, User supplies an encrypted Template, encrypted Template Decryption Key, and hash of Template. Record recovery by a Trusted Provider will have an additional step where a Trusted Provider encrypts Template Decryption Key with a public key of the new Registered Device and sends it via TD to the new device. Record recovery by Trusted Circle will revoke an old Template and replace it with a new one from the newly added Registered Device.

In some protocols, User initiates communication with a TD. Addition of a Registered Device, addition and removal of an authorized Provider, record recovery, etc. are examples of such protocols. All of them will have an added step where prior to sending an encrypted Live Scan and Template Decryption Key to TD, the User device will first ask TD for the list of certified public keys to use for encryption.

Multiple protocols include a segment where a Provider sends information or notification to a Registered Device and a User responds submitting a Live Scan. In such protocols, TD will be including certified public keys. Prior to proceed- ing with a User action, App on the user device (PED 145) will verify the status of each public key by querying a Certificate Authority. Having done that, the App operating on PED 145 will use only verified keys to encrypt submitted Live Scan and Template Decryption Key.

While certain embodiments of the invention have been described herein in detail for purposes of clarity and under- standing, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method for biometric authentication of user identity in connection with a transaction via comparison of an electronically-captured user live scan against a biometric template by a decentralized computing platform, implement- ing two independent distributed ledgers, each distributed ledger comprising a computing system that electronically communicatively links a plurality of computing devices as processing nodes configured to implement a distributed data storage network, the platform comprising:

a user ledger configured to enable users to access and immutably store or delete biometric templates, wherein the user is one party to the transaction and a provider is another entity to the transaction, wherein each user template stored on the user ledger is not accessible by any provider or others;

an authentication ledger configured to host a biometric matching processing algorithm used in authenticating users and to store authentication transaction records, wherein the authentication ledger comprises a process- ing cluster comprised of a plurality of sub-sample processing clusters (SSPCs), each SSPC comprising one or more processors, each processor comprised of a network-connected computer, and a gateway server computer electronically connected via a digital communications network to the user ledger and the authentication ledger for coordinating the use of each ledger in executing authentication requests by providers involving transactions with users; the method comprising:

receiving, by the server, from a provider computing device, a request to authenticate the identity of a user involved in a transaction with a provider;

receiving, by the server, from the provider computing device, a user live scan, wherein the live scan is received via the digital communications network by the server for authentication of user identity in connection with the transaction;

receiving, by the server, from the user ledger, a biometric template of the user via the digital communications network;

splitting, by the server, each of the user live scan and the biometric template into a plurality of sub-samples thereof, each user live scan sub-sample comprising a subset of the user live scan and each biometric template sub-sample comprising a subset of the biometric template that corresponds to an associated user live scan sub-sample;

assigning, by the server, each user live scan sub-sample and its associated biometric template sub-sample for processing by at least an assigned one of said SSPCs;

determining, by the assigned SSPC, a sub-sample sub-result for storage on the authentication ledger implemented using the SSPC, based on comparison of the user live scan sub-sample with its associated biometric template sub-sample by execution of the biometric matching algorithm by the assigned SSPC;

determining, by the processing cluster, a biometric authentication result based at least in part upon the sub-sample sub-results determined by the SSPCs;

transmitting, by the processing cluster, the authentication result to the server;

transmitting, by the server, to the provider, the authentication result; and storing, by the server, the biometric authentication result, in the authentication ledger.

2. The method of claim 1, wherein the step of receiving a user live scan comprises receiving a user live scan originating from a registered computing device associated with a user and transmitted via the digital communications network.

3. The method of claim 2, wherein the step of receiving a user live scan originating from a registered computing device associated with a user comprises:

capturing a live scan by the registered device;

transmitting the live scan to a transaction director computer via the digital communications network; and relaying the live scan from the transaction director to the processing cluster via transmission over the digital communications network.

4. The method of claim 1, wherein the step of determining a biometric authentication result comprises calculating a weighted average of the sub-results.

5. The method of claim 1, wherein the step of determining a biometric authentication result comprises determining a maximum or minimum value of the sub-results.

6. The method of claim 1, wherein a copy of the distributed authentication ledger is maintained by each of the SSPCs.

7. The method of claim 1, in which the step of determining, by the assigned SSPC, a sub-sample sub-result based on comparison of the user live scan sub-sample with its associated biometric template sub-sample comprises:

determining a local sub-result by each of said processors within an assigned SSPC; and applying, by the processors within the assigned SSPC, consensus rules to determine a sub-result based on the local sub-results.

8. The method of claim 1, wherein the step of assigning each user live scan sub-sample and its associated biometric template sub-sample for processing by at least an assigned one of said SSPCs comprises assigning each user live scan sub-sample and its associate biometric template sub-sample to a SSPC based at least in part upon the computational performance of processors within each SSPC.

9. The method of claim 8, wherein the step of assigning each user live scan sub-sample and its associated biometric template sub-sample for processing by at least an assigned one of said SSPCs comprises assigning a plurality of sub-samples to each of one or more of said SSPCs based at least in part upon the computational performance of processors within said SSPCs.

10. The method of claim 1, wherein:

the user live scan sub-samples have varying length; and the step of assigning, by the server, each user live scan sub-sample and its associated biometric template sub-sample for processing by at least an assigned one of said SSPCs comprises assigning each user live scan sub-sample and its associate biometric template sub-sample to a SSPC based at least in part upon computational performance of processors within each SSPC.

11. The method of claim 1, wherein the server comprises a computer within the processing cluster.

12. An apparatus for biometric authentication of an identity of a user participating in a transaction via comparison of an electronically-captured live scan of the user against a biometric template by a decentralized computing platform implementing two independent distributed ledgers, each distributed ledger comprising a computing system that electronically communicatively links a plurality of computing devices as processing nodes configured to implement a distributed data storage network, the platform comprising:

a user ledger configured to enable users to access and immutably store or delete biometric templates, wherein the user is one party to the transaction and a provider is another entity to the transaction, wherein each user template stored on the user ledger is not accessible by any provider or others;

an authentication ledger configured to host a biometric matching processing algorithm used in authenticating users and to store authentication transaction records, wherein the authentication ledger comprises a processing cluster comprised of a plurality of Sub-Sample Processing Clusters (SSPCs), each SSPC comprised of one or more processors, each processor comprised of a networked computing device communicating with other computers via a computer network for implementing the distributed authentication ledger; and a gateway server computer electronically connected via a digital communications network to the user ledger and the authentication ledger for coordinating the use of each ledger in executing authentication requests by providers involving transactions with users;

wherein the gateway server comprises a transaction director comprised of a network-connected computing device, the transaction director transmitting an authentication task request comprising a template retrieved from the distributed user ledger and a live scan to a first network-connected computer within the processing cluster;

wherein one or more of the processing cluster computers are configured to: split the live scan and biometric template into a plurality of sub-samples thereof; assign each sub-sample to at least one SSPC for biometric matching of the user live scan sub-sample with a corresponding template sub-sample to generate and store in the distributed authentication ledger a sub-result via execution of a biometric matching algorithm; and output a biometric authentication result for authenticating an identity of the user involved in the transaction based at least in part upon the sub-results.

13. The apparatus of claim 12, further comprising a registered user computer device comprising digital memory storing the live scan for transmission to the transaction director via a computer network.

14. The apparatus of claim 13, wherein the registered user computer device digital memory is further configured to store the biometric template for transmission to the transaction director via a computer network.

15. The apparatus of claim 12, wherein the decentralized user ledger is implemented by a plurality of network-connected computers being electronically communicatively linked as nodes on a distributed ledger, from which the transaction director may retrieve the biometric template via a computer network.

16. The apparatus of claim 12, wherein the biometric authentication result is based on a weighted average of the sub-results.

17. The apparatus of claim 12, wherein the biometric authentication result is based on a maximum or minimum value of the sub-results.

18. The apparatus of claim 12, where each sub-result is determined based on application of consensus rules by the plurality of processors within an associated SSPC.

19. The apparatus of claim 12, wherein the processing cluster is further configured to assign each sub-sample to one or more SSPC for biometric matching based at least in part upon computational performance capabilities of processors within each SSPC.

20. The apparatus of claim 12, in which the sub-samples vary in length; and are assigned to an SSPC based at least in part upon computational performance of processors within each SSPC.

* * * * *